US006680900B1

(12) United States Patent
Takahashi et al.

(10) Patent No.: US 6,680,900 B1
(45) Date of Patent: Jan. 20, 2004

(54) OPTICAL-PICKUP SLIDER, MANUFACTURING METHOD THEREOF, PROBE AND MANUFACTURING METHOD THEREOF, AND PROBE ARRAY AND MANUFACTURING METHOD THEREOF

(75) Inventors: Junichi Takahashi, Kanagawa (JP); Motonobu Kourogi, Kanagawa (JP); Takashi Yatsui, Kanagawa (JP); Motoichi Ohtsu, Tokyo (JP)

(73) Assignees: Ricoh Company, Ltd. (JP); Kanagawa Academy of Science and Technology (JP)

( * ) Notice: Subject to any disclaimer, the term of this patent is extended or adjusted under 35 U.S.C. 154(b) by 219 days.

(21) Appl. No.: 09/585,428

(22) Filed: Jun. 2, 2000

(30) Foreign Application Priority Data

| Jun. 4, 1999 | (JP) | ............................................ 11-157699 |
| Jul. 19, 1999 | (JP) | ............................................ 11-204244 |
| Nov. 16, 1999 | (JP) | ............................................ 11-326169 |
| Apr. 11, 2000 | (JP) | ........................................ 2000-115825 |
| Apr. 26, 2000 | (JP) | ........................................ 2000-125127 |

(51) Int. Cl.$^7$ .......................... G11B 7/00; G11B 15/64; G11B 17/32; G11B 7/135
(52) U.S. Cl. .................... 369/300; 369/112.01
(58) Field of Search .......................... 369/112.01, 300, 369/99, 100, 112.05, 112.06, 112.09, 112.27, 118

(56) References Cited

U.S. PATENT DOCUMENTS

| 1,646,249 A | * | 10/1927 | Hoxie | .................... 369/112.24 |
| 4,876,680 A | * | 10/1989 | Misawa et al. | ........ 369/112.13 |
| 5,124,961 A | * | 6/1992 | Yamaguchi et al. | .......... 360/66 |
| 5,208,800 A | * | 5/1993 | Isobe et al. | ............. 369/112.27 |
| 5,715,226 A | * | 2/1998 | Shimano et al. | ........ 369/112.27 |
| 6,304,527 B1 | * | 10/2001 | Ito et al. | ................. 369/112.01 |
| 6,307,827 B1 | * | 10/2001 | Nishiwaki | .............. 369/112.07 |
| 2001/0030938 A1 | * | 10/2001 | Oumi et al. | ................. 369/300 |
| 2002/0001283 A1 | * | 1/2002 | Niwa et al. | ............. 369/112.27 |

FOREIGN PATENT DOCUMENTS

| JP | 9-198830 | 7/1997 |
| JP | 11-271339 | 10/1999 |

OTHER PUBLICATIONS

Lee et al.; "Fabrication of Si planar aperture array for high speed near-field optical storage and readout"; Technical digest of the Pacific rim conference on Laser and Electro-Optics, Makuhari, Japan, No. WL2, pp. 91–92, Jul. 1997.

* cited by examiner

Primary Examiner—Julie Anne Watko
(74) Attorney, Agent, or Firm—Dickstein Shapiro Morin & Oshinsky LLP

(57) ABSTRACT

An optical-pickup slider is characterized in that a light-transmitting-property substrate is bonded to a surface of a layer having a tapered through hole, on which surface a larger opening of the tapered through hole exists. Thereby, it is possible to prevent the layer having an aperture from being destroyed. A method of manufacturing the optical-pickup slider comprises the steps of a) making a tapered through hole in a layer layered on a first substrate and having a thickness smaller than that of the first substrate; and, after bonding a light-transmitting-property substrate to a surface of the layer, removing the first substrate so as to expose an aperture at a tip of the tapered through hole.

13 Claims, 48 Drawing Sheets

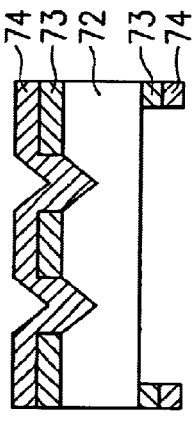
FIG. 4A (PRIOR ART)
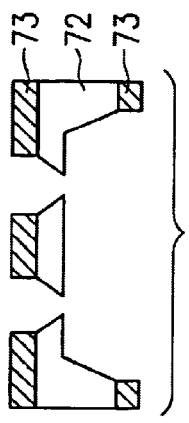
FIG. 4B (PRIOR ART)
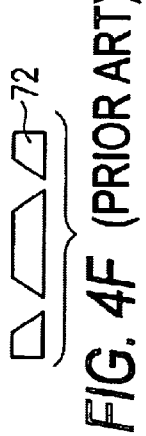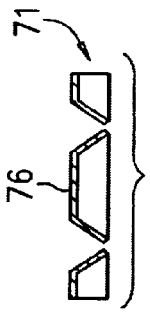
FIG. 4C (PRIOR ART)
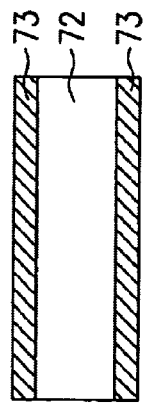
FIG. 4D (PRIOR ART)
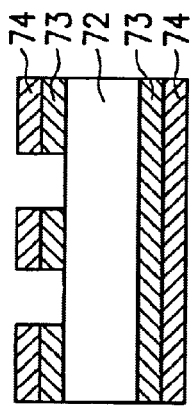
FIG. 4E (PRIOR ART)
FIG. 4F (PRIOR ART)
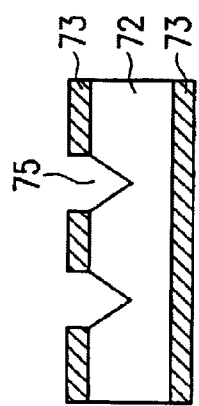
FIG. 4G (PRIOR ART)

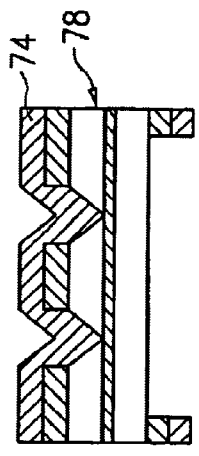
FIG. 5D (PRIOR ART)
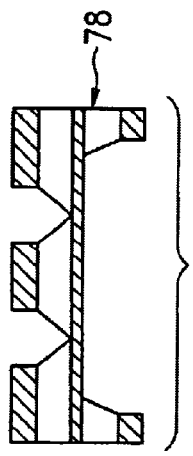
FIG. 5E (PRIOR ART)
FIG. 5F (PRIOR ART)
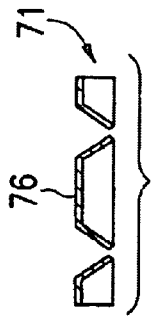
FIG. 5G (PRIOR ART)
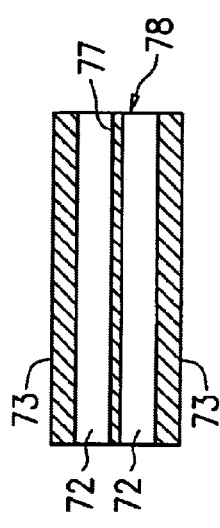
FIG. 5A (PRIOR ART)
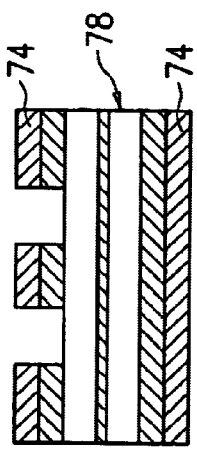
FIG. 5B (PRIOR ART)
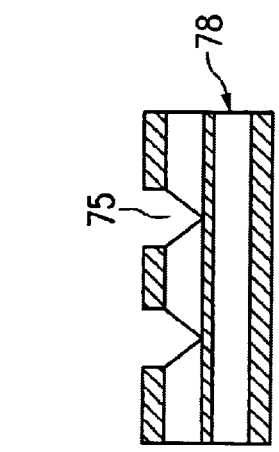
FIG. 5C (PRIOR ART)

DIRECTION IN WHICH AIR FLOWS

DIRECTION IN WHICH HEAD RUNS

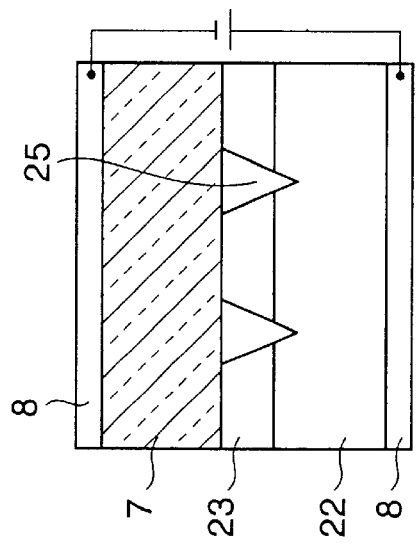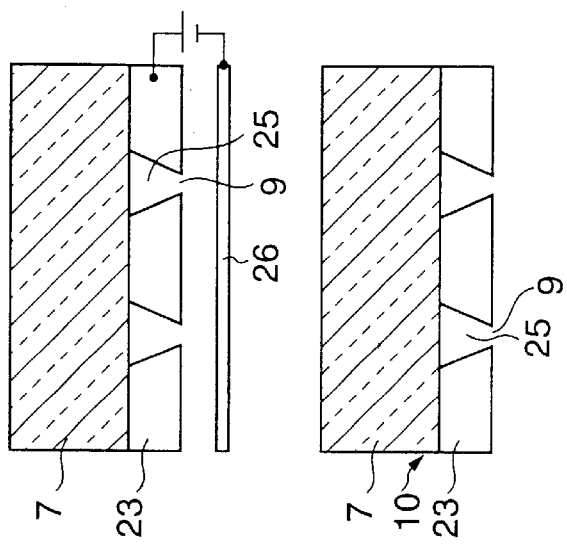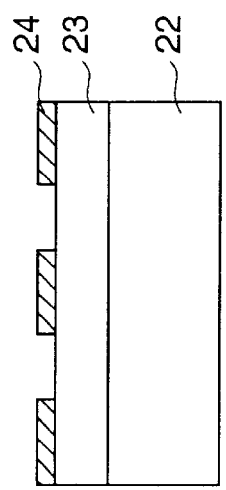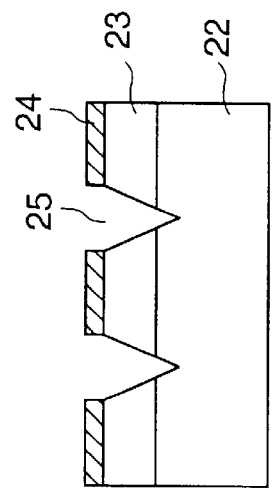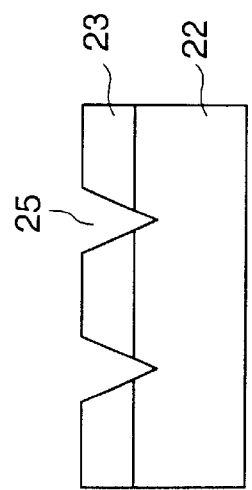
FIG. 13A  FIG. 13B  FIG. 13C  FIG. 13D  FIG. 13E  FIG. 13F

| SIDE ELEVATIONAL SECTIONAL VIEWS | FRONT ELEVATIONAL SECTIONAL VIEWS |
|---|---|
    |
    |
    |
    |

SIDE ELEVATIONAL SECTIONAL VIEWS

FRONT ELEVATIONAL SECTIONAL VIEWS

PATTERNING 6

SIDE ELEVATIONAL SECTIONAL VIEWS

FRONT ELEVATIONAL SECTIONAL VIEWS

| SIDE ELEVATIONAL SECTIONAL VIEWS | FRONT ELEVATIONAL SECTIONAL VIEWS |
|---|---|
    |
    |
    |
    |
    |

FIG. 23C IMPURITY DIFFUSION

MEDIUM-ROTATING DIRECTION

OPTICAL-PICKUP SLIDER, MANUFACTURING METHOD THEREOF, PROBE AND MANUFACTURING METHOD THEREOF, AND PROBE ARRAY AND MANUFACTURING METHOD THEREOF

BACKGROUND OF THE INVENTION

1. Field of the Invention

The present invention generally relates to an optical-pickup slider using an optical near-field and floating a predetermined distance above a high-density recording medium by an air flow, and a manufacturing method thereof.

The present invention further relates to a probe suitable for gathering incident light and emitting it to a sample to be measured or a recording medium for example, and a manufacturing method thereof, a probe array and a manufacturing method thereof, and, in more detail, to a probe which can gather incident light and generate an optical near-field and/or propagation light, a manufacturing method thereof, a probe array and a manufacturing method thereof.

2. Description of the Related Art

In a high-density information recording device using an optical near-field, as shown in Japanese Laid-Open Patent Application No. 9-198830 for example, recording and reading of information is performed on a recording-medium disc in a condition in which a slider of an optical pickup (optical-pickup slider) floats a distance equal to or smaller than hundreds of nanometers above a surface of the recording-medium disc by an air flow generated due to rotation of the recording-medium disc. As shown in FIG. 1, a slider 61 disclosed in Japanese Laid-Open Patent Application No. 9-198830 has a conical hole 62 passing between a side facing a recording medium and an opposite side formed therein, and has an aperture 63 on the side facing the recording medium. Light is incident from a larger opening of the hole 62 and an optical near-field is generated in the vicinity of the aperture 63.

As shown in FIG. 2, in a head of an information recording device using this slider 61, a light source 11 and a lens 12 are provided on the side opposite to the side of the slider 61 facing the recording medium 14. Light from the light source 11 is incident on the hole 62 of the slider 61 through the lens 12. By this light, an optical near-field generated in the vicinity of the aperture 63 is incident on the recording medium. Light incident on the recording medium has a diameter on the order of a diameter of the aperture 63, and it is possible to increase a resolution in recording/detecting, by this light, to one higher than 200 nm. Recording by this head is such that an energy applied to the recording medium 14 is changed, as a result of an intensity of light from the light source 11 being changed, and information is recorded on the recording medium 14. Further, detecting of information is performed using a photodetector 64 arranged on a side of the recording medium 14 opposite to a side facing the slider 61. Specifically, an optical near-field generated at the aperture 63 of the slider 61 generates propagation light as a result of contacting the recording medium 14, and the propagation light is detected by the photodetector 64, and, thus, information written on the recording medium can be detected. Thus, high-density recording can be performed using an optical near-field.

Further, M. B. Lee, T. Nakano, T. Yatsui, M. Kourogi, K. Tsutsui, N. Atoda, and M. Ohtsu, "Fabrication of Si planar aperture array for high speed near-field optical storage and readout", Technical digest of the Pacific Rim Conference on Laser and Electro-Optics, Makuhari, Japan, No. WL2, pp. 91–92, July 1997 discloses, as shown in FIG. 3, a near-field optical probe 71 in which an inverse conical hole is formed in a silicon single-crystal substrate. When this probe 71 is made, a silicon single-crystal substrate 72 having thermal oxidation films 73 formed on both sides thereof, having a thickness of 270 μm and having (100) plane orientation, as shown in FIG. 4A, photo resist 74 is coated on the thermal oxidation films 73, and an opening of 10 μm×10 μm is formed by photolithographic etching, as shown in FIG. 4B. Then, as shown in FIG. 4C, single-crystal anisotropic etching of silicon is performed by KOH solution of 80° C. and a concentration of 10 weight %. Thereby, an inverse-pyramid-shaped hole 75 surrounded by a (111) plane of the silicon single-crystal substrate is formed. Then, as shown in FIG. 4D, photo resist 74 is coated on both sides, and a thermal-oxidation-film pattern having a large opening is made on the reverse side by photolithographic etching. Then, as shown in FIG. 4E, single-crystal anisotropic etching of silicon is performed from the reverse side by KOH solution again. At this time, the etching is stopped so that a through hole on the order of sub-microns is formed on the bottom of the pyramid-shaped hole 75. The etching is stopped so that the opening dimension equal to or smaller than sub-microns can be obtained as a result of an etching speed being previously measured and a time of etching stoppage being controlled. Then, as shown in FIG. 4F, fringes of the thermal oxidation films are removed by a dicing saw or by etching. Then, as shown in FIG. 4G, gold 76 is spattered, and, thereby, laser light is prevented from being incident on a recording material through portions other than the openings. Further, for assuring that the etching is stopped just in time, as shown in FIGS. 5A through 5G, an SOI (Silicon-On-Insulator) substrate 78 having an $SiO_2$ film 77 in the middle is used. By this method, it is possible to obtain an opening having a diameter of 200 nm in a substrate.

An opening having a diameter equal to or smaller than 200 nm is formed on a side facing a recording medium in a slider disclosed in Japanese Laid-Open Patent Application No. 9-198830, and an evanescent wave is generated from this hole. However, this document does not disclose how to obtain this aperture, concretely. The slider has a thickness of millimeters in general, and it is not easy to form a very small aperture equal to or smaller than 200 nm through this thickness. Somewhat special technical measure is needed.

Further, the near-field optical probe shown in FIG. 3 is made, as a result of, as shown in FIGS. 4A through 4G, the inverse-pyramid-shaped hole being formed by anisotropic etching, and, then, the large opening being formed by etching from the reverse side. In this case, the opening dimension of the minute hole is determined by the depth of etching from the reverse side. In order to stop the etching just in time so as to obtain the opening dimension of tens of nanometers, the etching time of the reverse side is previously measured, and, thereby, the etching time is determined. However, thickness of silicon substrates varies on the order of tens of microns among the substrates. Further, an etching speed varies in a wide range depending on an amount of silicon dissolved in an etching liquid, an amount of oxide dissolved in the etching liquid, a slight temperature difference, and so forth. Accordingly, it is actually very difficult to stop etching just in time so as to achieve an opening dimension of tens of nanometers from a previously measured etching speed and a substrate thickness.

It is possible to obtain a desired small opening on the order of 50 nm with high repeatability by using an SOI substrate, and using an SiO film embedded in the middle as a film for stopping etching from a reverse side, as shown in FIGS. 5A through 5G. However, a thick fringe is produced around a surface on which the small opening is produced. Thereby, in this condition, it is not possible that the opening approaches a recording medium to a distance of tens of nanometers. Therefore, it is necessary to remove this fringe. However, because a thickness of a portion having the opening is on the order of 10 μm, it is likely to be destroyed when or after the fringe is removed. In order to avoid such a situation, as shown in FIG. 6C or FIG. 7C, a thickness of a portion of a silicon substrate 72 in which an opening is provided is made small. Then, as shown in FIG. 6E or FIG. 7E, a pattern of silicon oxide for performing etching for providing the opening is formed on a bottom obtained by etching. Then, as shown in FIG. 6F or FIG. 7F, a hole 75 is formed by anisotropic etching. However, in this case, as shown in FIG. 6E or FIG. 7E, when photo resist 74 is coated, because a level difference of hundreds of microns exists from a surrounding fringe portion, it is not possible to coat the photo resist uniformly, and to form the pattern of silicon oxide with high accuracy.

A plurality-of-projection probe provided in a near-field optical microscope or a near-field optical recording optical head are made by a method in which an array of a plurality of recesses is transferred, in the related art, for example.

This near-field optical microscope or near-field optical recording optical head has a projection-type probe array arranged so that a distance between each projection and a sample is smaller than a wavelength of light used when the sample is measured. Thereby, the near-field optical microscope can measure physical properties of the sample by generating an optical near-field between each projection and the sample.

When the above-mentioned projection-type probe array is manufactured, first, a recess array having a plurality of recesses is made in an Si substrate as a result of anisotropic etching being performed on the Si substrate having a plane orientation of (100) plane for example. Then, the recesses are transferred onto another material such as metal material or dielectric material for example using the thus-made recess array. At this time, a surface of the recess array is covered by the material, such as metal or dielectric, other than Si. Then, the Si substrate is removed from the other material. Thereby, a projection-type probe array provided with a plurality of projections made of metal material or dielectric material is made.

The above-described projection-type probe array provided in the near-field optical microscope is used in a condition in which a distance between each projection and a sample is equal to or smaller than a wavelength of light. Therefore, it is important to control a height of each projection properly.

When a projection-type probe array is made as a result of a recess array being transferred onto a metal material or the like, a height of each projection is, as shown in FIG. 8, determined by a depth of a recess 1001 of the recess array 1000. The depth of each recess 1001 is determined by a width of the recess 1001 W=2H/tan54.74°≈1.414H because the recess 1001 is surrounded by an Si (111) plane. (The symbol '≈' signifies 'is approximately equal to'.)

However, the width of each recess 1001 involves an error on the order of approximately 10 nm due to variation in mechanical accuracy even when an electronic-beam exposing device is used. Accordingly, it is not possible to make uniform heights of respective projections of a projection-type probe array made by using the recess array 1000.

Further, when a single-projection probe is made, the above-mentioned problem involved in manufacturing of a projection-type probe array does not arise. However, the following problems arise.

First, a tip of a projection is not pointed, but, actually, is worked to a plane, and, thus, the projection is shaped as a truncated cone or pyramid. When a truncated-cone-or-pyramid projection is made in the related art, as shown in FIG. 9A, first, a truncated-cone-or-pyramid recess 3001 is made. Then, as a result of this being transferred, a projection is made. At this time, a planarity of a tip of the projection reflects a planarity of a bottom of the above-mentioned recess. When the recess having a bottom surface 3002 is made, a time of anisotropic etching is controlled and the etching is stopped before the entirety of the plane constituting the recess 3001 becomes a (111) plane (no bottom surface remains). In this case, a planarity of the bottom surface 3002 may deteriorate much due to a hillock or the like produced.

A planarity equal to or less than λ/8 is needed for a tip of a projection-type probe, assuming that a wavelength of light to be emitted is λ, for example. However, a planarity of the bottom surface 3002 of the recess 3001 made in the related art is far from reaching this. Accordingly, it is not possible to make a satisfactory projection-type probe by the related art.

Further, as shown in FIG. 9B, there is a case where an etch stop layer 3003 is previously made, and a bottom surface 3002 is obtained, when a recess 3001 is made, without controlling a time of etching. In this case, because it is possible to obtain a satisfactory planarity of the etch stop layer 3003, it is possible to make a projection-type probe satisfactory in a planarity view point.

However, in this case, a diameter of an opening D of a projection to be made is determined by an opening width W of the recess 3001 and a depth H of the recess 3001. The depth H has a sufficient accuracy in a local planarity view point as described above. However, variation within a sheet of wafer or between wafers may be very large as much as on the order of hundreds of nanometers.

Accordingly, when recesses 3001 are made to have uniform opening widths W, diameters of bottom surfaces 3002 (that is, diameters of openings at tips of projections) vary depending on variation in depths H.

In order to cope therewith, an opening width W may be made to change correspondingly to a variation of a depth H. However, it is not possible to measure a depth H precisely. Furthermore, it is not possible to change a dimension of a photo mask, actually.

Thus, even manufacturing of a single-projection probe which does not need consideration of making uniform heights of a plurality of projections involves problems on dimension accuracy in the related art.

SUMMARY OF THE INVENTION

An object of the present invention is to provide an optical-pickup slider and a manufacturing method thereof in which it is possible to make an aperture, which is not likely to be destroyed, by a single time of etching, with high accuracy and high repeatability.

Further, in an actual optical pickup-head slider 10, a ski 51 as shown in FIG. 10A or a pad 52 as shown in FIG. 10B is provided, for a purpose of smooth floating of the head without adhering a recording medium. Another object of the present invention is to make the ski 51 or pad 52 with high accuracy and high repeatability.

Furthermore, in an optical pickup-head slider, an aperture less than a wavelength of light used for generating an optical near-field and the optical near-field generated only from the aperture as a result of the light being incident on the periphery thereof are used for reading and writing of marks on a recording medium. However, because a thickness of a portion having the aperture is on the order of 10 $\mu$m, light may be transmitted by a portion surrounding the aperture by a condition of a wavelength of the light. When the thus-transmitted light is incident on a recording medium, a dimension of each mark written there becomes larger and a recording density comes to be lowered, and S/N of a read signal comes to be lowered. Another object of the present invention is to solve these problems.

Another object of the present invention is to provide a probe and a manufacturing method thereof in which a dimensional accuracy is greatly improved.

Another object of the present invention is to provide a probe array having high efficiency and high resolution, and heights of respective projections are controlled to be uniform.

Another object of the present invention is to manufacture a probe array having high efficiency and high resolution, controlling heights of respective projections to make them uniform.

An optical-pickup slider according to the present invention is characterized in that a light-transmitting-property substrate is bonded to a surface of a layer having a tapered through hole, on which surface a larger opening of the tapered through hole exists. Thereby, it is possible to prevent the layer having an aperture from being destroyed.

It is preferable that the light-transmitting-property substrate has a thickness at least ten times a thickness of the layer. Thereby, it is possible to prevent the light-transmitting-property substrate and layer from being destroyed.

Further, it is preferable that glass or $TiO_2$ is used as a material of the light-transmitting-property substrate when a wavelength of light to be incident is on the order of 2 $\mu$m to the order of 0.4 $\mu$m, but quarz glass, MgO, $Al_2O_3$, $Y_2O_3$ or diamond is used as a material of the light-transmitting-property substrate when a wavelength of light to be incident is equal to or shorter than 0.4 $\mu$m. By thus changing the quality of material of the light-transmitting-property substrate in accordance with a wavelength of light to be input to the optical-pickup slider, it is possible to increase light transmittance.

An optical-pickup slider according to another aspect of the present invention is characterized in that a film of non-light-transmitting-property material is provided at least on an inclined surface of the abovementioned tapered through hole. Thereby, even when light is applied to the inclined surface of the hole providing an aperture, the light is blocked by the film of non-light-transmitting-property material, and, thereby, it is possible to generate only an optical near-field at the aperture on a recording-medium side. Thereby, it is possible to prevent a dimension of a writing mark from increasing so as to prevent a recording density from decreasing, and to prevent an S/N ratio of a read signal from decreasing.

It is preferable that the film of non-light-transmitting-property material is made of metal or resistivity-lowered semiconductor. Thereby, it is possible to block light positively.

Further, it may be that the non-light-transmitting film is made of eutectic of metal and the layer, or Si is used as a material of the layer and the film of non-light-transmitting-property material is formed as a result of resistivity of at least the inclined surface of the tapered through hole being lowered. Thereby, it is possible to easily form a light-blocking film and to block light positively.

An optical-pickup slider according to another aspect of the present invention comprises:
a first substrate;
a layer layered on the first substrate and having a thickness smaller than that of the first substrate, wherein:
a tapered through hole is made in the layer; and
after a light-transmitting-property substrate is bonded to a surface of the layer, the first substrate is removed so that an aperture at a tip of the tapered through hole is exposed.

In this arrangement, because the tapered through hole is made in the layer layered on the first substrate and having the thickness smaller than that of the first substrate, it is possible to make an aperture at a tip of the tapered through hole at high accuracy. Further, because the light-transmitting-property substrate is bonded to the surface of this layer and the layer having the aperture is supported by the light-transmitting-property substrate, the layer can be prevented from being destroyed. Furthermore, the first substrate is removed after the light-transmitting-property substrate is bonded to the surface of the layer, it is possible to stably expose the aperture with high dimensional accuracy at the tip of the tapered through hole of the layer.

An optical-pickup slider according to another aspect of the present invention comprises:
a first substrate;
a layer layered on the first substrate and having a thickness smaller than that of the first substrate, wherein:
a tapered through hole is made in the layer; and
after a light-transmitting-property substrate is bonded to a surface of the layer, the first substrate is removed, and, then, a ski shape or a pad shape is made at a position of an aperture at a tip of the tapered through hole in the layer.

Thereby, it is possible to make the ski shape or pad shape at high accuracy with high repeatability.

An optical-pickup slider according to another aspect of the present invention comprises:
a first substrate;
a layer layered on the first substrate and having a thickness smaller than that of the first substrate, wherein:
a ski shape or a pad shape having a tapered through hole is made in the layer; and
after a light-transmitting-property substrate is bonded to a surface of the layer,
the first substrate is removed so that an aperture at a tip of the tapered through hole is exposed.

Thereby, it is possible to make the high-accuracy ski shape or pad shape and the tapered through hole at the same time, and to simplify processes so as to reduce a cost.

An optical-pickup slider according to another aspect of the present invention comprises:
a first substrate;
a layer layered on the first substrate and having a thickness smaller than that of the first substrate, wherein:
a tapered through hole is made in the layer; and
after a film of a non-light-transmitting-property material is provided on at least an inclined surface of the tapered through hole, a light-transmitting-property substrate is bonded to a surface of the layer, and, after the first substrate is removed, a portion of the non-light-transmitting-property material is removed at an aperture at a tip of the tapered through hole so that the aperture is exposed.

By making the tapered through hole in the thin layer, and, after providing the film of the non-light-transmitting material at least on the inclined surface extending from the aperture of the tapered through hole, bonding the light-transmitting-property substrate to the surface of the layer, and removing the first substrate so as to expose the aperture at the tip of the tapered through hole, it is possible to easily form the film of non-light-transmitting-property material on the inclined surface of the tapered through hole having the aperture, and to improve a recording density and an S/N ratio of a read signal.

A method of manufacturing an optical-pickup slider according to the present invention comprises the steps of:
a) making a tapered through hole in a layer layered on a first substrate and having a thickness smaller than that of the first substrate; and
b) after bonding a light-transmitting-property substrate to a surface of the layer, removing the first substrate so as to expose an aperture at a tip of the tapered through hole.

In this arrangement, because the tapered through hole is made in the layer layered on the first substrate and having the thickness smaller than that of the first substrate, it is possible to make an aperture at a tip of the tapered through hole at high accuracy. Further, because the light-transmitting-property substrate is bonded to the surface of this layer and the layer having the aperture is supported by the light-transmitting-property substrate, the layer can be prevented from being destroyed. Furthermore, the first substrate is removed after the light-transmitting-property substrate is bonded to the surface of the layer, it is possible to stably expose the aperture with high dimensional accuracy at the tip of the tapered through hole of the layer.

A method of manufacturing an optical-pickup slider according to another aspect of the present invention comprises the steps of:
a) making a tapered through hole in a layer layered on a first substrate and having a thickness smaller than that of the first substrate; and
b) after bonding a light-transmitting-property substrate to a surface of the layer, removing the first substrate, and, then, making a ski shape or a pad shape at a position of an aperture at a tip of the tapered through hole.

Thereby, it is possible to make the ski shape or pad shape at high accuracy with high repeatability.

A method of manufacturing an optical-pickup slider according to another aspect of the present invention comprises the steps of:
a) making a ski shape or a pad shape having a tapered through hole in a layer layered on a first substrate and having a thickness smaller than that of the first substrate; and
b) after bonding a light-transmitting-property substrate to a surface of the layer, removing the first substrate so as to expose an aperture at a tip of the tapered through hole.

Thereby, it is possible to make the high-accuracy ski shape or pad shape and the tapered through hole at the same time, and to simplify processes so as to reduce a cost.

A method of manufacturing an optical-pickup slider according to another aspect of the present invention comprises the steps of:
a) making a tapered through hole in a layer layered on a first substrate and having a thickness smaller than that of the first substrate; and
b) after providing a film of a non-light-transmitting-property material on at least an inclined surface of the tapered through hole, bonding a light-transmitting-property substrate to a surface of the layer, and, after removing the first substrate, removing a portion of the non-light-transmitting-property material at an aperture at a tip of the tapered through hole so as to expose the aperture.

By making the tapered through hole in the thin layer, and, after providing the film of the non-light-transmitting material at least on the inclined surface extending from an aperture of the tapered through hole, bonding the light-transmitting-property substrate to the surface of the layer, and removing the first substrate so as to expose the aperture at the tip of the tapered through hole, it is possible to easily form the film of non-light-transmitting-property material on the inclined surface of the tapered through hole having the aperture, and to improve a recording density and an S/N ratio of a read signal.

A method of manufacturing an optical-pickup slider according to another aspect of the present invention comprises the steps of:
a) making a tapered through hole in a layer layered on a first substrate and having a thickness smaller than that of the first substrate; and
b) after forming eutectic of metal and the layer on at least an inclined surface of the tapered through hole, bonding a light-transmitting-property substrate to a surface of the layer, removing the first substrate so as to expose an aperture at a tip of the tapered through hole.

A method of manufacturing an optical-pickup slider according to another aspect of the present invention comprises the steps of:
a) making a tapered through hole in an Si layer layered on a first substrate and having a thickness smaller than that of the first substrate; and
b) after lowering resistivity of a surface of at least an inclined surface of the tapered through hole, bonding a light-transmitting-property substrate to a surface of the layer, removing the first substrate so as to expose an aperture at a tip of the tapered through hole.

Thereby, it is possible to easily form the film of non-light-transmitting-property material on the inclined surface of the tapered through hole having the aperture.

A probe according to the present invention comprises:
a substrate having a property of transmitting light; and
a projecting portion formed on the substrate, and made of a material having a refractive index higher than that of the substrate,
wherein the projecting portion has light from the substrate incident thereon, and generates one of or both an optical near-field and propagation light at a tip thereof.

In this arrangement, it is possible to greatly improve a dimension accuracy of the tip of the projecting portion.

A method of manufacturing a probe according to the present invention comprises the steps of:
a) bonding together a first substrate having a property of transmitting light and a second substrate comprising a high-refractive-index layer having a refractive index higher than that of the first substrate, an intermediate layer layered on the high-refractive-index layer and a supporting layer layered on the intermediate layer, in a condition in which the first substrate is in contact with the high-refractive-index layer;
b) removing the supporting layer included in the second substrate;

c) patterning by the intermediate layer exposed as a result of the supporting layer being removed;

d) etching the high-refractive-index layer using the patterned intermediate layer so as to form a cone-like or pyramid-like projecting portion on the first substrate; and e) removing the patterned intermediate layer so that the probe having the cone-like or pyramid-like projecting portion made from the high-refractive-index layer on the first substrate be obtained.

In this arrangement, it is possible to greatly improve a dimension accuracy of a tip of the projecting portion.

A method of manufacturing a probe according to another aspect of the present invention comprises the steps of:

a) bonding together a first substrate having a property of transmitting light and a second substrate comprising a supporting layer, an intermediate layer formed on the supporting layer and a GaP layer formed on the intermediate layer, in a condition in which the first substrate and the GaP layer are in contact with one another;

b) removing the supporting layer included in the second substrate;

c) patterning by the intermediate layer exposed as a result of the supporting layer being removed;

d) etching the GaP layer using the patterned intermediate layer so as to form a cone-like or pyramid-like projecting portion on the first substrate; and e) removing the patterned intermediate layer so that the probe having the cone-like or pyramid-like projecting portion made from the GaP layer on the first substrate be obtained.

In this arrangement, it is possible to greatly improve a dimension accuracy of a tip of the projecting portion.

A method of manufacturing a probe according to another aspect of the present invention comprises the steps of:

a) bonding together a first substrate having a property of transmitting light and a second substrate comprising a low-concentration layer having a refractive index higher than that of the first substrate and having a predetermined amount of impurities mixed therein and a high-concentration layer having impurities more than the predetermined amount of impurities mixed therein, in a condition in which the first substrate and the low-concentration layer are in contact with one another;

b) removing the high-concentration layer included in the second substrate;

c) forming a patterning material on a surface of the low-concentration layer exposed as a result of the high-concentration layer being removed and patterning by the patterning material;

d) etching the low-concentration layer exposed by the patterning so as to form a cone-like or pyramid-like projecting portion on the first substrate; and e) removing the patterned patterning material so that the probe having the cone-like or pyramid-like projecting portion made from the low-concentration layer on the first substrate be obtained.

In this arrangement, it is possible to greatly improve a dimension accuracy of a tip of the projecting portion.

A method of manufacturing a probe according to another aspect of the present invention comprises the steps of:

a) bonding together a first substrate having a property of transmitting light and a second substrate comprising a n-type Si layer having a refractive index higher than that of the first substrate and a p-type Si layer, in a condition in which the first substrate and the n-type Si layer are in contact with one another;

b) removing the p-type Si layer included in the second substrate;

c) forming a patterning material on a surface of the n-type Si layer exposed as a result of the p-type Si layer being removed and patterning by the patterning material;

d) etching the n-type Si layer using the patterned patterning material so as to form a cone-like or pyramid-like projecting portion on the first substrate; and e) removing the patterned patterning material so that the probe having the cone-like or pyramid-like projecting portion made from the n-type Si layer on the first substrate be obtained.

In this arrangement, it is possible to greatly improve a dimension accuracy of a tip of the projecting portion.

A method of manufacturing a probe according to another aspect of the present invention comprises the steps of:

a) bonding together a first substrate having a property of transmitting light and a second substrate comprising a high-concentration p-type Si layer having a refractive index higher than that of the first substrate and an n-type Si layer, in a condition in which the first substrate and the high-concentration p-type Si layer are in contact with one another;

b) removing the n-type Si layer included in the second substrate;

c) forming a patterning material on a surface of the high-concentration p-type Si layer exposed as a result of the n-type Si layer being removed and patterning by the patterning material;

d) etching the high-concentration p-type Si layer using the patterned patterning material so as to form a cone-like or pyramid-like projecting portion on the first substrate; and e) removing the patterned patterning material so that the probe having the cone-like or pyramid-like projecting portion made from the high-concentration p-type Si layer on the first substrate be obtained.

In this arrangement, it is possible to greatly improve a dimension accuracy of a tip of the projecting portion.

A probe array according to the present invention comprises:

a substrate having a property of transmitting light; and a plurality of projecting portions formed on the substrate, made of a material having a refractive index higher than that of the substrate, and like cones or pyramids having tips, positions of which are aligned, wherein each of the plurality of projecting portions has light from the substrate incident thereon, and generates one of or both an optical near-field and propagation light at a tip thereof.

In this arrangement, it is possible to emit light at high efficiency with high resolution.

A method of manufacturing a probe array according to the present invention comprises the steps of:

a) bonding together a first substrate having a property of transmitting light and a second substrate comprising a high-refractive-index layer having a refractive index higher than that of the first substrate, an intermediate layer layered on the high-refractive-index layer and a supporting layer layered on the intermediate layer, in a condition in which the first substrate is in contact with the high-refractive-index layer;

b) removing the supporting layer included in the second substrate;

c) patterning by the intermediate layer exposed as a result of the supporting layer being removed;

d) etching the high-refractive-index layer using the patterned intermediate layer so as to form a plurality of cone-like or pyramid-like projecting portions on the first substrate; and e) removing the patterned intermediate layer so that the probe array having the plurality of cone-like or pyramid-like projecting portions made from the high-refractive-index layer on the first substrate be obtained.

In this arrangement, it is possible to manufacture a probe array in which heights of respective projecting portions are controlled to be uniform by an intermediate layer.

A method of manufacturing a probe array according to another aspect of the present invention comprises the steps of:

a) bonding together a first substrate having a property of transmitting light and a second substrate comprising a supporting layer, an intermediate layer formed on the supporting layer and a GaP layer formed on the intermediate layer, in a condition in which the first substrate and the GaP layer are in contact with one another;

b) removing the supporting layer included in the second substrate;

c) patterning by the intermediate layer exposed as a result of the supporting layer being removed;

d) etching the GaP layer using the patterned intermediate layer so as to form a plurality of cone-like or pyramid-like projecting portions on the first substrate; and e) removing the patterned intermediate layer so that the probe array having the plurality of cone-like or pyramid-like projecting portions made from the GaP layer on the first substrate be obtained.

In this arrangement, it is possible to manufacture a probe array in which heights of respective projecting portions are controlled to be uniform by an intermediate layer.

A method of manufacturing a probe array according to another aspect of the present invention comprises the steps of:

a) bonding together a first substrate having a property of transmitting light and a second substrate comprising a low-concentration layer having a refractive index higher than that of the first substrate and having a predetermined amount of impurities mixed therein and a high-concentration layer having impurities more than the predetermined amount of impurities mixed therein, in a condition in which the first substrate and the low-concentration layer are in contact with one another;

b) removing the high-concentration layer included in the second substrate;

c) forming a patterning material on a surface of the low-concentration layer exposed as a result of the high-concentration layer being removed and patterning by the patterning material;

d) etching the low-concentration layer using the patterned patterning material so as to form a plurality of cone-like or pyramid-like projecting portions on the first substrate; and e) removing the patterned patterning material so that the probe array having the plurality of cone-like or pyramid-like projecting portions made from the low-concentration layer on the first substrate be obtained.

In this arrangement, it is possible to manufacture a probe array in which heights of respective projecting portions are controlled to be uniform by a patterning material.

A method of manufacturing a probe array according to another aspect of the present invention comprises the steps of:

a) bonding together a first substrate having a property of transmitting light and a second substrate comprising a n-type Si layer having a refractive index higher than that of the first substrate and a p-type Si layer, in a condition in which the first substrate and the n-type Si layer are in contact with one another;

b) removing the p-type Si layer included in the second substrate;

c) forming a patterning material on a surface of the n-type Si layer exposed as a result of the p-type Si layer being removed and patterning by the patterning material;

d) etching the n-type Si layer using the patterned patterning material so as to form a plurality of cone-like or pyramid-like projecting portions on the first substrate; and e) removing the patterned patterning material so that the probe array having the plurality of cone-like or pyramid-like projecting portions made from the n-type Si layer on the first substrate be obtained.

In this arrangement, it is possible to manufacture a probe array in which heights of respective projecting portions are controlled to be uniform by a patterning material.

A method of manufacturing a probe array according to another aspect of the present invention comprises the steps of:

a) bonding together a first substrate having a property of transmitting light and a second substrate comprising a high-concentration p-type Si layer having a refractive index higher than that of the first substrate and an n-type Si layer, in a condition in which the first substrate and the high-concentration p-type Si layer are in contact with one another;

b) removing the n-type Si layer included in the second substrate;

c) forming a patterning material on a surface of the high-concentration p-type Si layer exposed as a result of the n-type Si layer being removed and patterning by the patterning material;

d) etching the high-concentration p-type Si layer using the patterned patterning material so as to form a plurality of cone-like or pyramid-like projecting portions on the first substrate; and e) removing the patterned patterning material so that the probe array having the plurality of cone-like or pyramid-like projecting portions made from the high-concentration p-type Si layer on the first substrate be obtained.

In this arrangement, it is possible to manufacture a probe array in which heights of respective projecting portions are controlled to be uniform by a patterning material.

Other objects and further features of the present invention will become more apparent from the following detailed description when read in conjunction with the accompanying drawings.

BRIEF DESCRIPTION OF THE DRAWINGS

FIGS. 4A through 4G show a process chart of a process of manufacturing a near-field probe in the related art;

FIGS. 5A through 5G show a process chart of another process of manufacturing a near-field probe in the related art;

FIGS. 13A through 13F show a process chart of a process of manufacturing a slider in a second embodiment of the present invention;

FIGS. 23A through 23H show a process chart of a process of manufacturing a slider in a ninth embodiment of the present invention;

FIG. 34B showing a shape of the active layer obtained after 360 seconds elapses from the beginning of etching; FIG. 34C showing a shape of the active layer obtained after 540 seconds elapses from the beginning of etching; and FIG. 34D showing a shape of the active layer obtained after 750 seconds elapses from the beginning of etching);

FIG. 37B showing a shape of the active layer obtained after 150 seconds elapses from the beginning of etching; FIG. 37C showing a shape of the active layer obtained after 405 seconds elapses from the beginning of etching; and FIG. 37D showing a shape of the active layer obtained after 483 seconds elapses from the beginning of etching);

DETAILED DESCRIPTION OF THE PREFERRED EMBODIMENTS

In an optical pickup-head slider in each embodiment of the present invention, a glass substrate is bonded to a side opposite to a side having an aperture of a single-crystal Si (silicon) layer having a tapered hole passing therethrough, and thereby, the single-crystal Si layer having the aperture is prevented from being destroyed.

When this optical pickup-head slider is made, a tapered hole passing through a single-crystal Si layer is made by etching, the single-crystal Si layer being layered on a single-crystal Si substrate, having a (100) plane on a top side thereof and having a thickness smaller than that of the single-crystal Si substrate, a glass substrate is bonded to the surface of the single-crystal Si layer, and, then, the single-crystal Si substrate is removed so that an aperture of a tip of the tapered through hole of the single-crystal Si layer is exposed.

Figure 11A:
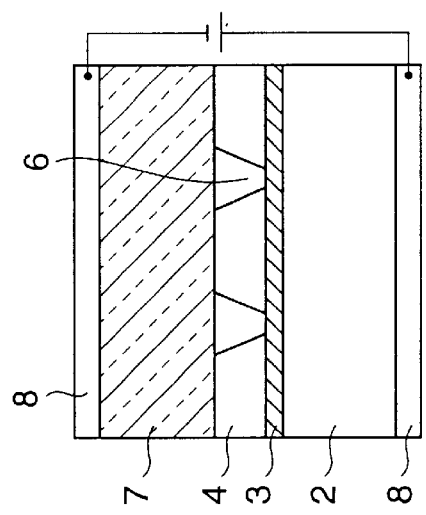
FIGS. 11A through 11F show a process chart of a process of manufacturing a slider in a first embodiment of the present invention.
Figure 11D:
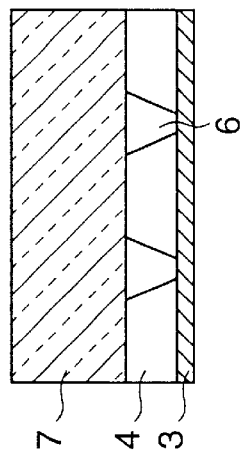

FIGS. 11A through 11F show a process of manufacturing an optical pickup-head slider (being simply referred to as a slider, hereinafter) in a first embodiment of the present invention. As shown in FIG. 11A, a so-called SOI substrate obtained as a result of an $SiO_2$ layer 3 having a thickness of approximately 1 μm and a single-crystal Si (silicon) layer 4 having a (100) plane on the top side thereof and having a thickness of approximately 10 μm being layered on a single-crystal Si substrate 2 having a thickness of hundreds of microns is used as a substrate 1. On the surface of the single-crystal Si layer 4, an $SiO_2$ layer having a thickness of hundreds of nanometers is layered. A portion of the $SiO_2$ layer 5 at which an opening is to be made is removed by photolithographic etching as shown in FIG. 11A. This portion of the SiO₂ layer 5 to be removed has a dimension determined such that an opening dimension of a bottom surface of a hole in an interface between the single-crystal Si layer 4 and SiO₂ layer 3 will be in the range of tens of nanometers to hundreds of nanometers. For example, in a case where a thickness of the single-crystal Si layer 4 is 't' and a dimension of the bottom of the hole in the interface between the single-crystal Si layer 4 and SiO₂ layer 3, that is, a dimension of a finally obtained aperture at which optical near-field is generated, is 'a', it is assumed that the opening is formed by alkaline crystal-axis anisotropic etching of silicon described later. In this case, the dimension D of the portion of the SiO₂ layer 5 to be removed is determined by the following equation.

$$D=(2t/\tan 54.74°)+a$$

For example, when a thickness of the single-crystal Si layer 4 is such that t=10 ($\mu$m), a dimension of the aperture is such that a=100 (nm)=0.1 ($\mu$m), a dimension of the portion of the SiO₂ layer to be removed is such that D=14.24 ($\mu$m). Then, as shown in FIG. 11B, alkaline etching is performed on the single-crystal Si layer 4. As an etchant at this time, a crystal-axis anisotropic etchant such as hydrazine ($N_2H_4 \cdot H_2O$), KOH, NaOH, CaOH, EDP (EthyleneDiamine Pyrocatechol (water)), TMAH (TetraMethyl AmmoniumHydroxide), $(CH_3)_4NOH$) or the like. A temperature of the etchant is to be on the order of 50° C. to 80° C. By such a crystal-axis anisotropic etchant, a tapered hole 6 passing through the single-crystal Si layer 4 surrounded by a (111) plane is formed. When a tip of this hole 6 is made to just be on the SiO₂ layer 3, a bottom surface of this hole 6 comes to have a square shape or a rectangular shape. A dimension of the previous patterning of the top SiO₂ layer 5 is determined such that one side of the square or rectangular shape will have a dimension in the range of tens of nanometers to hundreds of nanometers.

Figure 1:
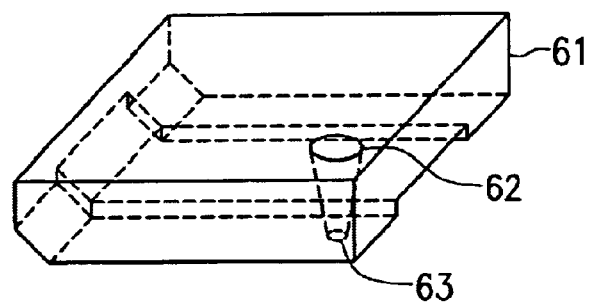
FIG. 1 shows a perspective view of a slider in the related art.
Figure 2:
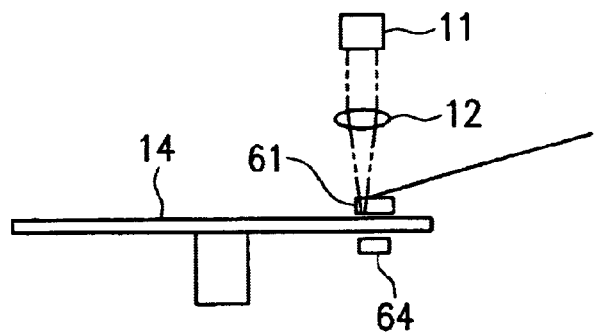
FIG. 2 shows an arrangement of an optical system using a slider in the related art.
Figure 3:
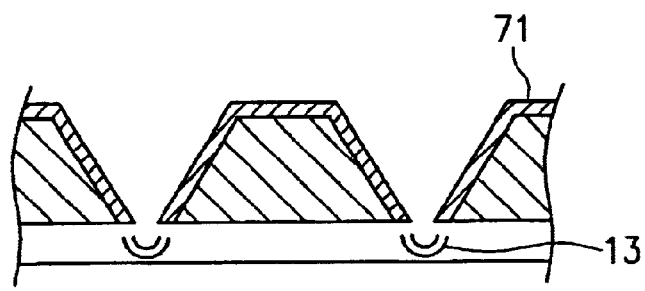
FIG. 3 shows an elevational sectional view of a near-field probe in the related art.
Figure 6D:
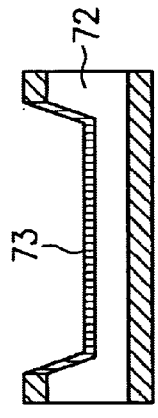
FIGS. 6A through 6G show a process chart of another process of manufacturing a near-field probe in the related art.
Figure 6E:
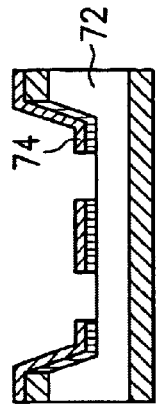
Figure 6F:
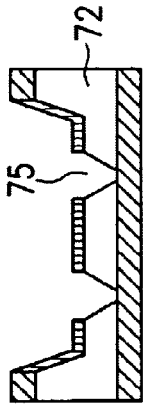
Figure 6G:
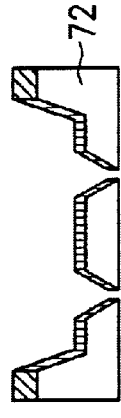
Figure 6A:
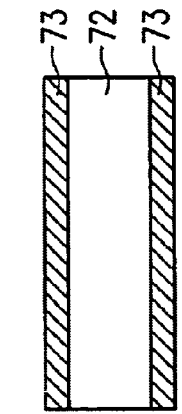
Figure 6B:
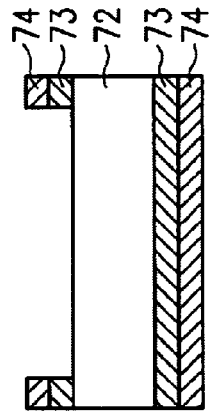
Figure 6C:
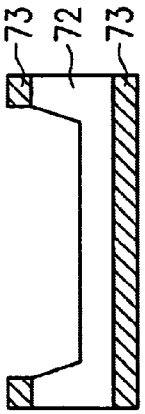
Figure 7D:
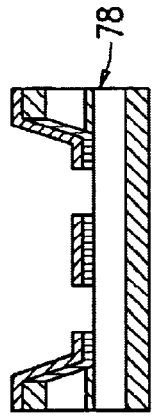
FIGS. 7A through 7G show a process chart of another process of manufacturing a near-field probe in the related art.
Figure 7E:
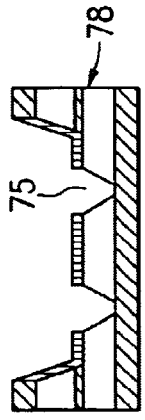
Figure 7F:
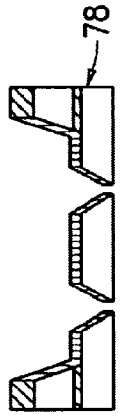
Figure 7G:
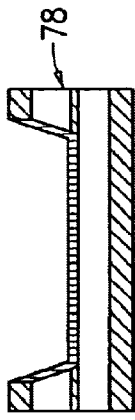
Figure 7A:
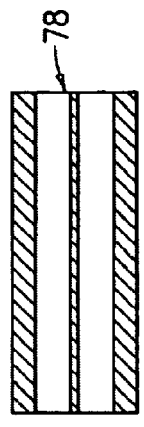
Figure 7B:
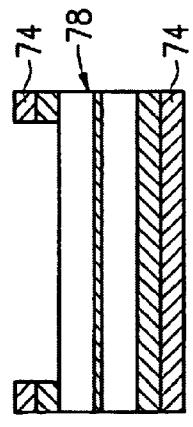
Figure 7C:
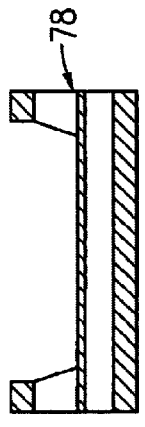
Figure 8:
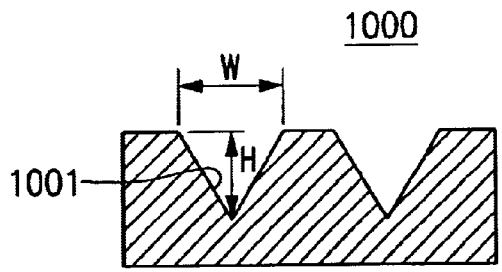
FIG. 8 shows an elevational sectional view of a recess-portion array used for manufacturing a probe array in the related art.
Figure 9A:
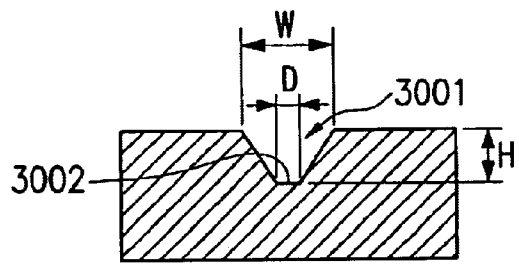
FIGS. 9A and 9B show elevational sectional views of other recess-portion arrays used for manufacturing a probe array in the related art.
Figure 9B:
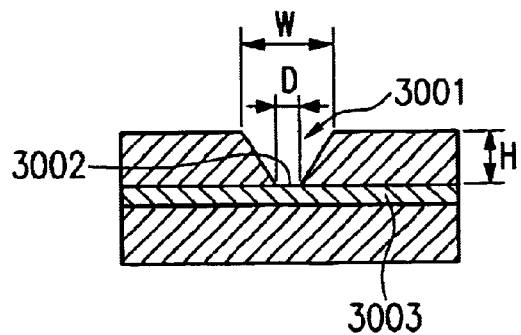

Then, as shown in FIG. 1C, the top SiO₂ layer is removed by hydrofluoric acid or the like. Then, as shown in FIG. 1D, a light-transmitting-property substrate, which is transparent for a wavelength of light to be used, such as a glass layer 7 is placed on the single-crystal Si layer 4, and, electrodes 8 are pressed onto the bottom surface of the single-crystal Si substrate 2 and the top surface of the glass layer 7. As a material of this light-transmitting-property substrate, glass or TiO₂ is used when a wavelength of light to be used is on the order of 2 $\mu$m to 0.4 $\mu$m, but quartz glass, MgO, $Ai_2O_3$ (sapphire), $Y_2O_3$, diamond or the like is used when a wavelength of light to be used is equal to or smaller than 0.4 $\mu$m, for example. When glass is used as a material of the light-transmitting-property substrate, #7740 or #7070 made by Corning Incorporated, the United States of America, is used as the glass layer 7, for example, and, a thickness thereof is at least in the range of 100 $\mu$m to several millimeters, and is larger than ten times that of the single-crystal Si layer 4. When this glass layer 7 has a thickness equal to or smaller than 100 $\mu$m, it is easy to crack, and, thereby, an yield decreases. Then, in a condition in which the thus-obtained combination is heated to 350° C. in a nitrogen gas or in a vacuum, a positive voltage on the order of 300 V is applied to the electrode 8 on the side of the single-crystal Si substrate 2 for a time on the order of 10 minutes. Thereby, it is possible to bond the glass layer 7 to the single-crystal Si layer 4. Further, although the SiO₂ layer 3 which is an insulating layer exists between the single-crystal Si substrate 2 and single-crystal Si layer 4, a current flows therethrough or leaks therearound because the temperature is high and the voltage is high, and thereby, a current necessary for the bonding flows. This bonding method is called anodic bonding.

After the glass layer 7 is bonded, the thus-obtained combination is again immersed in the alkaline etchant, and, as shown in FIG. 1E, the single-crystal Si substrate 2 is removed by alkaline etching. As the etchant, KOH, for example, erodes not only silicon but also SiO₂ which is a main component of glass. However, because the glass layer 7 is very thick, the entirety of the glass layer 7 is not eroded thereby. Further, because the single-crystal Si layer 4 and glass layer 7 are bonded together very firmly, the etchant does not enter therebetween. Accordingly, the single-crystal Si layer 4 is not eroded by the etching. Therefore, only the single-crystal Si substrate 2 is eroded by the etching. Further, because an etching rate of the SiO₂ layer 3 for the alkaline etchant is less than 1/100 of that of silicon, it is possible that etching is stopped when the single-crystal Si substrate 2 is removed completely by the etching. Then, as shown in FIG. 11F, the SiO₂ layer 3 is removed by hydrofluoric acid, and an aperture 9 is formed at a tip of the hole 6 of the single-crystal Si layer 4. Then, a dicing saw is used for cutting the thus-obtained combination and a slider 10 is obtained. When there is a possibility that chips produced at the time of cutting by the dicing saw stop the aperture 9, in order to avoid such a situation, cutting by the dicing saw is performed before the SiO₂ layer 3 is removed. In this case, it is possible to prevent chips from stopping the aperture 9 because the SiO₂ layer 3 exists, and, after the cutting, the SiO₂ layer 3 is removed by hydrofluoric acid.

Figure 12:
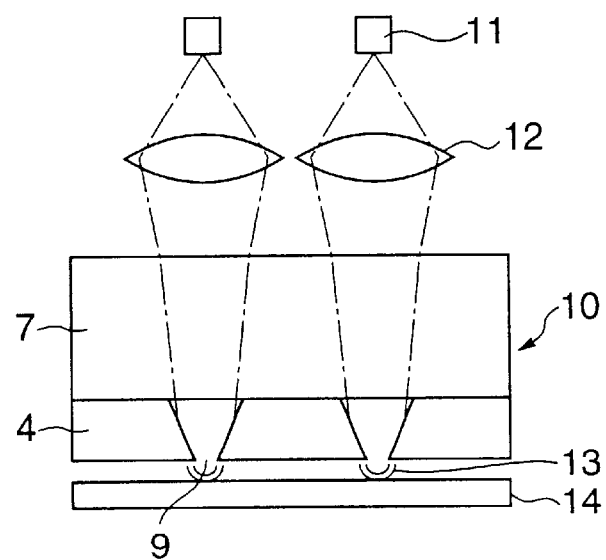
FIG. 12 shows an arrangement of an optical system employing the above-mentioned slider in the first embodiment of the present invention.

The thus-made slider 10 is used as follows: As shown in FIG. 12, laser light emitted by a light source 11 provided on the glass-layer-7 side is gathered by a lens 12 and is incident on the aperture 9. A near-field light 13 oozes out from the aperture 9 which is minute and equal to or smaller than a wavelength of the laser light, on the side opposite to the glass layer 7, and it is possible to write a mark having a size approximately equal to or smaller than the diameter of the aperture 9 onto a recording medium 14 which approaches the slider 10 to a distance approximately equal to the diameter of the aperture 9, and read such a mark.

The thus-made slider 10 has the following feature. An accuracy in thickness of the single-crystal Si layer 4 having a thickness of on the order of tens of microns is far higher than an accuracy in thickness of the single-crystal Si substrate 2 having a thickness on the order of hundreds of microns. Accordingly, it is possible to make the aperture 9 with high dimensional accuracy. Further, when patterning is performed and a pattern is obtained from the SiO₂ layer 5 for making the aperture 9, no puddle of resist is produced because no step exists in the periphery, and, therefore, it is possible to form an opening with high accuracy. Further, because the single-crystal Si layer 4 is supported by the glass layer 7 having a thickness of hundreds of microns, it is possible to prevent the single-crystal Si layer 4 having a thickness on the order of tens of microns from being destroyed. Further, only a single process of patterning by photolithographic etching is needed, and, processes are simplified and a cost can be saved.

As the glass layer 7, SW-3 made by Asahi Techno Glass Corporation (IWAKI Glass) or the like may also be used, in the above-described embodiment.

In the above-described embodiment, an SOI substrate is used as a substrate 1. A second embodiment in which a substrate other than an SOI substrate is used will now be described.

In the second embodiment, as shown in FIG. 13A, a substrate 21 is obtained as a result of an n-type Si layer 23 having a (100) plane on the top side thereof and having a thickness of tens of microns being layered on a p-type Si substrate 22 having a thickness of hundreds of microns, the substrate 21 having an $SiO_2$ layer 24 having a thickness of hundreds of nanometers on the surface of the n-type Si layer 23. A portion of the $SiO_2$ layer 24 at which an opening is formed is removed by photolithographic etching, as shown in FIG. 13A. A dimension of this portion of the $SiO_2$ layer 24 to be removed is determined such that an aperture dimension of a bottom surface of a hole in an interface between the n-type Si layer 23 and p-type Si layer 22 will be in the range of tens of nanometers to hundreds of nanometers. A method of determining a dimension of the portion of the $SiO_2$ layer 24 to be removed may be the same as that used in making of the first embodiment. Then, as shown in FIG. 13B, etching is performed on the n-type Si layer 23 by alkaline etching. An etchant used at this time is a crystal-axis anisotropic etchant the same as that used in making the first embodiment. A temperature of the etchant is in the range of 50° C. to 80° C. Thereby, a tapered hole 25 passing through the n-type Si layer 23 surrounded by a (111) plane is formed. When a tip of this hole 25 is made to just be on a boundary between the n-type Si layer 23 and p-type Si substrate 22, this hole 25 comes to have a square shape or a rectangular shape on the boundary, one side of the square or rectangular shape having a dimension in the range of tens of nanometers to hundreds of nanometers. A dimension of the previous patterning of the top $SiO_2$ layer 24 is determined such that one side of the square or rectangular shape will have a dimension in the range of tens of nanometers to hundreds of nanometers.

Then, as shown in FIG. 13C, the top $SiO_2$ layer 24 is removed by hydrofluoric acid or the like. Then, as shown in FIG. 13D, a glass layer 7 is placed on the n-type Si layer 23, and electrodes 8 are pressed onto the bottom surface of the p-type Si substrate 22 and the top surface of the glass layer 7. #7740 or #7070 made by Corning Incorporated, the United States of America, for example, is used as the glass layer 7, and, a thickness thereof is on the order of 100 $\mu$m to several millimeters. Then, in a condition in which the thus-obtained combination is heated to 350° C. in a nitrogen gas or in a vacuum, a positive voltage on the order of 300 V is applied to the electrode 8 on the p-type Si substrate 22 for a time on the order of 10 minutes. Thereby, the glass layer 7 is bonded to the n-type Si layer 23.

Figure 14:
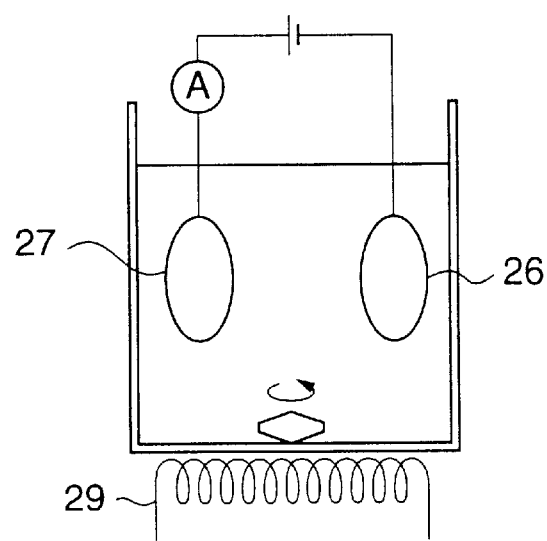
FIG. 14 roughly shows an etching arrangement for removing a p-type Si layer in the second embodiment.

After this glass layer 7 is bonded, the thus-obtained combination is immersed in the alkaline etchant again, and, as shown in FIG. 13E, the p-type Si substrate 22 is removed by the alkaline etchant. At this time, etching is performed, a voltage being applied between the n-type Si substrate 23 and a reference electrode 26 placed in the etchant. An arrangement for this etching is roughly shown in FIG. 14. Specifically, an Si wafer 27 having the glass layer 7 bonded thereto is immersed in an etchant such as hydrazine ($N_2H_4.H_2O$), KOH, or the like, for example. Then, a voltage is applied between the Si wafer 27 and the reference electrode 26 made of Pt and etching is performed, while the etchant is heated by a heater 29 and is stirred. Such a method of etching is called electrochemical etching. By this etching, the p-type Si substrate 22 is removed. KOH, for example, erodes not only silicon but also $SiO_2$ which is a main component of glass. However, because the glass layer 7 is very thick, the entirety of the glass layer 7 is not eroded. Further, because the n-type Si layer 23 and glass layer 7 are bonded together very firmly, the etchant does not enter therebetween. Accordingly, the n-type Si layer 23 is not eroded by the etching. Therefore, only the p-type Si substrate 22 is eroded by the etching. Further, in electrochemical etching, etching hardly advances further when the n-type Si layer 23 is exposed. Accordingly, it is possible for etching to stop when the p-type Si substrate 22 is completely eroded by the etching. Then, as shown in FIG. 13F, the thus-obtained combination is cut by a dicing saw to a desired size and a slider 10 having an aperture 9 is obtained.

As the glass layer 7, SW-3 made by Asahi Techno Glass Corporation (IWAKI glass) or the like may also be used, in the above-described embodiment.

A third embodiment in which a substrate obtained as a result of a low-concentration p-type or n-type Si layer being layered on a high-concentration p-type or n-type Si substrate is used will now be described making reference to a process chart shown in FIGS. 15A through 15E.

Figure 15A:
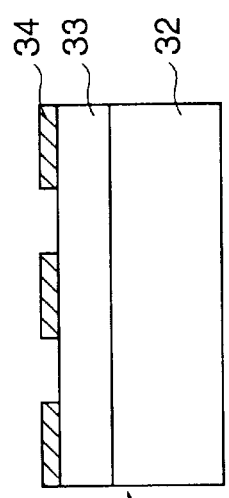
FIGS. 15A through 15E show a process chart of a process of manufacturing a slider in a third embodiment of the present invention.

As shown in FIG. 15A, a substrate 31 is obtained as a result of a low-concentration p-type or n-type Si layer 33 having a (100) plane on the top side thereof and having a thickness of tens of microns being layered on a high-concentration p-type or n-type Si substrate 32 having a thickness of hundreds of microns, the substrate 31 having an $SiO_2$ layer 34 having a thickness of hundreds of nanometers on the surface of the low-concentration Si layer 33. Here, it is important that respective impurity concentrations of the high-concentration Si substrate 32 and low-concentration Si layer 33 are high and low. Any combinations of p-type Si and n-type Si are possible, however, it is preferable that the low-concentration Si layer 33 is of n-type Si. A reason therefor is that, when a glass layer 7 is bonded by anodic bonding, bonding can be easily made when a p-n junction is forwardly biased at a time of voltage being applied. Further, the impurity concentration of the high-concentration Si substrate 32 should be higher than approximately $10^{17}/cm^3$, and the impurity concentration of the low-concentration Si layer 33 should be equal to or lower than approximately $10^{17}/cm^3$.

Figure 15B:
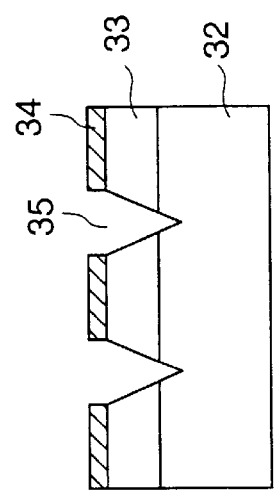

A portion of the $SiO_2$ layer 34 at which an aperture will be made is removed by photolithographic etching as shown in FIG. 15A. A dimension of the portion of the $SiO_2$ layer 34 to be removed is determined such that a dimension of the aperture is in the range of tens of nanometers to hundreds of nanometers. Then, as shown in FIG. 15B, etching is performed on the low-concentration Si layer 33 by alkaline etching. An etchant at this time, the crystal-axis anisotropic etchant same as that used in making the above-described first and second embodiment is used. A temperature of the etchant is in the range of 50° C. to 80° C. Thereby, a tapered hole 5 passing through the low-concentration Si layer 33 surrounded by a (111) plane is obtained. When a tip of the hole 35 comes to be on a boundary between the low-concentration Si layer 33 and high-concentration Si substrate 32, the hole 35 has a square or rectangular shape on the boundary, a dimension of one side of the square or rectangular shape being in the range of tens of nanometers to hundreds of nanometers. A dimension of the previous patterning of the top $SiO_2$ layer 34 is determined such that one side of the square or rectangular shape of the hole 35 on the boundary will have a dimension in the range of tens of nanometers to hundreds of nanometers.

Figure 15C:
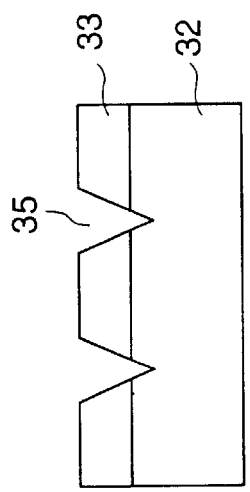
Figure 15D:
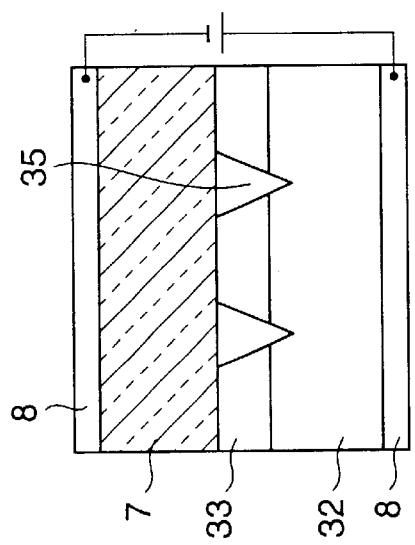

Then, as shown in FIG. 15C, the top $SiO_2$ layer 34 is removed by hydrofluoric acid or the like. Then, as shown in FIG. 15D, a glass layer 7 is placed on the low-concentration Si layer 33, and electrodes 8 are pressed onto the bottom surface of the high-concentration Si substrate 32 and the top surface of the glass layer 7. Then, a voltage is applied to the electrodes 8, and, thus, the glass layer 7 is bonded to the low-concentration Si layer 33 by anodic bonding.

Figure 15E:
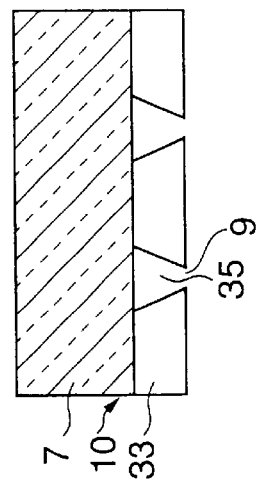

After the glass layer 7 is bonded, the thus-obtained combination is immersed in a hydrofluoric-acid-and-nitric-acid etchant. A composition of the etchant is as follows: $HF:HNO_3:H_2O = 1:3:8$ (volume ratio) or $HF:HNO_3:CH_3COOH=1:3:8$ (volume ratio). When this etchant is used, an etching rate is lowered to 1/150, in a case where an impurity concentration of Si is lower than $10^{17}/cm^3$, of that in a case where an impurity concentration Si is higher than $10^{17}/cm^3$. This etchant erodes not only silicon but also $SiO_2$ which is a main component of glass. However, because the glass layer 7 is very thick, the entirety of the glass layer 7 is not eroded. Further, because the low-concentration Si layer 33 and glass layer 7 are bonded together very firmly, the etchant does not enter therebetween. Accordingly, the low-concentration Si layer 33 is not eroded by the etching. Therefore, only the high-concentration Si substrate 32 is eroded by the etching. Although the high-concentration Si substrate 32 is removed by etching and thus the low-concentration Si layer 33 is exposed, the etching hardly advances further. Accordingly, it is possible for etching to stop when the high-concentration Si substrate 32 is completely eroded by the etching. Then, as shown in FIG. 15E, the thus-obtained combination is cut by a dicing saw to a desired size and a slider 10 having an aperture 9 is obtained.

As the glass layer 7, SW-3 made by Asahi Techno Glass Corporation (IWAKI Glass) or the like may also be used, in the above-described embodiment.

A fourth embodiment employing a substrate obtained as a result of a high-concentration p-type Si layer being layered on an n-type Si substrate will now be described making reference to a process chart shown in FIGS. 16A through 16E.

Figure 16D:
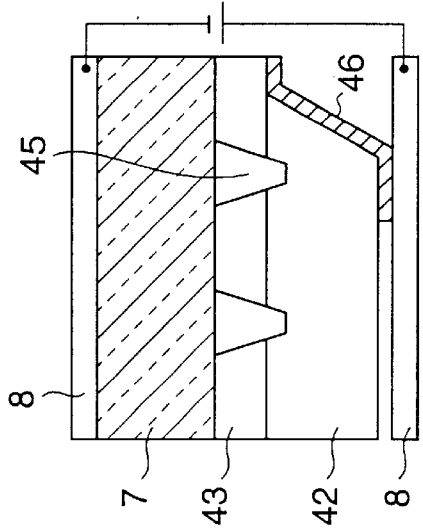
FIGS. 16A through 16E show a process chart of a process of manufacturing a slider in a fourth embodiment of the present invention.
Figure 16E:
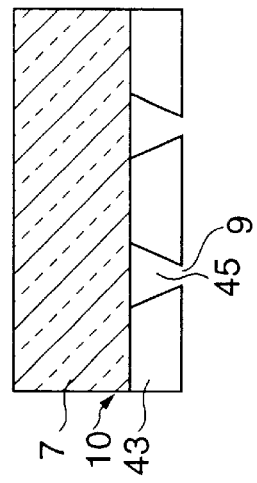
Figure 16A:
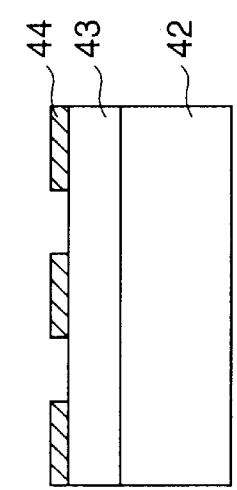

As shown in FIG. 16A, a substrate 41 is obtained as a result of a high-concentration p-type Si layer 43 having a (100) plane on the top side thereof and having a thickness of tens of microns being layered on an n-type Si substrate 42 having a thickness of hundreds of microns, the substrate 41 having an $SiO_2$ layer 44 having a thickness of hundreds of nanometers on the surface of the high-concentration p-type Si layer 43. The high-concentration p-type Si layer 43 has an impurity concentration higher than approximately $10^{20}/cm^3$ when KOH is used for etching of the n-type Si substrate 42, however, has an impurity concentration higher than approximately $10^{19}/cm^3$ when EDP is used for etching of the n-type Si substrate 42.

Figure 16B:
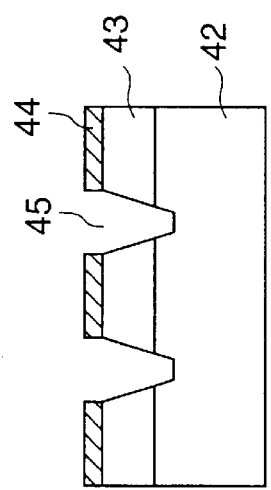

Then, a portion of the $SiO_2$ layer 44 at which an aperture will be made is removed by photolithographic etching as shown in FIG. 16A. A dimension of this portion of the $SiO_2$ layer 44 to be removed is determined such that a dimension of the aperture will be in the range of tens of nanometers to hundreds of nanometers. Then, as shown in FIG. 16B, etching is performed on the high-concentration p-type Si layer 43 by a hydrofluoric-acid-and-nitric-acid etchant or RIE. Thereby, a reverse truncated cone or pyramid shaped hole 45 surrounded by a (111) plane is obtained. The etching is performed so that aperture having a dimension of tens of nanometers to hundreds of nanometers is obtained on a boundary between the high-concentration p-type Si layer 43 and n-type Si substrate 42 at a tip of this hole 45.

Figure 16C:
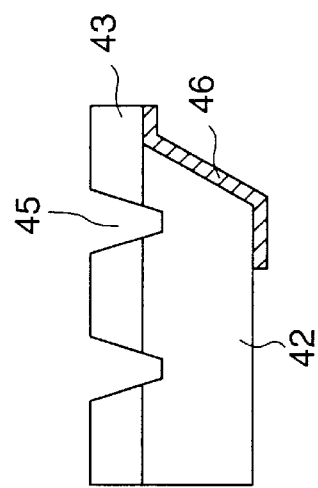

Then, as shown in FIG. 16C, the top $SiO_2$ layer 44 is removed by hydrofluoric acid or the like. Then, a portion of the n-type Si substrate 42 is removed and an electrode 46 is formed so that a voltage is applied to the high-concentration p-type Si layer 43 at a time of anodic bonding. Then, as shown in FIG. 16D, a glass layer 7 is placed on the high-concentration p-type Si layer 43, and electrodes 8 are pressed onto the bottom surface of the electrode 46 and the top surface of the glass layer 7. Then, a voltage is applied to the electrodes 8, and, thus, the glass layer 7 is bonded to the high-concentration p-type Si layer 43 by anodic bonding. Then, the electrode 46 is removed, and, the thus-obtained combination is immersed in an alkaline etchant, the n-type Si substrate 42 being thereby removed by etching. In this etching, etching hardly advances further when the high-concentration p-type Si layer 43 is exposed. Accordingly, it is possible for etching to stop when the n-type Si substrate 42 is completely eroded by the etching. Then, as shown in FIG. 16E, the thus-obtained combination is cut by a dicing saw to a desired size and a slider 10 having an aperture 9 is obtained.

As the glass layer 7, SW-3 made by Asahi Techno Glass Corporation (IWAKI Glass) or the like may also be used, in the above-described embodiment.

A fifth embodiment in which a ski or a pad is made on a slider 10 in each of the above-described embodiments will now be described making reference to the process chart shown in FIGS. 11A through 11F and a process chart shown in FIGS. 17A through 17D, 17E through 17H, 18A through 18D and 18E through 18H.

Figure 11E:
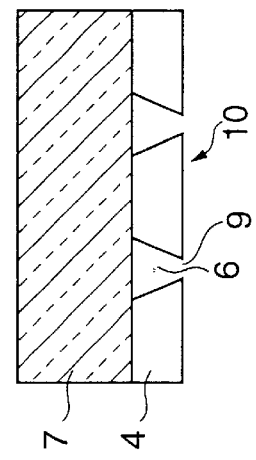
Figure 11B:
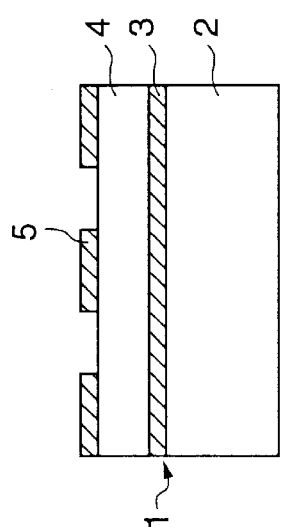
Figure 11C:
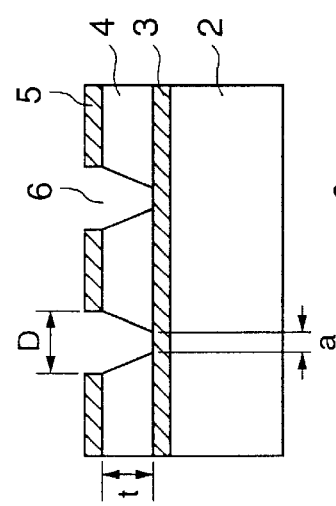
Figure 11F:
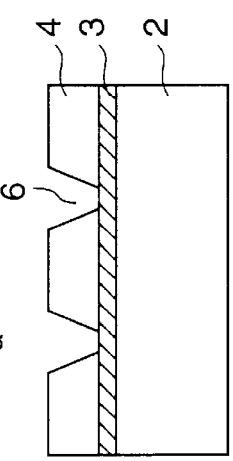
Figure 17A:
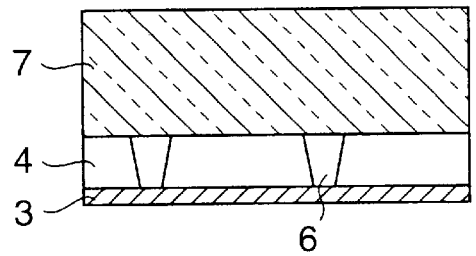
FIGS. 17A through 17D and 17E through 17H show a process chart of a process of manufacturing a slider in a fifth embodiment of the present invention.
Figure 17E:
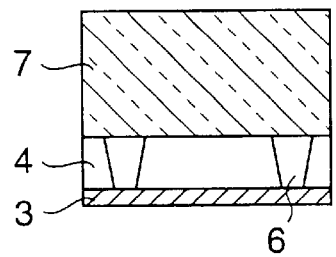
Figure 17B:
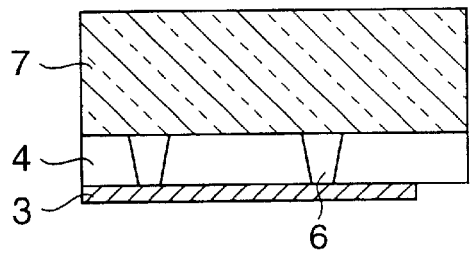
Figure 17F:
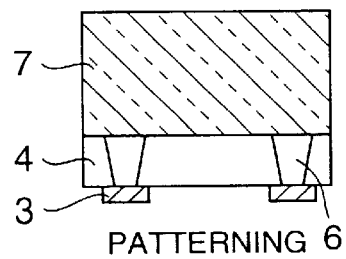
Figure 17C:
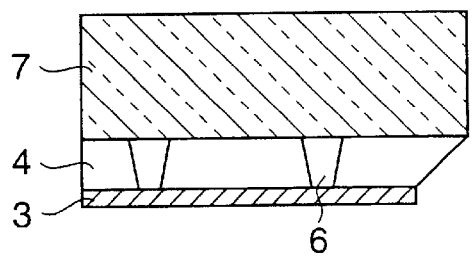
Figure 17G:
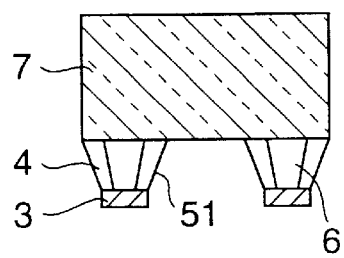
Figure 17D:
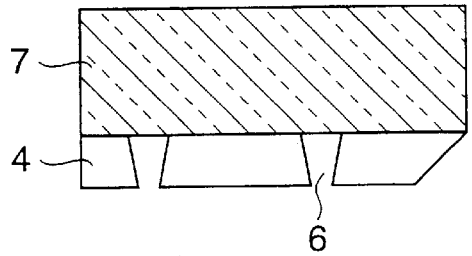
Figure 17H:
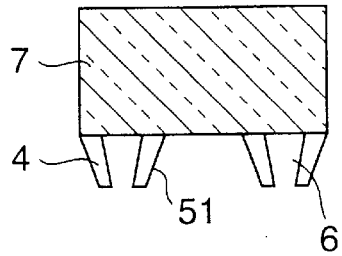
Figure 18A:
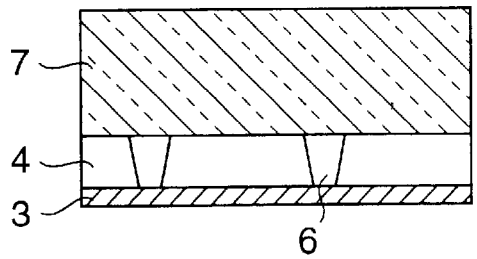
FIGS. 18A through 18D and 18E through 18H show a process chart of a process of manufacturing a slider in a variant embodiment of the fifth embodiment of the present invention.
Figure 18E:
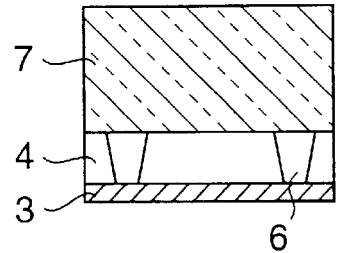
Figure 18B:
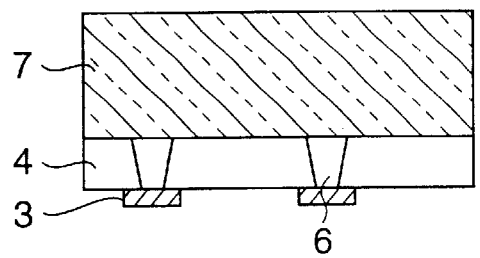
Figure 18F:
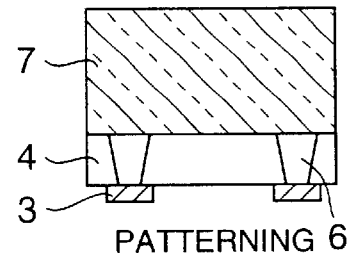
Figure 18C:
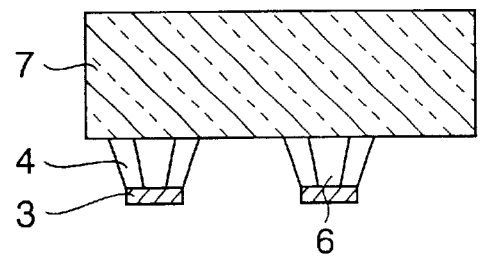
Figure 18G:
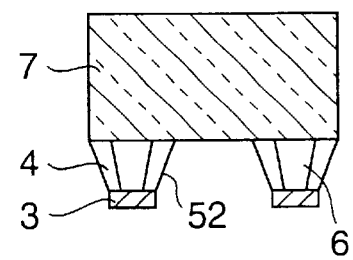
Figure 18D:
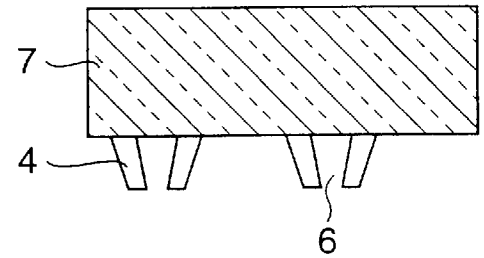
Figure 18H:
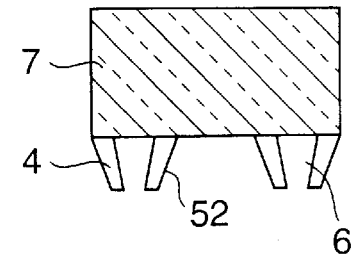

The single-crystal Si substrate 2 is removed by etching with the alkaline etchant in the first embodiment shown in FIG. 11E for example, and, then, in a condition in which, as shown in FIGS. 17A and 17E, the $SiO_2$ layer 3, single-crystal Si layer 4 having the hole 6 and glass layer 7 are layered, patterning is performed and a pattern is obtained from the $SiO_2$ layer 3, as shown in FIGS. 17B and 17F, so that a shape of a ski will be obtained. Then, as shown in FIGS. 17C and 17G, etching is performed on the single-crystal Si layer 4 by an alkaline etchant, and a shape of a ski 51 is formed. An etchant used for forming the shape of the ski 51 is not necessary to be an alkaline etchant as long as the etchant can erode the single-crystal Si layer 4. Then, as shown in FIGS. 17D and 17H, the $SiO_2$ layer 3 is removed, and, thus, the ski 51 having an aperture 9, a dimension of one side thereof being in the range of tens of nanometers to hundreds of nanometers can be obtained. Thus, it is possible to provide the aperture 9 at a position nearest to a recording medium 14. Thereby, it is possible to increase an efficiency in coupling of a optical near-field to the recording medium 14.

As the glass layer 7, SW-3 made by Asahi Techno Glass Corporation (IWAKI Glass) or the like may also be used, in the above-described embodiment.

Figure 10A:
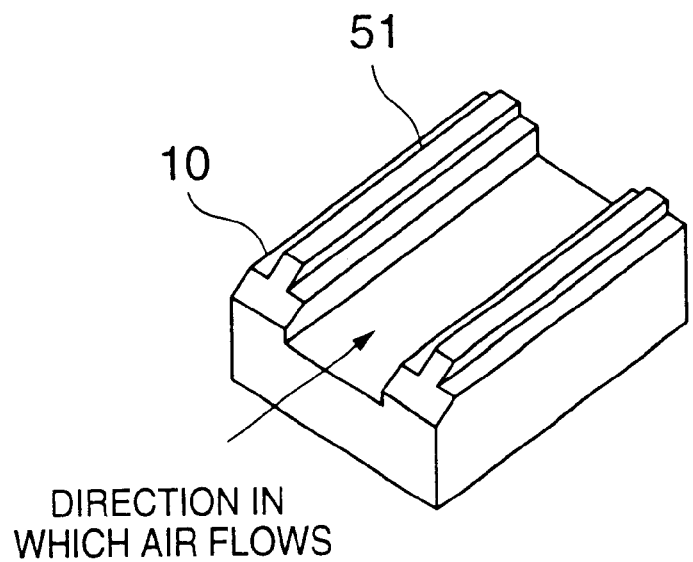
FIGS. 10A and 10B show perspective views of sliders having skies and pads.
Figure 10B:
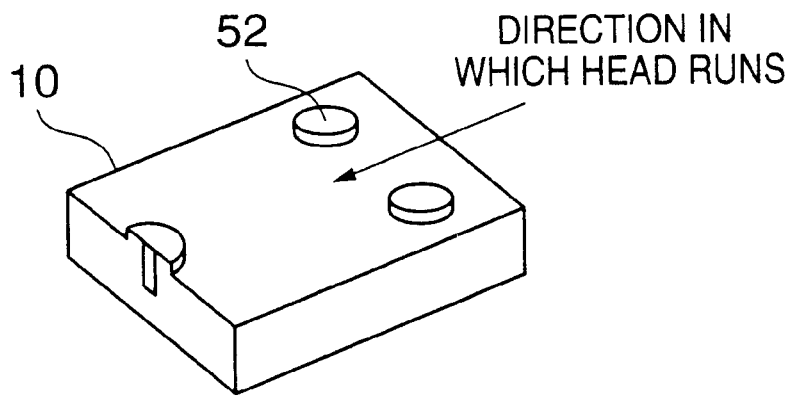

The fifth embodiment is such that the ski 51 is made. However, it is also possible to make a pad 52 shown in FIG. 10B in the same manner, as shown in FIGS. 18A through 18D and 18E through 18H.

As the glass layer 7, SW-3 made by Asahi Techno Glass Corporation (Iwaki Glass) or the like may also be used, in the this embodiment.

Further, the fifth embodiment is such that the first embodiment is applied to. However, it is also possible to apply the aspect of the fifth embodiment to any one of the second, third and fourth embodiments in the same manner.

In the fifth embodiment, the glass layer 7 is bonded after the hole 6 providing the aperture 9 is formed, and, then, the ski 51 is formed. However, it is also possible to form the hole 6 providing the aperture 9 and the ski at the same time. A sixth embodiment in which a hole 6 providing an aperture 9 and a ski 51 are formed simultaneously will now be described making reference to a process chart shown in FIGS. 19A through 19E and 19F through 19J and the process chart shown in FIGS. 11A through 11F.

Figure 19A:
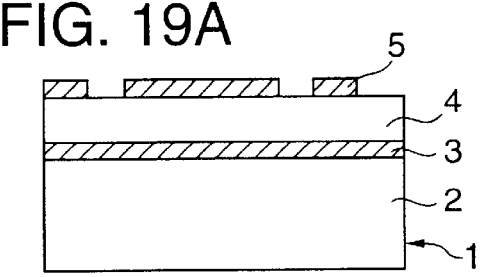
FIGS. 19A through 19E and 19F through 19J show a process chart of a process of manufacturing a slider in a sixth embodiment of the present invention.
Figure 19F:
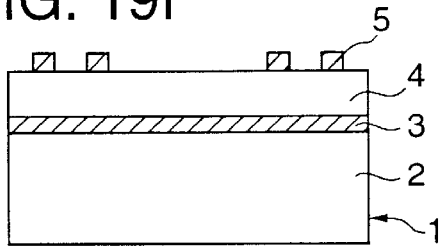
Figure 19B:
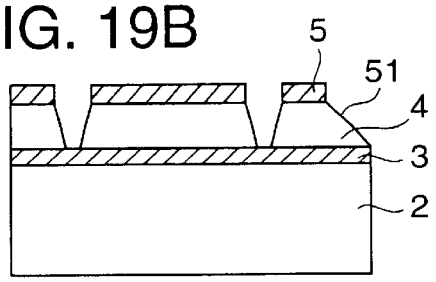
Figure 19G:
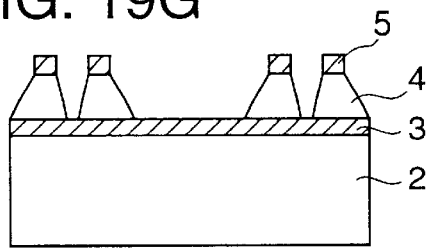
Figure 19C:
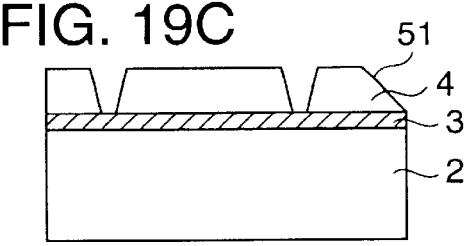
Figure 19H:
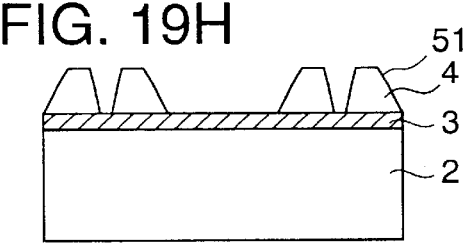
Figure 19D:
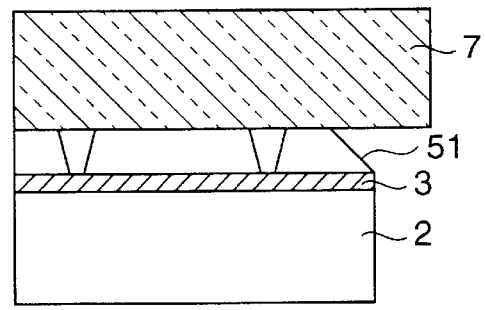
Figure 19I:
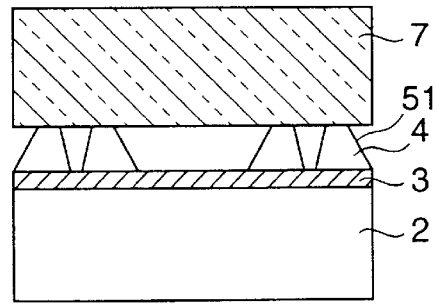
Figure 19E:
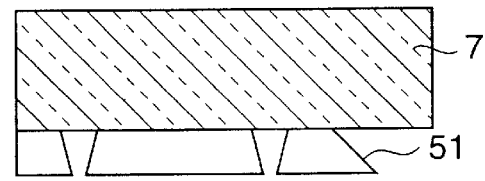
Figure 19J:
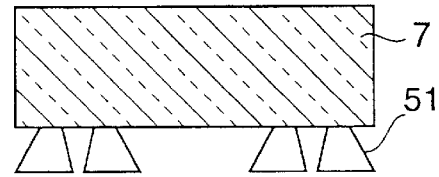
Figure 20A:
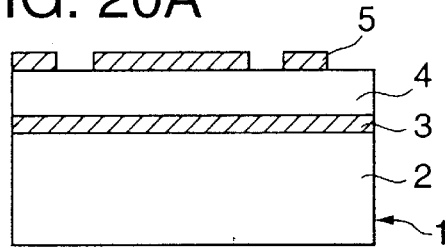
FIGS. 20A through 20E and 20F through 20J show a process chart of a process of manufacturing a slider in a variant embodiment of the sixth embodiment of the present invention.
Figure 20F:
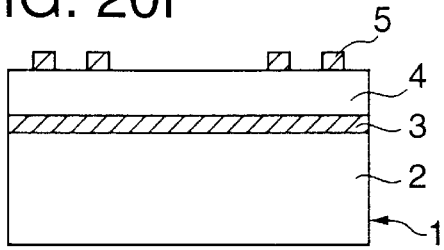
Figure 20B:
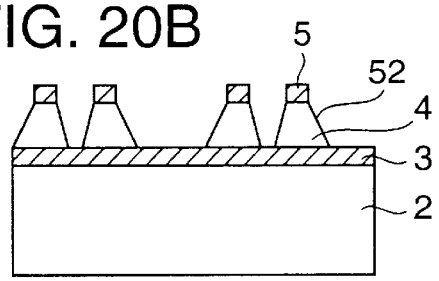
Figure 20G:
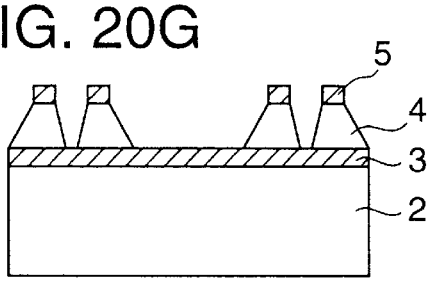
Figure 20C:
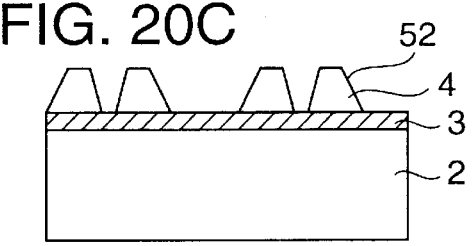
Figure 20H:
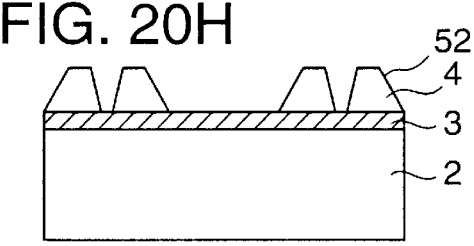
Figure 20D:
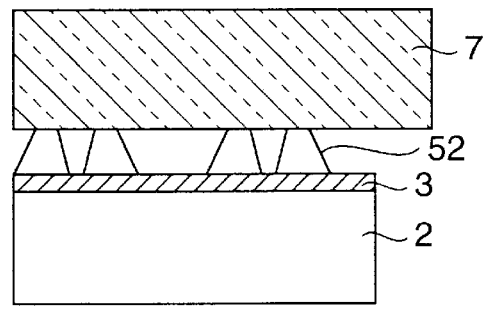
Figure 20I:
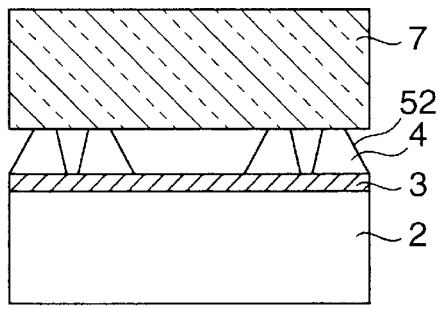
Figure 20E:
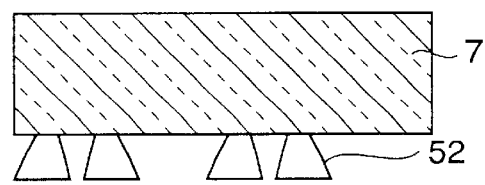
Figure 20J:
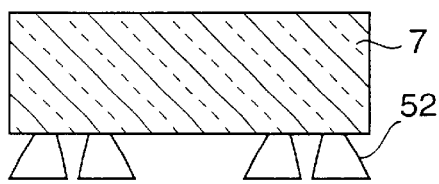

As shown in FIGS. 19A and 19F, a so-called SOI substrate is used, obtained as a result of an SiO$_2$ layer 3 having a thickness of approximately 1 μm and a single-crystal Si layer 4 having a (100) plane on the top side thereof and having a thickness of approximately 10 μm being layered on a single-crystal Si substrate 2 having a thickness of hundreds of microns, and, an SiO$_2$ layer 5 of the substrate 1 which has the SiO$_2$ layer 5 having a thickness of hundreds of nanometers on the surface of the single-crystal Si layer 4 is partially removed by photolithographic etching for making a ski. At the same time, the SiO$_2$ layer 5 is removed at a portion at which an aperture 9 will be made. Then, as shown in FIGS. 19B and 19G, etching is performed on the single-crystal Si layer 4 by alkaline etching. Thereby, a shape of the ski 51 surrounded by a (111) plane is obtained. Further, as shown in FIG. 11B, a tapered hole 6 passing through the single-crystal Si layer 4 surrounded by a (111) plane is obtained. Then, as shown in FIGS. 19C and 19H, the top SiO$_2$ layer 5 is removed. Then, as shown in FIGS. 19D and 19I, a glass layer 7 is bonded to the single-crystal Si layer 4 by anodic bonding, then, as shown in FIGS. 19E and 19J, the single-crystal Si substrate 2 is removed by alkaline etching, and, thus, the ski 51 having the aperture 9 is made. Thus, it is possible to make the aperture 9 and ski 51 with high accuracy.

As the glass layer 7, SW-3 made by Asahi Techno Glass Corporation (IWAKI Glass) or the like may also be used, in the above-described embodiment.

The sixth embodiment is such that the ski 51 is made. However, it is also possible to make a pad 52 shown in FIG. 10B in the same manner, as shown in FIGS. 20A through 20E and 20F through 20J.

As the glass layer 7, SW-3 made by Asahi Techno Glass Corporation (Iwaki Glass) or the like may also be used, in this embodiment.

Further, the fifth embodiment is such that the first embodiment is applied to. However, it is also possible to apply the aspect of the fifth embodiment to any one of the second, third and fourth embodiments in the same manner.

A seventh embodiment in which a non-light-transmitting-property material is formed around an aperture 9 in a slider 10 so that light is prevented from being transmitted by a portion surrounding the aperture 9 will now be described making reference to a process chart shown in FIGS. 21A through 21H.

Figure 21A:
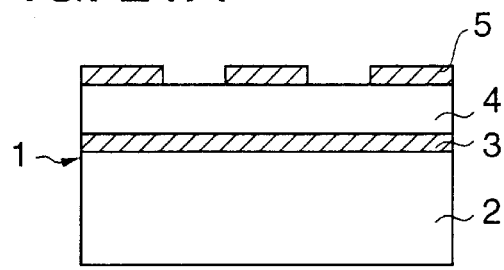
FIGS. 21A through 21H show a process chart of a process of manufacturing a slider in a seventh embodiment of the present invention.
Figure 21B:
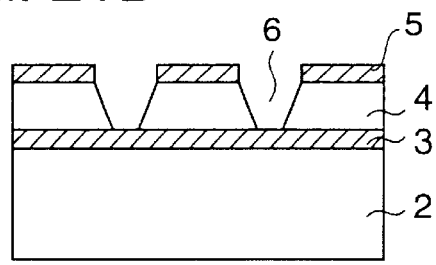
Figure 21C:
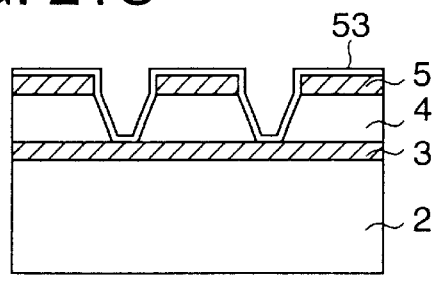
Figure 21D:
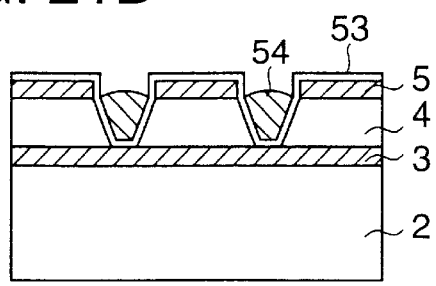
Figure 21E:
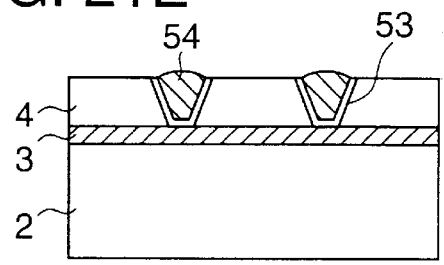
Figure 21F:
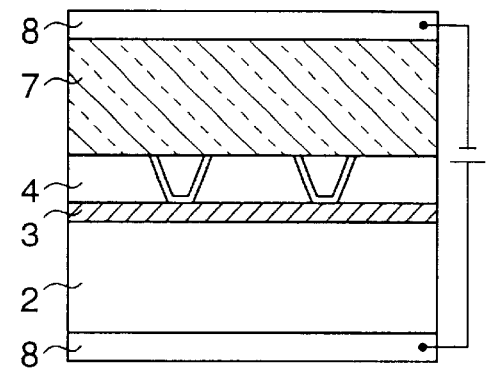
Figure 21G:
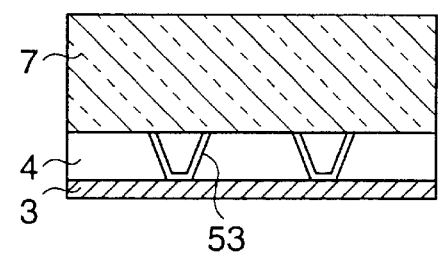
Figure 21H:
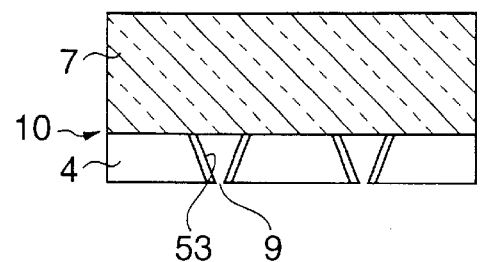

As shown in FIG. 21A, a so-called SOI substrate is used, obtained as a result of an SiO$_2$ layer 3 having a thickness of approximately 1 μm and a single-crystal Si layer 4 having a (100) plane on the top side thereof and having a thickness of approximately 10 μm being layered on a single-crystal Si substrate 2 having a thickness of hundreds of microns, and, a portion of an SiO$_2$ layer 5 of the substrate 1 which has the SiO$_2$ layer 5 having a thickness of hundreds of nanometers on the surface of the single-crystal Si layer 4 is removed by photolithographic etching, at which portion an aperture 9 will be made. Then, as shown in FIG. 21B, etching is performed on the single-crystal Si layer 4 by alkaline etching, and, thus, a tapered hole 6 passing through the single-crystal Si layer 4 surrounded by a (111) plane is formed. Then, as shown in FIG. 21C, a light-blocking film 53, which does not transmit light having a wavelength to be used, is formed on the surfaces of the SiO$_2$ layer 5 and hole 6 by a metal such as Au, Al, Cr, Ni or the like or a semiconductor having resistivity thereof lowered. Then, as shown in FIG. 21D, a positive photo-resist 54 is coated thereon. The thus-coated photo-resist 54 collects in the hole 6 thickly. Then, after prebake is performed thereon, the entire surface undergoes exposure, and, then, development is performed thereon. At this time, because the photo-resist 54 collecting in the hole 6 is remarkably thick in comparison to a planar portion, and the planar portion has a thickness equal to or smaller than 1 μm, light does not reach a bottom of the hole 6, and, photo-resist remains even after the development. In this condition, as shown in FIG. 21E, the light-blocking film 53 and SiO$_2$ layer 5 is removed by etching. In this etching, the light-blocking film 53 is left without being removed at a portion at which the photo-resist 54 exists in the hole 6. After the photo-resist 54 existing in the hole 6 is removed by an asher or a peeling agent, a glass layer 7 which is a light-transmitting-property substrate is bonded to the single-crystal Si layer 4, as shown in FIG. 21F. Then, as shown in FIG. 21G, the single-crystal Si substrate 2 is removed by alkaline etchant, and the SiO$_2$ layer 3 is removed. Then, the thus-obtained combination is immersed in an etchant for removing the light-blocking film 53. Then, etching is stopped when the light-blocking film 53 is removed at an aperture 9. Thus, as shown in FIG. 21H, a slider 10 having a light-blocking film 53 on an inclined surface extending from the aperture 9 can be made.

Accordingly, when light is incident on the inclined surface of the hole 6 providing the aperture 9 as shown in FIG. 12, the light-blocking film 53 prevents the incident light from being transmitted, and, thereby, only an optical near-field at the aperture 9 is generated on the recording-medium-14 side. As a result, it can be prevented that a dimension of a mark written on the recording medium 14 increases and a recording density decreases, or an S/N ratio of a read signal decreases. Further, instead, it is also possible that the light-blocking film 53 exists between the single-crystal Si layer 4 and glass layer 7 which is a light-transmitting-property substrate or between the SiO$_2$ layer 5 and glass layer 7 as long as no problem occurs in bonding between the glass layer 7 and single-crystal Si layer 4.

As the glass layer 7, SW-3 made by Asahi Techno Glass Corporation (Iwaki Glass) or the like may also be used, in the above-described embodiment.

An eighth embodiment in which a non-light-transmitting film is formed, on an inclined surface extending from an aperture 9 in a slider 10, of a material which forms eutectic with a single-crystal Si layer 4, and light is prevented from being transmitted by the inclined surface extending from the aperture 9, will now be described making reference to a process chart shown in FIGS. 22A through 22H.

Figure 22A:
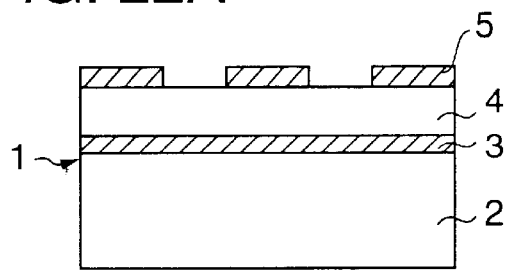
FIGS. 22A through 22H show a process chart of a process of manufacturing a slider in an eighth embodiment of the present invention.
Figure 22B:
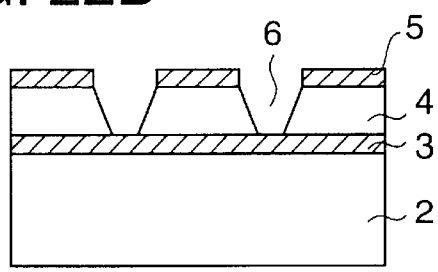
Figure 22C:
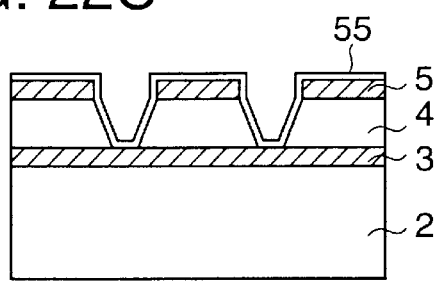
Figure 22D:
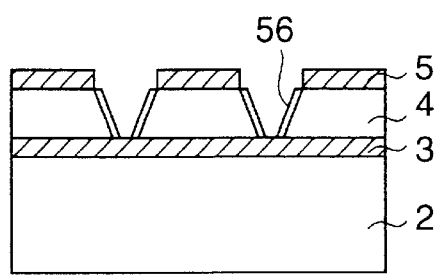
Figure 22E:
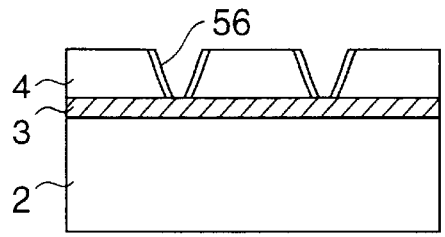
Figure 22F:
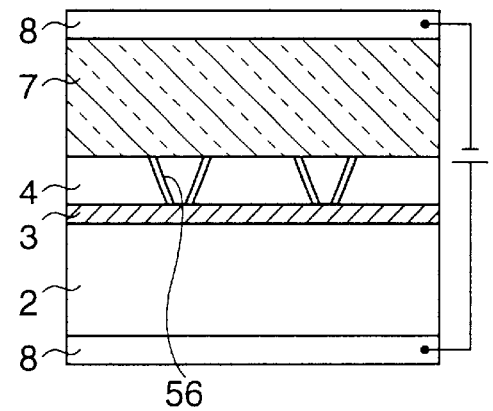
Figure 22G:
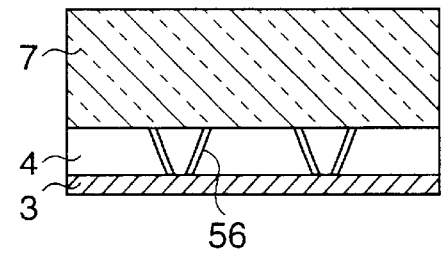
Figure 22H:
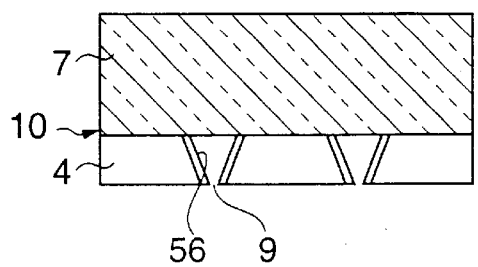

As shown in FIG. 22A, a so-called SOI substrate is used, obtained as a result of an SiO$_2$ layer 3 having a thickness of approximately 1 μm and a single-crystal Si layer 4 having a (100) plane on the top side thereof and having a thickness of approximately 10 μm being layered on a single-crystal Si substrate 2 having a thickness of hundreds of microns, and, a portion of an SiO$_2$ layer 5 of the substrate 1 which has the SiO$_2$ layer 5 having a thickness of hundreds of nanometers on the surface of the single-crystal Si layer 4 is removed by photolithographic etching, at which portion an aperture 9 will be made. Then, as shown in FIG. 22B, etching is performed on the single-crystal Si layer 4 by alkaline etching, and, thus, a tapered hole 6 passing through the single-crystal Si layer 4 surrounded by a (111) plane is formed. Then, as shown in FIG. 22C, a material, which can form eutectic with the single-crystal Si layer 4, for example, gold (Au) 55, is deposited on the surfaces of the SiO$_2$ layer 5 and hole 6. Then, the silicon and gold 55 on an inclined surface form eutectic in a nitrogen gas at 385° C. for 30 minutes. Then, as shown in FIG. 22D, the gold 55 is removed by etching, and only a gold-and-silicon eutectic layer 56 on the inclined surface is left. Then, as shown in FIG. 22E, the $SiO_2$ layer 5 is removed by hydrofluoric acid or the like. Then, as shown in FIG. 22F, a glass layer 7 which is a light-transmitting-property substrate is bonded to the single-crystal Si layer 4 by anodic bonding. Then, as shown in FIG. 22G, the single-crystal Si substrate 2 is removed by alkaline etchant. Then, as shown in FIG. 22H, the $SiO_2$ layer 3 is removed. Thus, a slider 10 having the gold-and-silicon eutectic layer 56 on the inclined surface extending from the aperture 9 can be made.

Because the gold-and-silicon eutectic layer 56 does not transmit light, when light is incident on the inclined surface of the hole 6 providing the aperture 9, the gold-and-silicon eutectic layer 56 prevents the incident light from being transmitted, and, thereby, only an optical near-field at the aperture 9 is generated on the recording-medium-14 side.

In the above-described embodiment, the gold-and-silicon eutectic layer 56 is used for preventing light incident on the inclined surface of the hole 6 providing the aperture 9 from being transmitted. However, an eutectic layer of aluminum and silicon can also be used for preventing light incident on an inclined surface of a hole providing an aperture from being transmitted. In this case, after aluminum is deposited on the inclined surface, the aluminum and silicon are caused to form eutectic in a mixture gas of hydrogen and nitrogen at 700 to 800° C. for 40 to 50 minutes, and, thus, the eutectic layer of aluminum and silicon is formed.

As the glass layer 7, SW-3 made by Asahi Techno Glass Corporation (IWAKI Glass) or the like may also be used, in the above-described embodiment.

A ninth embodiment in which resistivity of a single-crystal Si layer 4 of an inclined surface extending from an aperture 9 in a slider 10 is lowered, and light is prevented from being transmitted by the inclined surface extending from the aperture 9, will now be described making reference to a process chart shown in FIGS. 23A through 23H.

Figure 23A:
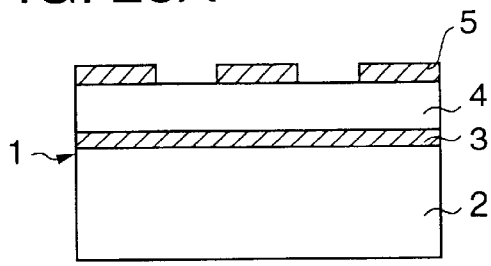
Figure 23B:
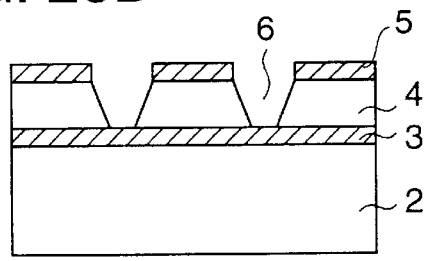
Figure 23B:
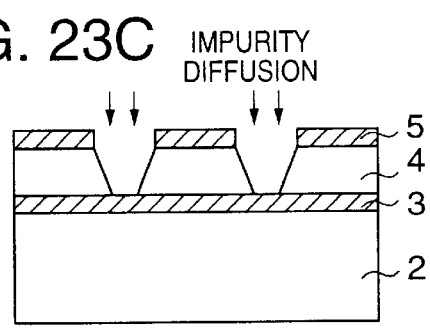
Figure 23D:
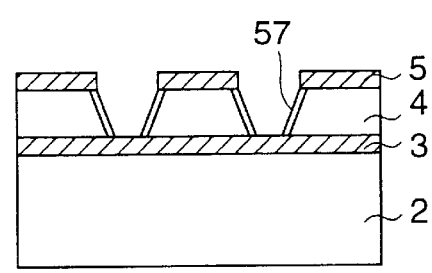
Figure 23E:
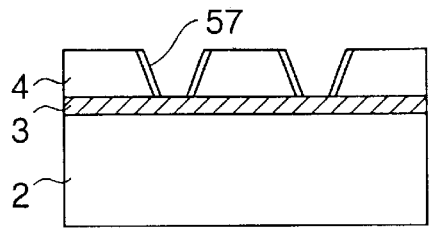
Figure 23F:
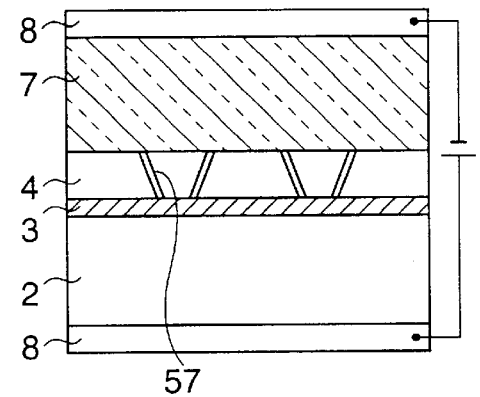
Figure 23G:
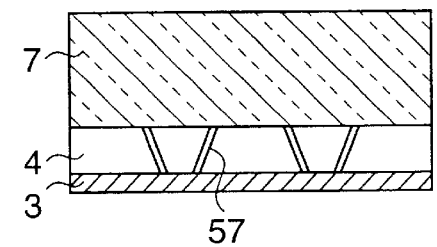
Figure 23H:
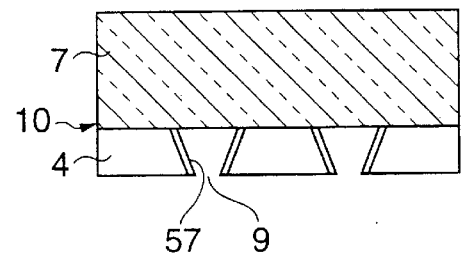
Figure 24A:
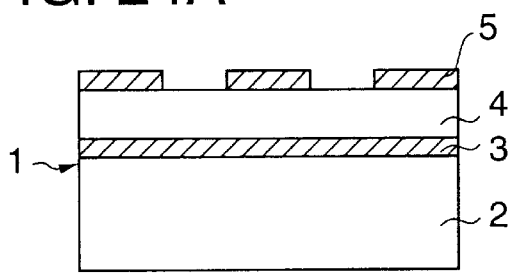
FIGS. 24A through 24F show a process chart of a process of manufacturing a slider in a tenth embodiment of the present invention.
Figure 24B:
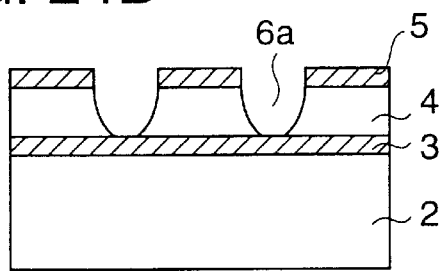
Figure 24C:
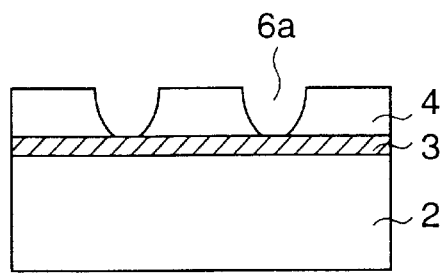
Figure 24D:
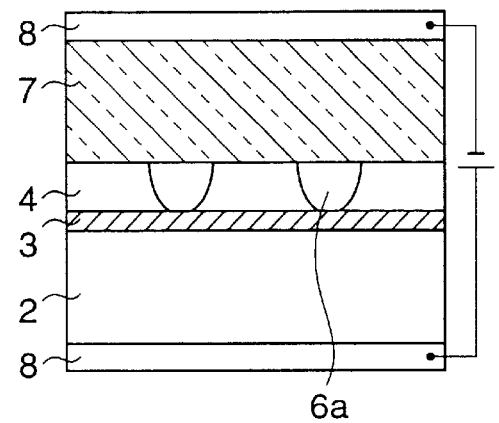
Figure 24E:
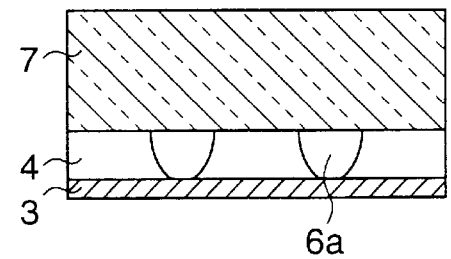
Figure 24F:
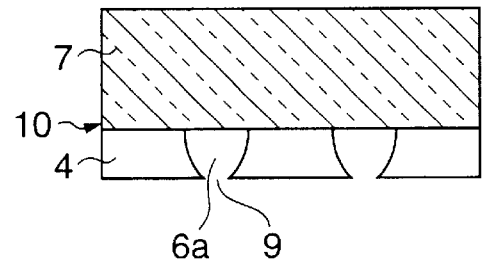
Figure 25A:
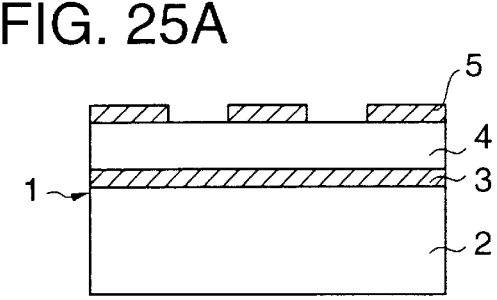
FIGS. 25A through 25H show a process chart of a process of manufacturing a slider in an eleventh embodiment of the present invention.
Figure 25B:
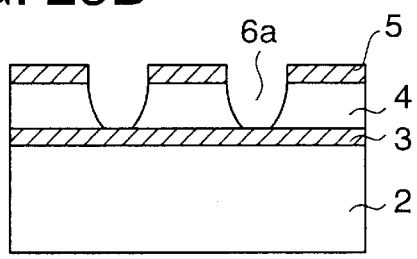
Figure 25C:
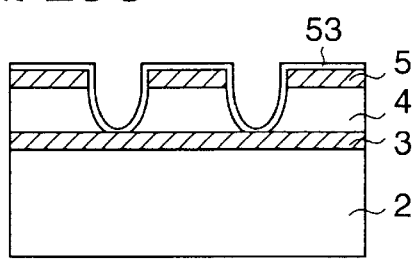
Figure 25D:
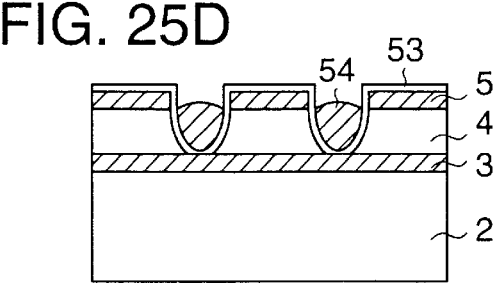
Figure 25E:
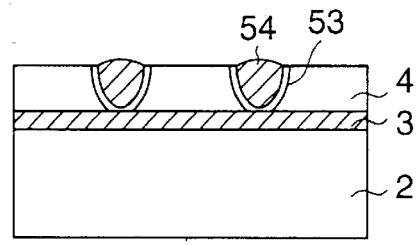
Figure 25F:
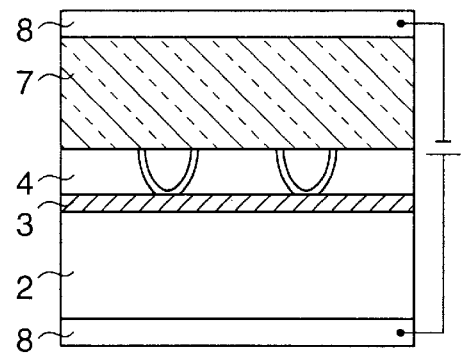
Figure 25G:
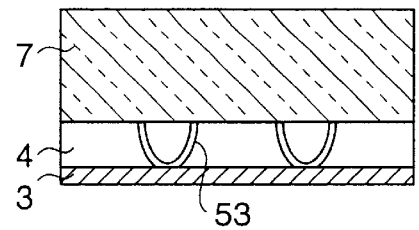
Figure 25H:
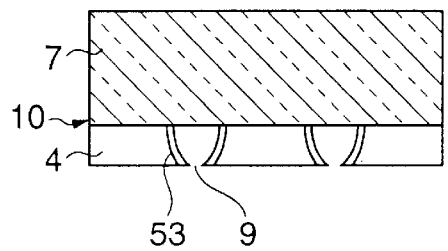

As shown in FIG. 23A, a so-called SOI substrate is used, obtained as a result of an $SiO_2$ layer 3 having a thickness of approximately 1 $\mu$m and a single-crystal Si layer 4 having a (100) plane on the top side thereof and having a thickness of approximately 10 $\mu$m being layered on a single-crystal Si substrate 2 having a thickness of hundreds of microns, and, a portion of a $SiO_2$ layer 5 of the substrate 1 which has the $SiO_2$ layer 5 having a thickness of hundreds of nanometers on the surface of the single-crystal Si layer 4 is removed by photolithographic etching, at which portion an aperture 9 will be made. Then, as shown in FIG. 23B, etching is performed on the single-crystal Si layer 4 by alkaline etching, and, thus, a tapered hole 6 passing through the single-crystal Si layer 4 surrounded by a (111) plane is formed. Then, as shown in FIG. 23C, impurities which lower resistivity of silicon, for example, boron, phosphorus, or arsenic, is doped in an inclined surface of the tapered hole 6 passing through the single-crystal Si layer 4. Thus, as shown in FIG. 23D, a silicon low-resistivity layer 57 is formed on the inclined surface of the tapered hole 6 passing through the single-crystal Si layer 4. Silicon having low resistivity has a remarkably low transmittance in comparison to a portion having large resistivity, and therefor acts as a light-blocking film. Then, as shown in FIG. 23E, the $SiO_2$ layer 5 is removed by hydrofluoric acid or the like. Then, as shown in FIG. 23F, a glass layer 7 which is a light-transmitting-property substrate is bonded to the single-crystal Si layer 4 by anodic bonding. Then, as shown in FIG. 23G, the single-crystal Si substrate 2 is removed by alkaline etchant. Then, as shown in FIG. 23H, the $SiO_2$ layer 3 is removed. Thus, a slider 10 having the silicon low-resistivity layer 57 on the inclined surface extending from the aperture 9 can be made.

As the glass layer 7, SW-3 made by Asahi Techno Glass Corporation (IWAKI Glass) or the like may also be used, in the above-described embodiment.

In the above-described embodiments, the glass layer 7 is bonded to the Si layer by anodic bonding. However, it is not necessary to limit to anodic bonding in particular. It is also possible to employ direct bonding in normal temperature, instead. Normal-temperature bonding is performed as follows: A mirror-polished silicon wafer, glass substrate and/or metal substrate are cleaned by so-called RCA cleaning, an argon FAB (Fact Atom Beam) is incident on each of two substrates for a time on the order of 300 seconds at the same time in a vacuum chamber, and, then, they are pressed and connected together by a pressure of 10 MPa. A bonding strength thereof after they are brought into the atmospheric is equal to or higher than 12 MPa.

Further, it was mentioned that #7740 or #7070 made by Corning Incorporated, the United States of America, is used as the glass layer 7. However, it is not necessary to limit thereto in particular. When direct bonding is employed, a quarz substrate or a light-transmitting resin can be used instead. In particular, when a quarz substrate is used, it is possible to bond a light-transmitting-property substrate and an Si substrate together by high-temperature direct bonding. In this method, substrate surfaces are sufficiently cleaned, dusts and stains are removed therefrom, and they are dried. Then, in a normal atmosphere, the surfaces are caused to come into contact with one another. Then, annealing in a temperature equal to or higher than 300° C. is applied thereto in a nitrogen gas, and, thus, the substrates are bonded together. Further, it is also possible to bond an Si layer and a light-transmitting-property substrate together by glass bonding using low-melting-point glass (frit glass).

Furthermore, it is also possible to bond an Si layer and a light-transmitting-property substrate together by an adhesive. In this case, it is possible that a glass substrate is used as the light-transmitting-property substrate, and an optical adhesive (for example, V40-J91 of Suruga Seiki Co., Ltd.) having a refractive index the same as that of glass is used. In this case, by performing bonding in a manner such that a space which will be formed between a glass surface and an aperture after the bonding will be filled with an adhesive having a refractive index higher than that of the air, it is possible to make a beam spot incident on the aperture to be small in comparison to a case where the space is not filled with the adhesive. Accordingly, it is possible to increase a coupling efficiency with which light emitted by a laser light source 11 becomes an optical near-field 13 and reaches a recording medium 14.

Further, a substrate in which an aperture is formed is not necessary to be limited to a single-crystal Si substrate. As long as an aperture 9 having a dimension in the range of tens of nanometers to hundreds of nanometers can be achieved, a compound semiconductor, a glass substrate having a light-blocking film, a resin substrate or a metal substrate can be used, instead.

In each of many ones of the above-described embodiments, the aperture 9 generating an optical near-field is formed as a result of the tapered hole 6 passing through the single-crystal Si layer 4 being formed by crystal-axis anisotropic etching. However, in order to achieve objects and advantages of the present invention, it is not necessary to be limited to the tapered passing-through hole 6. For example, as shown in FIGS. 24A through 24F, it is possible that a hole 6a having a wall shaped to be like an approximately parabolic surface is formed in a single-crystal Si layer 4. Such a hole 6a having a wall shaped to be like an approximately parabolic surface can be made as a result of etching being performed using hydrofluoric acid and nitric acid ($HF:HNO_3:CH_3COOH=1:3:5$), for example, as an etching agent. The shapes of the holes 6 and 6a are not necessary to be limited to those, and any shape of a hole can be employed as long as an aperture 9 can be formed by the hole.

As the glass layer 7, SW-3 made by Asahi Techno Glass Corporation (IWAKI Glass) or the like may also be used, in the above-described embodiment.

Further, as shown in FIGS. 25A through 25H, it is possible that a hole 6a having a shape other than a tapered shape, and a light-blocking film 53 is formed on an inclined surface thereof. For example, after the hole 6a having an approximately parabolic surface is formed, the light-blocking film 53 is formed on the inclined surface thereof. When the hole 6a has the approximately parabolic shape as shown in FIGS. 24A through 24F and 25A through 25H, light incident on the hole 6a is reflected by the inclined surface of the hole 6a repeatedly and is directed to an aperture 9, and an optical near-field is emitted from the aperture 9. When the hole 6a has such a shape, light reflected by the inclined surface thereof is gathered to the aperture 9. Therefore, it is possible to use light incident on the hole 6a as an optical near-field with high efficiency.

As the glass layer 7, SW-3 made by Asahi Techno Glass Corporation (IWAKI Glass) or the like may also be used, in the above-described embodiment.

Figure 26:
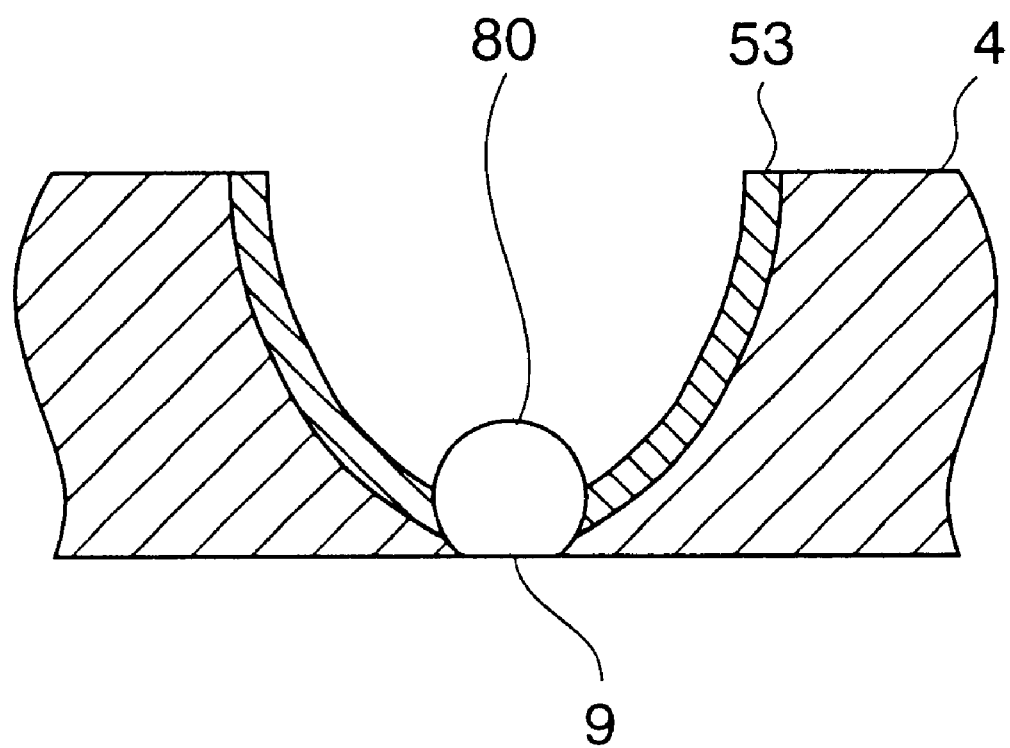
FIG. 26 shows an elevational sectional view showing an aperture in a twelfth embodiment of the present invention.
Figure 27A:
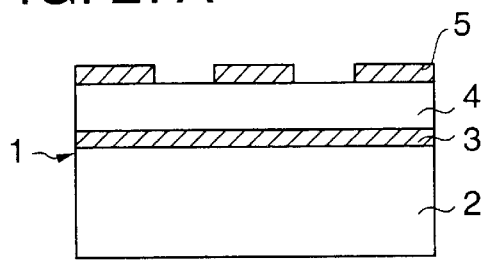
FIGS. 27A through 27F show a process chart of a process of manufacturing a slider in a thirteenth embodiment of the present invention.
Figure 27B:
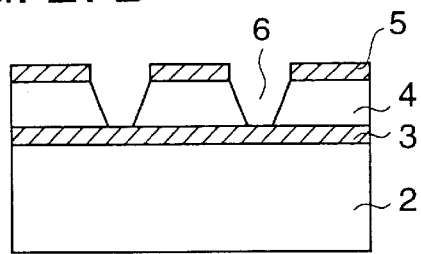
Figure 27C:
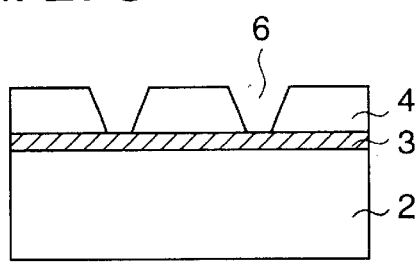
Figure 27D:
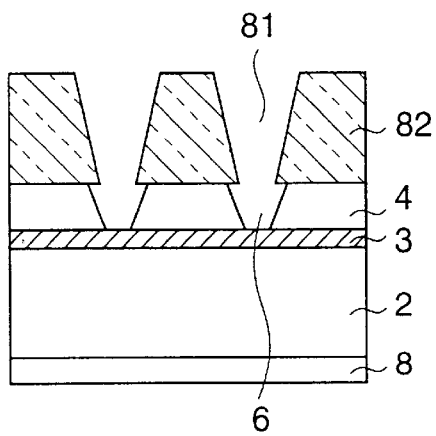
Figure 27E:
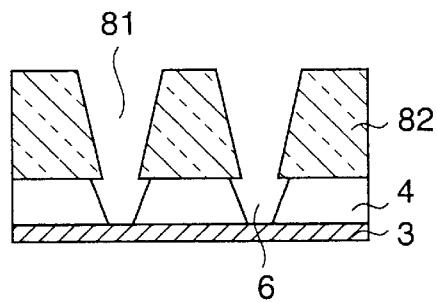
Figure 27F:
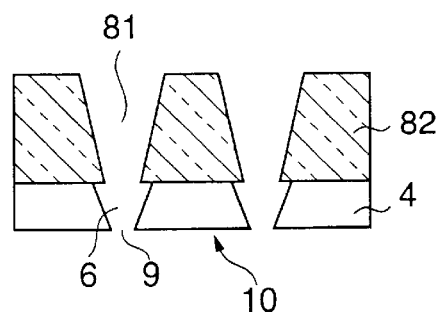

Further, as shown in FIG. 26, it is possible that a hemispheric lens 80 is provided in an aperture 9. When the hemispheric lens 80 is thus provided and a hole 6a has an approximately parabolic shape, light incident on the hole 6a is repeatedly reflected by an inclined surface thereof, and is incident on the hemispheric lens 80. Light incident on the hemispheric lens 80 is gathered by the hemispheric lens 80, is directed to and then is emitted from the aperture 9. As a result of light being gathered by the hemispheric lens 80 and an optical near-field being emitted from the aperture 9, it is possible to use light incident on the hole 6a as an optical near-field with higher efficiency.

As the glass layer 7, SW-3 made by Asahi Techno Glass Corporation (IWAKI Glass) or the like may also be used, in the above-described embodiment.

Each embodiment described above is an optical pickup slider which emits an optical near-field. However, by the same manufacturing method, it is possible to manufacture an optical-pickup slider which emits light by the interference of the modes. Further, it is possible to manufacture a nozzle of an ink-jet printer by the same method.

Further, in each embodiment described above, a glass layer 7 is bonded to a single-crystal Si layer 4. However, it is also possible that a non-light-transmitting-property substrate having a hole transmitting light at a position corresponding to a hole 6, 6a formed in a single-crystal Si layer is bonded to the single-crystal Si layer 4. For example, as shown in FIGS. 27A through 27F, after a hole 6 is formed in a single-crystal Si layer 4, a non-light-transmitting-property substrate 82 having a hole 81 formed therein at a predetermined position previously is bonded to the single-crystal Si layer 4. Any material such as metal, ceramic, resin, non-light-transmitting glass, or the like can be employed as a material of this non-light-transmitting-property substrate 82 as long as it can be bonded to the single-crystal Si layer 4. SW-3 made by Asahi Techno Glass Corporation (IWAKI Glass) or the like may also be used as the glass layer 7. Further, any of various bonding methods described above as well as anodic bonding can be employed as a bonding method. Then, the single-crystal Si substrate 2 and $SiO_2$ layer 3 are removed, and a thus-obtained combination is cut to a desired size, and, thus, an optical-pickup slider is completed.

Probes, manufacturing methods thereof, probe arrays and manufacturing methods thereof in embodiments of the present invention will now be described making reference to figures.

Figure 28B:
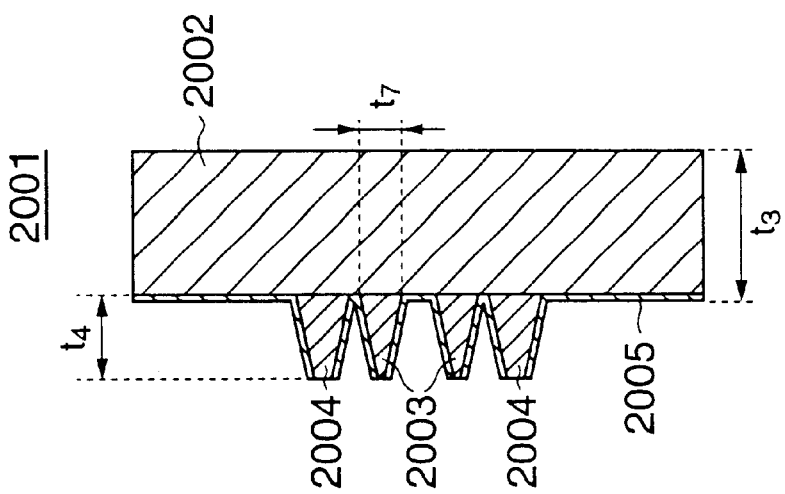
FIG. 28B shows an elevational sectional view of the probe array shown in FIG. 28A.
Figure 28A:
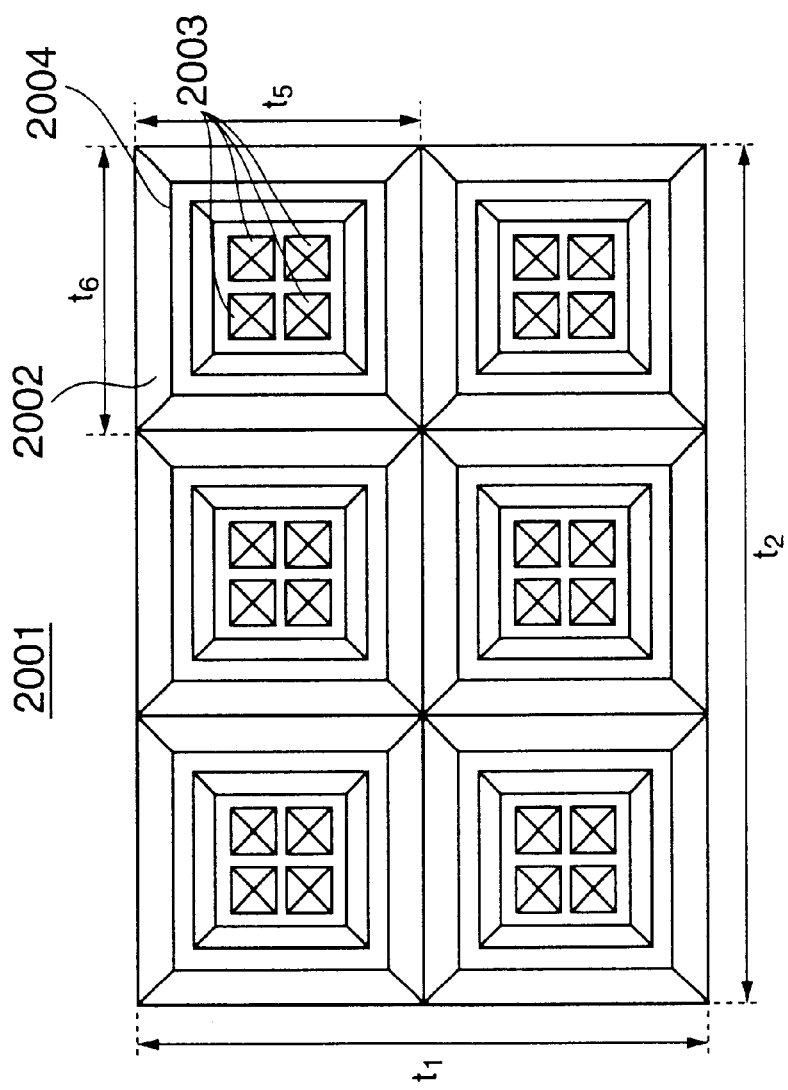
FIG. 28A shows a plan view of a probe array in a fourteenth embodiment of to the present invention.

A probe array 2001 in an embodiment of the present invention has a plurality of single probes, each gathering incident light, as shown in FIGS. 28A and 28B.

This probe array 2001 is used as an optical head of a near-field optical microscope or an optical head for emitting an optical near-field to a recording medium. When the probe array 2001 is used as an optical head of a near-field optical microscope for example, the probe array 2001 is arranged at a position such that a distance from a sample to be measured is equal to or less than a wavelength of light to be incident on the sample to be measured. In this condition, the probe array 2001 generates optical near-fields between the sample to be measured and the probe array 2001.

The probe array 2001 has an arrangement shown in FIGS. 28A and 28B. As shown in FIG. 28B, the probe array 2001 includes a glass substrate 2002, a plurality of Si projecting portions 2003 formed on the glass substrate 2002, bank portions 2004 provided around the Si projecting portions 2003, and a metal layer 2005 formed on the Si projecting portions 2003 and bank portions 2004. In this probe array 2001, the glass substrate 2002, and the Si projecting portions 2003 and bank portions 2004 are connected together by a method such as anodic bonding or the like. The anodic bonding will be described later in a description of a method of manufacturing the probe array 2001. In the embodiment, each Si projecting portion 2003 of the probe array 2001 corresponds to a single probe.

The glass substrate 2002 has, as shown in FIG. 28A, a longitudinal dimension $t_1$ of approximately 3 mm, and a lateral dimension $t_2$ of approximately 4 mm, and, as shown in FIG. 28B, a thickness dimension $t_3$ of approximately 1 mm, for example.

The Si projecting portions 2003 is made of a high-refractive-index material having a refractive index far higher than that of the glass substrate 2002, and, in the embodiment, is made of Si, for example. As shown in FIG. 28A, the Si projecting portions 2003 are surrounded by the bank portions 2004, and are arranged two-dimensionally in a longitudinal direction and a lateral direction. Each Si projecting portion 2003 has a shape of a quadrilateral pyramid, for example, a square pyramid, a base of which faces the glass substrate 2002, and, is formed on the glass substrate 2002. Each Si projecting portion 2003 has a height dimension $t_4$ in the range of approximately 5 to 10 µm.

Figure 29:
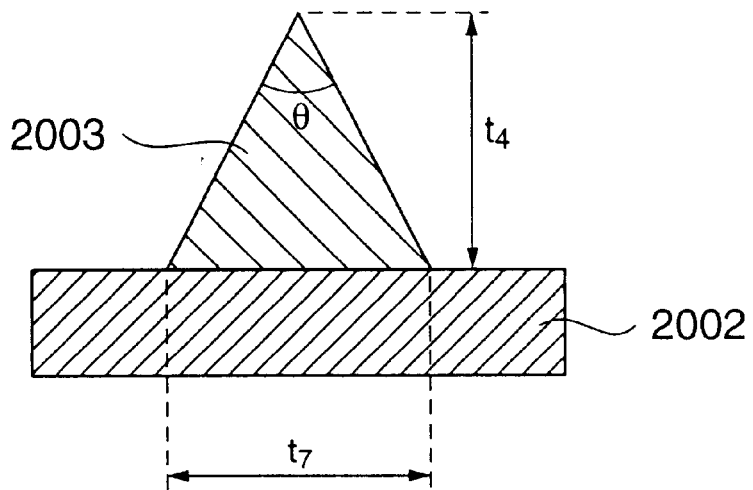
FIG. 29 shows an elevational sectional view of an Si projecting portion of the probe array according to the present invention.

Further, as shown in FIG. 29, in each Si projecting portion 2003, an angle θ formed by a tip (vertex) is approximately 90 degrees when a length $t_7$ of one side of the base is approximately 10 µm and a height $t_4$ is approximately 10 µm. Side surfaces of the Si projecting portion 2003 are designed so that a light intensity becomes stronger at the tip when light is incident on the base of the quadrilateral pyramid.

Further, as will be described later, in each Si projecting portion 2003, when side surfaces are changed in two steps, a height $t_4$ is approximately 3 µm, a length $t_7$ of one side of the base is approximately 2 µm, and an angle θ formed by the tip (vertex) is approximately 30 degrees. Further, this Si projecting portion 2003 is designed so that a diameter of an aperture at the tip is on the order of 100 nm, and an optical near-field is generated at the tip, or is designed so that a diameter of an aperture at the tip is on the order a wavelength of light, and propagation light other than an optical near-field is generated at the tip.

The bank portions 2004 are made of an Si material the same as that of the Si projecting portions 2003. Each bank portion 2004 has a square shape having a longitudinal dimension $t_5$ and a lateral dimension $t_6$ (shown in FIG. 28A) of approximately 100 μm each, and a height is in the range of 5 to 10 μm the same as that of the Si projecting portions 2003.

The bank portions 2004 are arranged two-dimensionally in the longitudinal direction and lateral direction, and are formed on the glass substrate 2002. As the bank portions 2004 are arranged two-dimensionally, the Si projecting portions 2003 are arranged two-dimensionally on the glass substrate 2002.

The metal layer 2005 is made of a light-blocking-property material such as Al or the like, and is formed to have a thickness on such an order that light is not transmitted thereby, by film forming technology such as deposition, evaporation or the like, for example. This metal film 2005 is formed to have a thickness of on the order of approximately 30 nm when an Al material is employed, for example. The metal layer 2005 is formed on the glass substrate 2002 and the side surfaces of the Si projecting portions 2003.

This probe array 2001 is provided in the above-mentioned near-field optical microscope, and is arranged at a distance equal to or shorter than a wavelength of light from a sample to be measured. When light is incident from the glass-substrate-2002 side, the light is scattered by the metal layer 2005 and is gathered so that a light intensity becomes stronger at the vertexes of the Si projecting portions 2003, and an optical near-field is generated between each Si projecting portion 2003 and the sample to be measured.

A method of manufacturing the above-described probe array 2001 will now be described. A single probe, that is, a single projecting portion 2003 can be manufactured also by the method of manufacturing the above-described probe array 2001 which will be described below.

Figure 30:
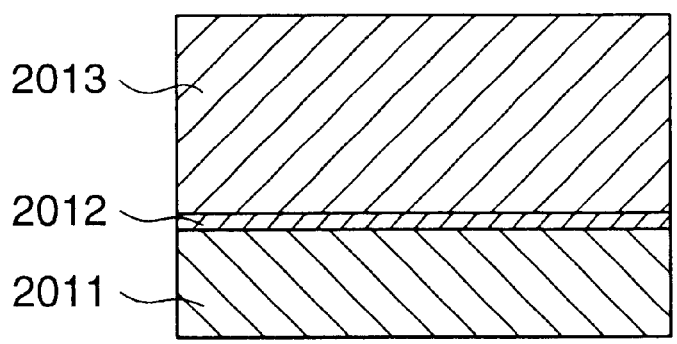
FIG. 30 shows an elevational sectional view of an SOI substrate prepared for manufacturing the probe array according to the present invention.

When the probe array 2001 is manufactured, first, as shown in FIG. 30, an SOI (Silicon On Insulator) substrate 2010 is prepared. The SOI substrate 2010 includes an active layer 2011 made of Si, an SiO$_2$ layer 2012, which is an intermediate layer, formed on the active layer 2011, and an Si supporting substrate 2013 formed on the SiO$_2$ layer 2012. The active layer 2011 has a thickness on the order of approximately 10 μm, and has a refractive index on the order of approximately 4 for light having a wavelength on the order of approximately 800 nm. The active layer 2011 needs to have a uniform surface from which Si projecting portions 2003 and bank portions 2004 will be formed.

Figure 31:
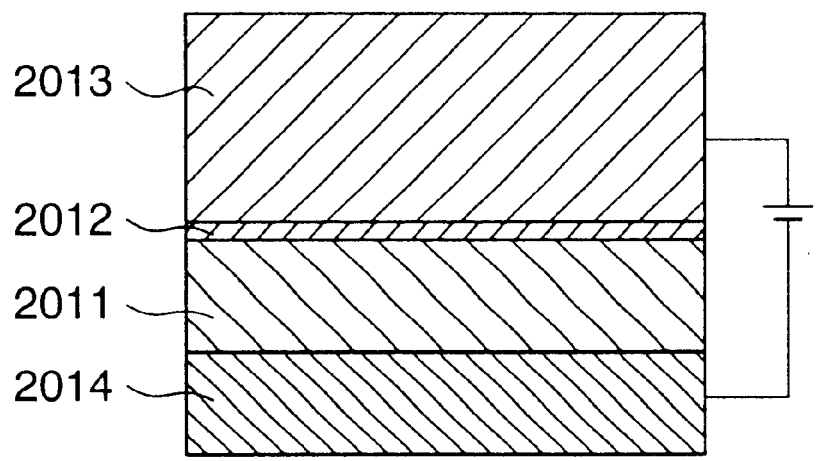
FIG. 31 shows an elevational sectional view for illustrating that the SOI substrate and a glass substrate are bonded together by anodic bonding in manufacturing the probe array according to the present invention.

Then, as shown in FIG. 31, a glass substrate 2014 is bonded to the SOI substrate 2010 by anodic bonding. As the glass substrate 2014, #7740 or #7070 made by Corning Incorporated, the United States of America, SW-3 made by Asahi Techno Glass Corporation (Iwaki Glass) or the like is used. The glass substrate 2014 contains Na$^+$ ions. With the active layer 2011 of the SOI substrate 2010 and the glass substrate 2014 touched one another and heated to 350° C. to 450° C. in a vacuum or in an inert gas such as N$_2$, Ar$_2$ or the like, a voltage on the order of 200 to 1000 V is applied between the Si supporting substrate 2013 and the glass substrate 2014 with the Si supporting substrate 2013 used as an anode. Positive Na$^+$ ions are easy to move in the glass substrate 2014 even at a temperature equal to or lower than a melting point of the glass substrate 2014, and, therefore, are attracted by a negative electric field, and reach the surface of the glass substrate 2014. Many negative ions remain in the glass substrate 2014 form a space-charge layer on a surface on which the glass substrate 2014 adheres the active layer 2011 (Si), an attraction force thereby is generated between Si and glass, and they are bonded chemically.

Then, the Si supporting substrate 2013 is removed from the SOI substrate 2010 by etching with a KOH solution, tetramethyl-ammonium-hydrooxide (TMAH), a hydrofluoric-acid-and-nitric-acid mixture liquid or the like, or mechanical polishing, or chemical mechanical polishing (CMP). Thereby, the surface of the SiO$_2$ layer 2012 is exposed.

Figure 32:
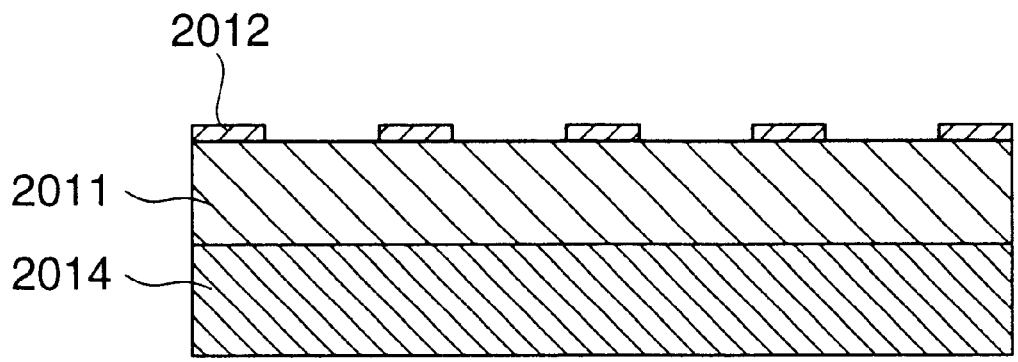
FIG. 32 shows an elevational sectional view for illustrating that patterning is performed by an $SiO_2$ layer in manufacturing the probe array according to the present invention.

Then, as shown in FIG. 32, lithography is performed on the surface of the SiO$_2$ layer 2012 exposed as a result of the Si supporting substrate 2013 being removed, and, thus, patterns are obtained from the SiO$_2$ layer 2012. Patterning is made such that the SiO$_2$ layer 2012 is left at positions at which tips of Si projecting portions 2003 and bank portions 2004 are arranged as shown in FIGS. 28A and 28B, for example. Thereby, the patterns made of the SiO$_2$ layer 2012 are formed on the active layer 2011. As a pattern corresponding to a tip of each Si projecting portion 2003 for forming the Si projecting portion 2003, a pattern having a shape of quadrilateral, for example, square, approximately 10 to 15 μm each side, or a pattern having a circular shape equivalent in size, can be employed.

Figure 33:
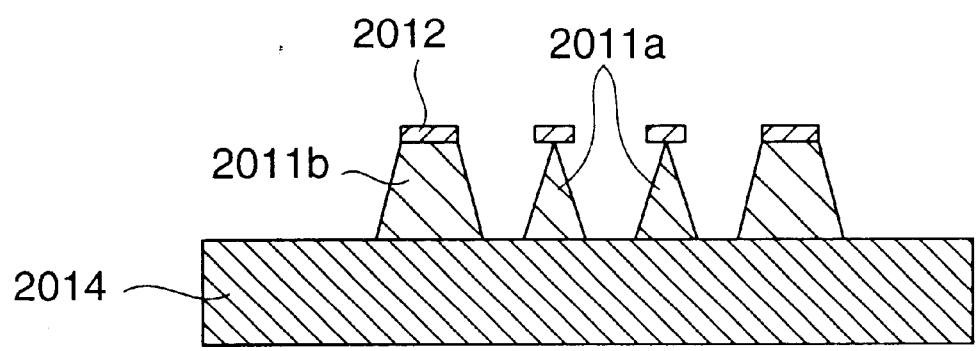
FIG. 33 shows an elevational sectional view for illustrating that etching is performed by an SOI wafer so that Si projecting portions and a bank portion are made in manufacturing the probe array according to the present invention.
Figure 34B:
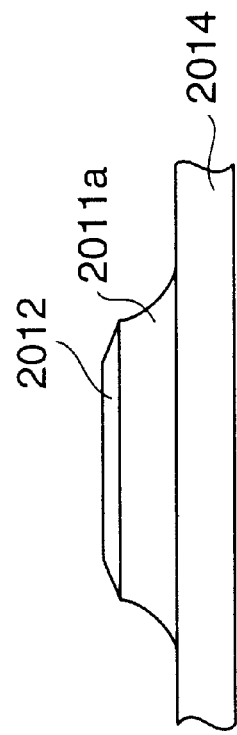
FIGS. 34A through 34D show side views showing a manufacturing process of forming the Si projecting portion by performing etching on the SOI wafer in manufacturing the probe array according to the present invention (FIG. 34A showing a shape of an active layer obtained after 180 seconds elapses from beginning of etching.
Figure 34D:
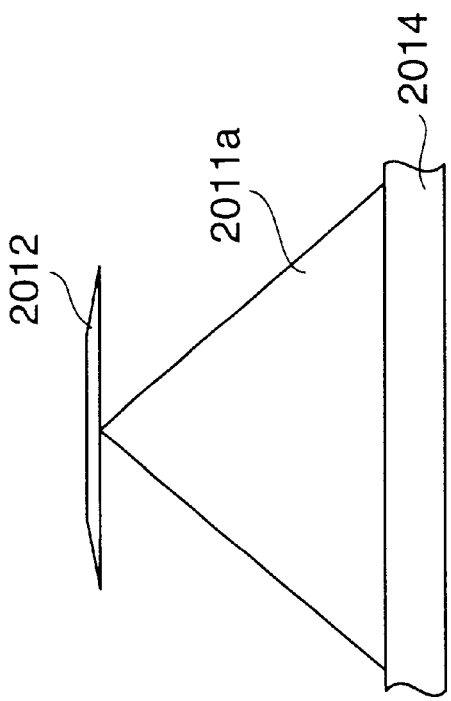
Figure 34A:
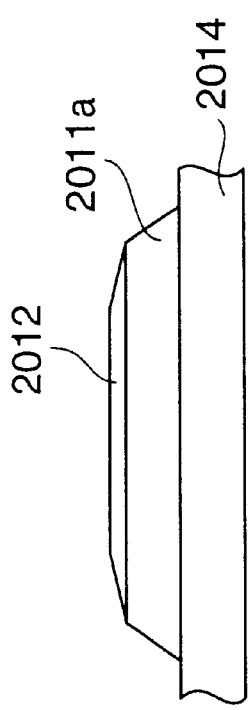
Figure 34C:
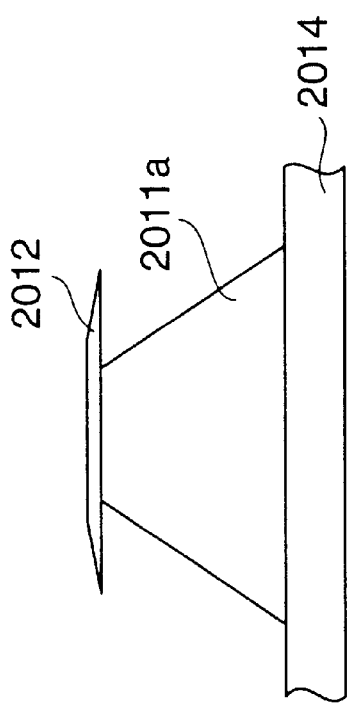

Then, as shown in FIG. 33, anisotropic etching using an etchant such as a KOH solution, an NaOH solution, a hydrazine hydrate, an ethylenediamine-pyrocatechol-and-water mixture liquid (EPW), TMAH or the like, is performed on the surface on which the patterns of the SiO$_2$ layer 2012 are formed. Thereby, only the portions other than the portions at which the patterns are formed are eroded by the anisotropic etching.

When a solution obtained as a result of isopropyl alcohol (IPA) being mixed to a KOH solution (34 wt %, 80° C.) is used as an etching solution, a probe array 2001 in which an inclination of a side surface of the active layer 2011 is one step can be made. In this case, no change occurs whether a shape of each pattern formed from the SiO$_2$ layer 2012 is circular or quadrilateral.

In further detail, for example, a pattern of a square, 10 μm each side, is formed from the SiO$_2$ layer 2012, an etchant obtained as a result of KOH (40 g, 85%), water (60 g) and IPA (40 cc) being mixed, is used, and etching is performed at 80° C. In this case, changes in the active layer 2011 when etching is performed for 180 seconds, 360 seconds, 540 seconds and 750 seconds from the beginning are shown in FIGS. 34A, 34B, 34C and 34D, respectively. Thereby, as shown in FIG. 33, active layers 2011a which become quadrilateral-pyramid-shaped Si projecting portions 2003 and an active layer 2011b which becomes a bank portion 2004, are formed on the glass substrate 2014.

Figure 35:
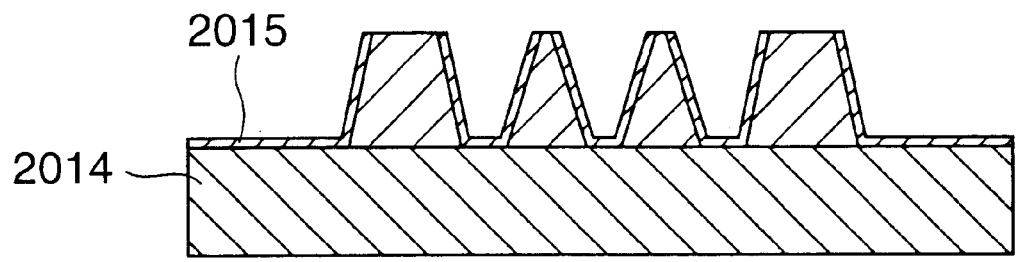
FIG. 35 shows an elevational sectional view for illustrating that a metal layer is formed on the SOI layer and glass substrate in manufacturing the probe array according to the present invention.

Then, as shown in FIG. 35, the SiO$_2$ layer 2012 remaining on the active layer 2011a and active layer 2011b are removed, and a metal layer 2015 is formed on side surfaces of the active layer 2011a and active layer 2011b, and the glass substrate 2014 at portions at which the active layer 2011a and active layer 2011b do not remain.

Figure 36:
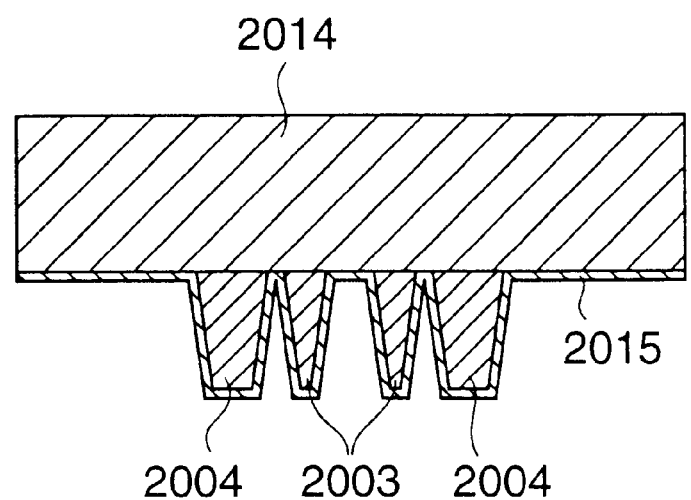
FIG. 36 shows an elevational sectional view of a probe array in a fifteenth embodiment of the present invention.

Further, as shown in FIG. 36, a light-blocking film made of a metal layer 2015 is formed on the active layer 2011b and the surface of the glass substrate 2014 on which the active layer is formed, or only the active layers 2011b. In the thus-manufactured probe array 2001, it is possible to block light other than light emitted from tips of the Si projecting portions 2003, and, thereby, to increase an S/N ratio of a read signal.

A thickness of the metal layer 2015 is approximately 30 to 50 nm when Al is used as a material thereof but is approximately 100 nm when Au is used as a material thereof. In other words, the metal layer 2015 is formed to have a thickness on the order of a skin depth such as to enable light to be incident in the Si projecting portions 2003 and to emit therefrom.

In the case where gold (Au) is used as a material of the metal layer for example, $1/e^2$ (approximately 13.5%) of incident light is transmitted thereby when the thickness thereof is on the order of 100 nm. A thickness on such an order is called a skin depth. Accordingly, in the case of FIG. 36, an optical near-field is generated from the tip of the projecting portion 2003. Because the inclined surface of the projecting portion 2003 is in a completely reflecting condition, no light is emitted from the inclined surface. However, in this case, only 13.5% of light which reaches the tip inside the silicon is emitted to the outside. Therefore, the light intensity is low. In order to increase a light intensity, metal only on the tip of the projecting portion is removed as shown in FIG. 35. In this case, an intensity of an optical near-field is high. However, a difficult working process is needed for removing metal only on the tip of the projecting portion, actually. Therefore, one of the above two cases (a case where metal exists on the tip and a case where metal does not exist on the tip) may be selected appropriately.

Thus, by performing the processes described above making reference to FIGS. 31 through 35, and 36, it is possible to manufacture a probe array 2001, such as that shown in FIGS. 28A and 28B, provided with a plurality of Si projecting portions 2003 on a glass substrate 2002, or a single probe consisting of a single Si projecting portion 2003.

In this probe array 2001, the active layer 2011 made of Si is bonded to the glass substrate 2014, and, thereby, it is possible to uniform heights of tips of the respective Si projecting portions 2003, improve planarity of the tips of the Si projecting portions 2003, thereby, to generate optical near-fields and propagation light at the tips to emit with high efficiency and high resolution, and to make control of diameters of apertures easier.

Further, when not a probe array but a single projecting probe is made, it is possible to improve planarity of a tip surface of a projecting probe like a truncated cone or pyramid to one equal to or less than $\lambda/8$, that is, a very high one, in particular. Further, a diameter D of an aperture at a tip of a projection can be easily controlled by a time of etching by which the projection is made.

Such a probe array 2001 can be manufactured using an SOI substrate 2010. Therefore, error in heights of respective projecting portions 2003 are determined by an accuracy of active layer thickness of the SOI substrate 2010. The accuracy of active layer thickness of the SOI substrate 2010 made by crystal growth technology involves only error on the order of atomic level. Accordingly, it is predicted that error in the heights of the respective Si projecting portions 2003 is on the order of atomic level. Therefore, by this method of manufacturing the probe array 2001, even in comparison to manufacturing technology using transfer in the related art, it is possible to control the heights with high accuracy, and to manufacture Si projecting portions 2003, positions of tips thereof being controlled to be uniform.

Further, in this probe array 2001, because the heights of the respective Si projecting portions 2003 are uniform, it is possible to make distances between a recording medium and the tips of the respective Si projecting portions 2003 uniform when recording/reproducing is performed on the recording medium, and to locate all the Si projecting portions 2003 to proper positions such that optical near-fields can reach the recording medium. Thus, in this probe array 2001, such a situation that optical near-fields of some of the respective Si projecting portions 2003 reach the recording medium but those from the other do not reach the recording medium is avoided.

Further, in this probe array 2001, the SOI substrate 2010 and glass substrate 2014 are bonded together by anodic bonding. Therefore, in comparison to a case where only the SOI substrate 2010 is used, strength thereof is improved.

Further, if a substrate made of Si is used instead of the glass substrate 2014, for example, a thickness of hundreds of microns is needed for obtaining a satisfactory mechanical strength and Si involves a propagation loss for visible light, it is not possible for the substrate to cause light to be incident in Si projecting portions 2003. In contrast to this, in the probe array 2001, the Si projecting portions 2003 are formed on the glass substrate 2014, and the heights of the Si projecting portions 2003 are in the range of 5 to 10 $\mu$m. Si having a thickness of 5 to 10 $\mu$m has a transmittance of tens of percents for a wavelength on the order of 780 to 830 nm. Therefore, it is possible to increase light amounts incident on the respective Si projecting portions 2003, and to increase light intensities of optical near-fields generated at the tips thereof.

Accordingly, in this probe array 2001, because the Si projecting portions 2003 are made of Si and the positions of the tips of the respective Si projecting portions 2003 are uniform, efficiencies of the respective Si projecting portions 2003 are uniform, and, both high efficiency and high resolution are achieved, which are hard to be compatible in the related art. Specifically, in this probe array 2001, because the Si projecting portions 2003 employ a material having a high refractive index such as Si, a wavelength of propagation light in the Si projecting portions 2003 is effectively shortened, and, thereby light oozing to the outside from the Si projecting portions 2003 are controlled and light use efficiency is improved, and, also, it is possible to reduce diameters of beam spots.

Further, because the Si projecting portions 2003 are uniform in the heights thereof, a recording medium can approach the respective Si projecting portions 2003 in a range in which optical near-fields exist at the tips thereof. Accordingly, it is possible to achieve high efficiency and high resolution of all the Si projecting portions 2003 at the same time.

Further, in this probe array 2001, the bank portion 2004 having the same height as that of the Si projecting portions 2003 is arranged to surround the Si projecting portions 2003. Thereby, at a time of recording/reproduction to/from a recording medium, even when the Si projecting portions 2003 and bank portion 2004 come into contact with the recording medium when facing the recording medium, it is possible to reduce a pressure applied to the Si projecting portions 2003, and to reduce a degree in which the Si projecting portions 2003 is damaged.

Further, when this probe array 2001 is manufactured, it is possible for the Si projecting portions 2003 and bank portion 2004 to have the same height as a result of they being made of the same material and undergoing etching at the same time. Accordingly, even when the Si projecting portions 2003 and bank portion 2004 come into contact with the recording medium when facing the recording medium, it is possible to reduce a pressure applied to the Si projecting portions 2003, and to reduce a degree in which the Si projecting portions 2003 is damaged.

When Si projecting portions 2003 and bank portion 2004 are formed by etching as described using FIGS. 33 and 34A through 34D, by changing patterns obtained from etching of an $SiO_2$ layer 2012 as described using FIG. 32, it is possible to form the Si projecting portions 2003 having a plurality of inclination angles with respect to a glass substrate 2014.

Specifically, when a side surface of an active layer 2011 is to have a plurality of inclination angles, it is preferable that a mask made from an $SiO_2$ layer 2012 has a circular shape. Further, when the active layer 2011, a side surface of which has a plurality of inclination angles, is made, a KOH solution (34 wt %, 80° C.), NaOH, EPW or TMAH is used as an etchant at a time of etching.

Figure 37A:
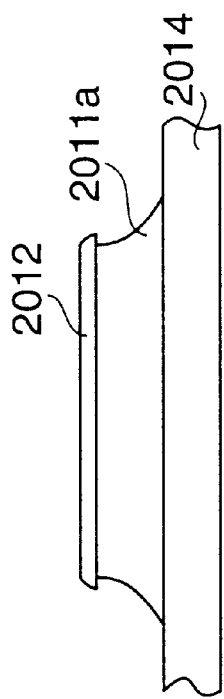
FIGS. 37A through 37D show side views showing a manufacturing process of forming an Si projecting portion having a plurality of inclinations by performing etching on an SOI wafer in manufacturing a probe array in sixteenth embodiment of the present invention (FIG. 37A showing a shape of an active layer obtained after 60 seconds elapses from beginning of etching.
Figure 37B:
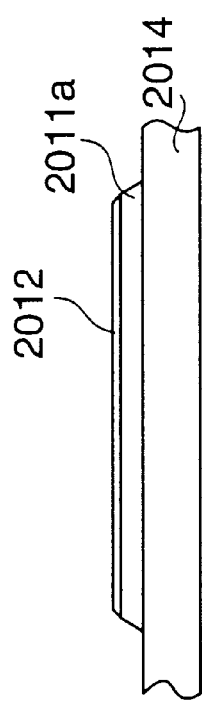
Figure 37C:
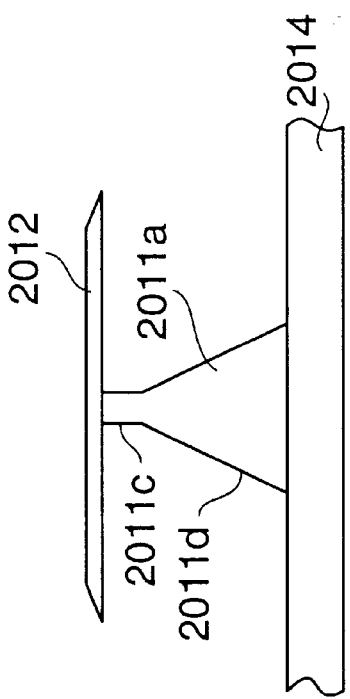
Figure 37D:
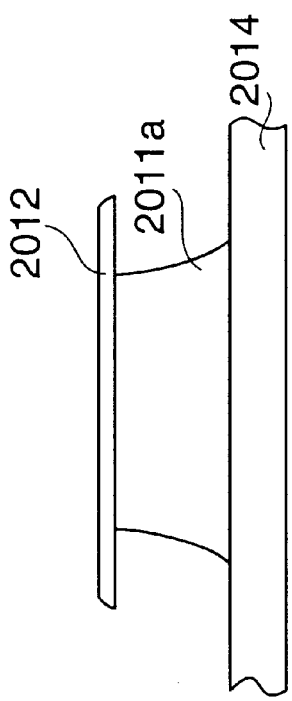

Further specifically, when a pattern of a square, 10 $\mu$m each side, is formed from an $SiO_2$ layer 2012, and a KOH solution (34 wt %, 80° C.) is used as an etchant, changes in the active layer 2011 when etching is performed for 60 seconds, 150 seconds, 405 seconds and 483 seconds from the beginning are shown in FIGS. 37A, 37B, 37C and 37D, respectively. Thus, an active layer 2011a is formed on a glass substrate 2014. Thereby, it is possible for, as shown in FIG. 37D, an outer wall of the active layer 2011a have a plurality of inclined surfaces 2011c and 2011d having different inclination angles (tapering angles).

In an Si projecting portion 2003 in which an outer wall of an active layer 2011a thus has a plurality of inclined surfaces 2011c and 2011d, a tapering angle is large in a first tapered range having the inclined surface 2011d while a tapering angle is small in a second tapered range having the inclined surface 2011c. Accordingly, in the thus-made Si projecting portion 2003, a loss of light decreases and light is propagated with a high efficiency in the first tapered range, and a diameter of light from the first tapered range is reduced in the second tapered range and a small spot of light is emitted from a tapered portion. Thus, by this Si projecting portion 2003, it is possible to emit light with high efficiency and high resolution.

In the above-described Si projecting portion 2003, an aperture diameter thereof can be determined by a method of optimization of a core diameter of an optical-fiber probe obtained from tapering an optical fiber. Here, a material of the core of the optical-fiber probe is a glass material having a refractive index of 1.53.

Figure 38A:
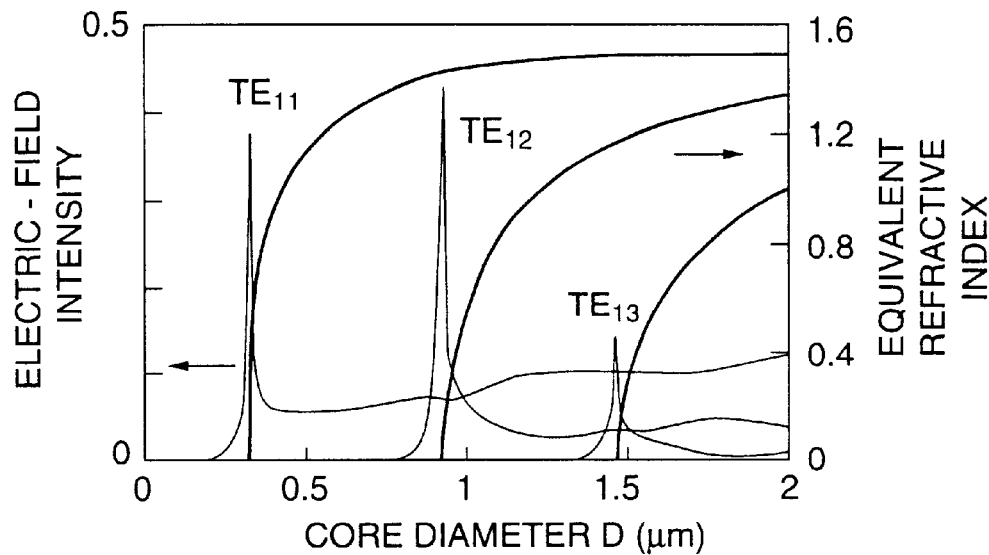
FIG. 38A shows a relationship between a core diameter and an equivalent refractive index of an optical-fiber probe.
Figure 38B:
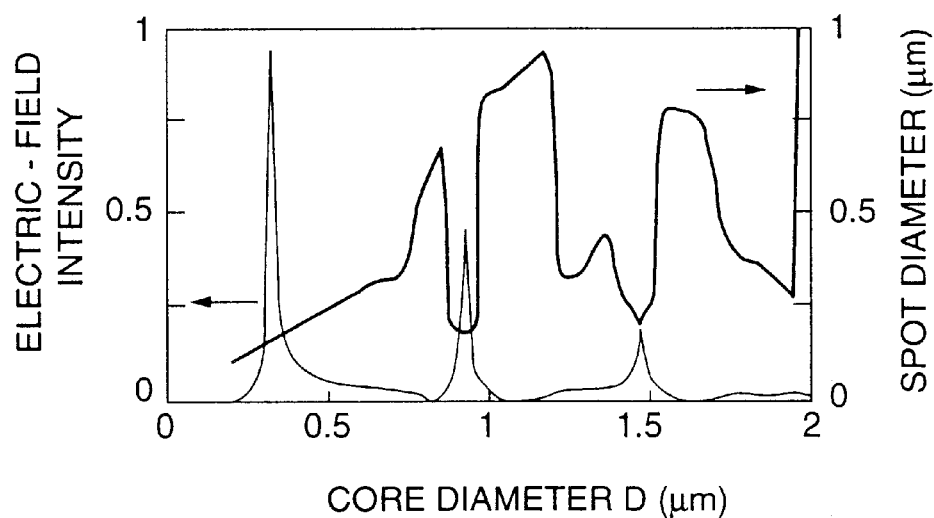
FIG. 38B shows a relationship between a core diameter and a spot diameter of an optical-fiber probe.

Specifically, in optimization of an optical-fiber probe, a method of analyzing electric-field distribution inside a core is used. According to this electric-field distribution analyzing method, when a clad is assumed to be an ideal metal through which no light leaks, and it is assumed that modes of light exist inside a core are only $TE_{1n}$ mode (n=1 through 6) and $TM_{1n}$ mode (n=1 through 6), a relationship between a core diameter and an electric-field intensity at a center of the core shown in FIGS. 38A and 38B is obtained. According to FIGS. 38A and 38B, in the core of the optical fiber, a plurality of modes exist as shown in FIG. 38A, and an electric-field distribution is formed by superposition of the respective modes as shown in FIG. 38B.

FIG. 38A shows electric-field intensities and equivalent refractive indexes in the respective modes when a core diameter is changed. According to FIG. 38A, at cutoff core diameters at which the equivalent refractive indexes converge into 0, the electric-field intensities (amplitude ratios) of the respective modes become maximum.

FIG. 38B shows a sum of the electric-field intensities of the respective modes and spot diameters in respective core diameters when the core diameter is changed. It is noted that, when a plurality of peaks exist, a spot diameter of peak at the core center is shown. According to FIG. 38B, at the cutoff diameters in the respective modes, not only the electric-field intensities have the maximum values (FIG. 38A), but also peaks of small spot diameters are obtained.

The cutoff diameters of the respective modes will now be considered. In the cutoff diameter for propagating light of $TE_{11}$ mode, an aperture diameter is smaller, that is, a propagation distance is long, and, thereby, a loss increases. In the cutoff diameter of $TE_{13}$ mode, when it is used for information reproduction, because a number of peaks obtained increases (5 peaks), information other than necessary information is detected due to influence thereof. Therefore, in consideration of a propagation distance and a number of peaks, it is preferable for an optical-fiber probe to have the cutoff diameter of $TE_{12}$ mode.

Based on this analysis result, a case where a core diameter (900 to 920 nm, where a wavelength of light $\lambda$=830 (nm)) of a cutoff diameter such that a mode of light propagating inside a core of an optical-fiber probe is $TE_{12}$ mode is employed is considered. An experiment result in this case is shown in FIG. 39.

Figure 39:
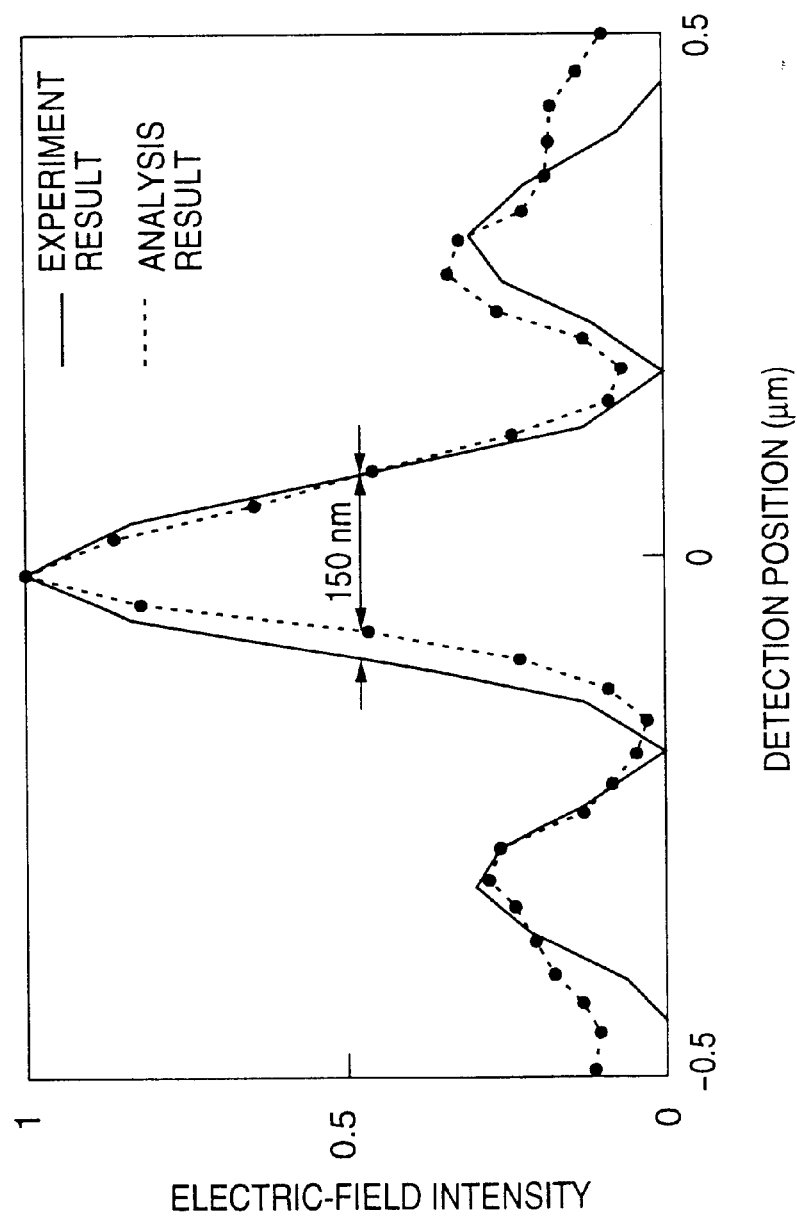
FIG. 39 shows a relationship between a detection position and an electric-field intensity of an optical-fiber probe.

According to FIG. 39 (solid line: experiment result), a spot diameter is approximately 150 nm, and, also, an electric-field intensity at a peak center is 1 (a. u.), and, according to an analysis result in FIGS. 38A and 38B (broken line), a spot diameter is 175 nm and an electric-field intensity at a peak center is 1 (a. u.). It can be seen that, when a core diameter is of a cutoff diameter of $TE_{12}$ mode, the maximum of electric-field intensity and a minute spot are obtained. Further, with regard to a shape of spot, the experiment result and analysis result satisfactorily coincide with one another.

Figure 40:
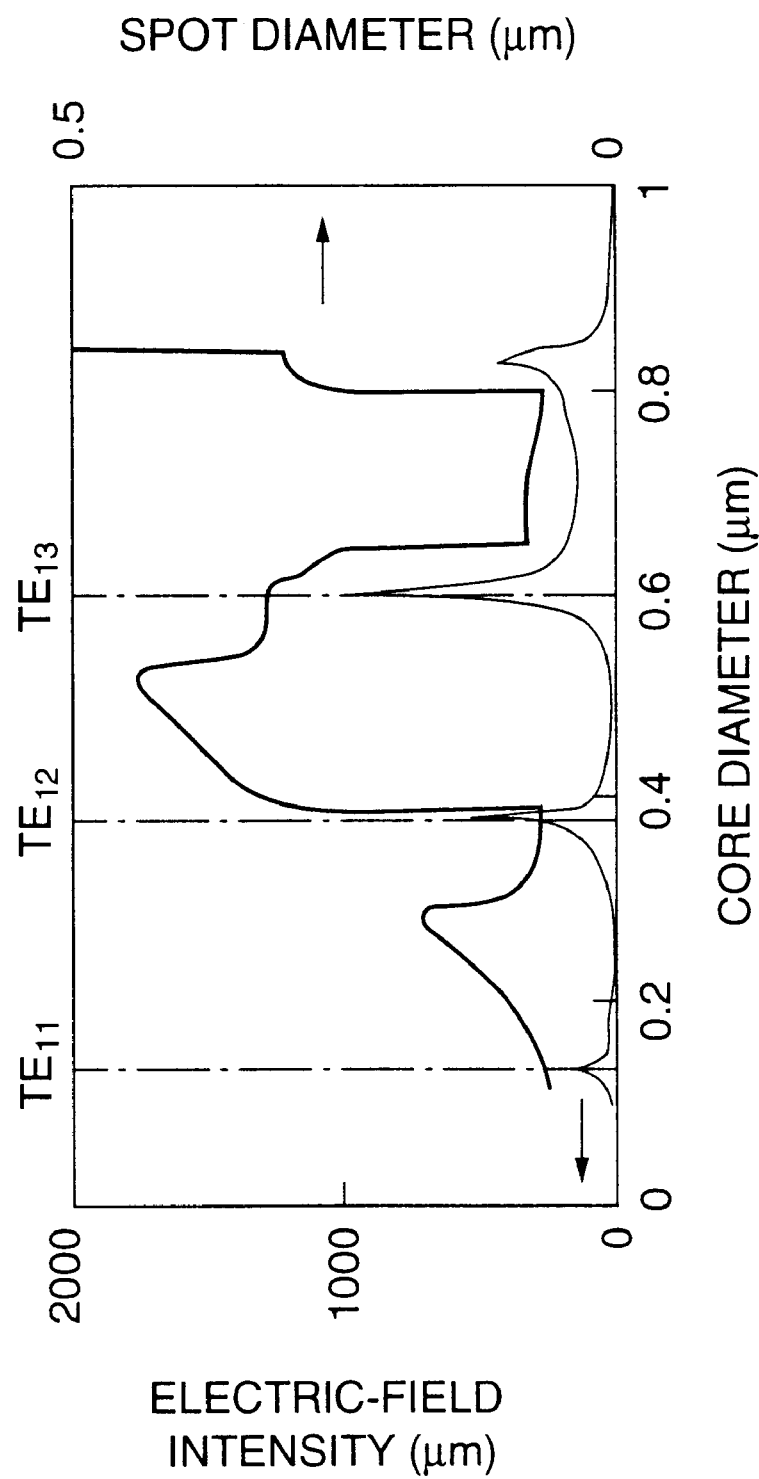
FIG. 40 shows a relationship between a core diameter, and an electric-field intensity and a spot diameter of an optical-fiber probe.

FIG. 40 shows such an analysis result and an experiment result obtained when an optical-fiber probe is used, calculated for a case where Si, which is a high-refractive-index medium and is a material of an Si projecting portion 2003 of the above-mentioned embodiments, is used as a material of a core thereof.

According to FIG. 40, when Si is used as a material of core, by causing a diameter of the core made of Si to coincide with a cutoff diameter (0.4 $\mu$m) of $TE_{12}$ mode, it is possible to form a minute spot diameter (approximately 75 nm) and the maximum of electric-field intensity.

Accordingly, as a result of an aperture diameter of an Si projecting portion 2003 being determined to be a cutoff diameter of $TE_{12}$ mode, it is possible to manufacture a probe array or a single probe by which a minute spot diameter is formed and the maximum of electric-field intensity is obtained, similarly to a case of an optical-fiber probe. Further, it is possible to manufacture a probe array or a single probe in which a loss is small and a number of peaks is small, and, therefore, which is suitable for information recording/reproducing.

Further, when a metal layer 2015 is formed, it is possible that, as shown in FIG. 28B, a light-blocking film may be formed only on inclined surfaces of an active layer 11b and a projecting-portion-formed surface of a substrate, or only on inclined surfaces of projecting portions.

Figure 41A:
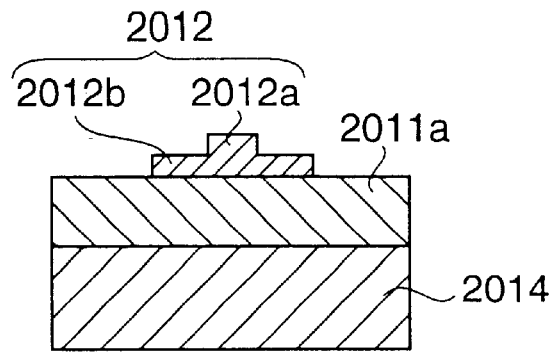
FIGS. 41A through 41E show a process chart showing a process of manufacturing a probe array or a single probe in a seventeenth embodiment of the present invention.

When a probe array 2001 in which a metal layer 20015 is formed only on inclined surfaces of Si projecting portions 2003, a shape of a mask made from an $SiO_2$ layer 2012 is such that, as shown in FIG. 41A, a central portion 2012a of the $SiO_2$ layer 2012 on a position of a tip of an Si projecting portion 2003 which will be formed has a predetermined thickness, and a surrounding portion 2012b of the $SiO_2$ layer 2012 on positions other than the position of the tip of the Si projecting portion 2003 has a thickness equal to or larger than the predetermined thickness. For example, the central portion 2012a has a thickness at least on the order of 200 nm, and the surrounding portion 2012b has a thickness on the order of ⅕ to ⅒ of the thickness of the central portion 2012a.

Figure 41B:
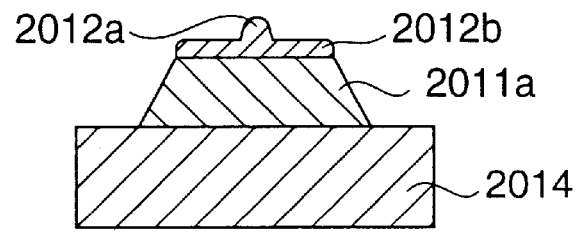
Figure 41C:
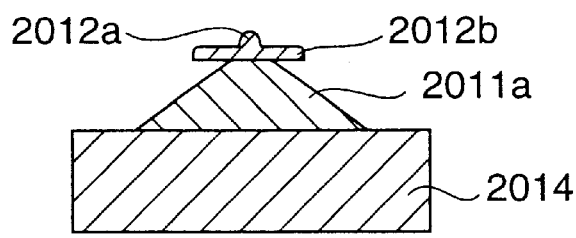
Figure 41D:
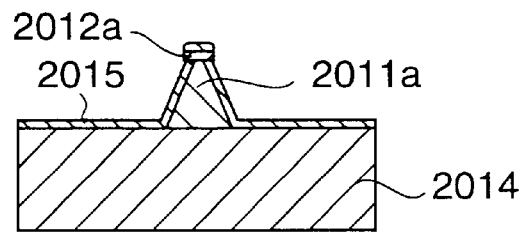
Figure 41E:
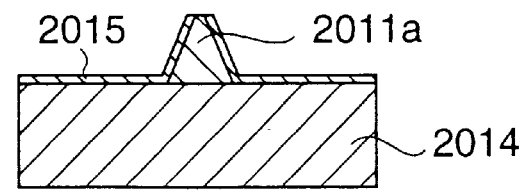

Etching is performed on the SiO$_2$ layer 2012 having this shape and an active layer 2011 using an etchant, as shown in FIGS. 41B and 41C, and, thus, the central portion 2012a is caused to remain only on a tip of an active layer 2011a, finally, as shown in FIG. 41D. Then, a metal layer 2015 is formed using the remaining central portion 2012a as a cap. Then, as shown in FIG. 41E, the central portion 2012a is removed by wet etching. Thereby, it is possible to make a combination in which the metal layer 2015 is absent on the tip of the active layer 2011a, and to form the metal layer 2015 only on an inclined surface of the active layer 2011a.

In the thus-manufactured probe array 2001, light other than light generated from the tip of the Si projecting portion 2002 can be blocked. Therefore, in comparison to the case shown in FIG. 36, it is possible to further increase an intensity of generated light.

Figure 42B:
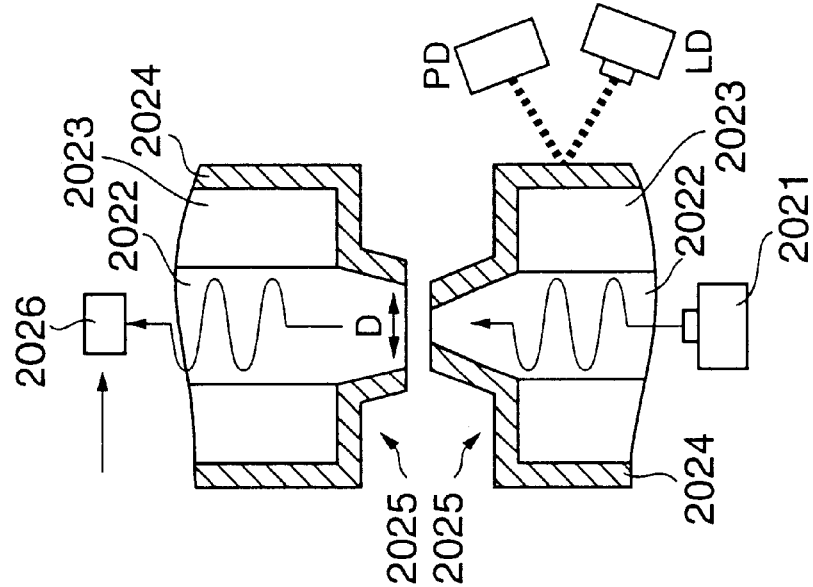
FIG. 42B shows a measuring arrangement for measuring an optical efficiency of an optical-fiber probe.
Figure 42A:
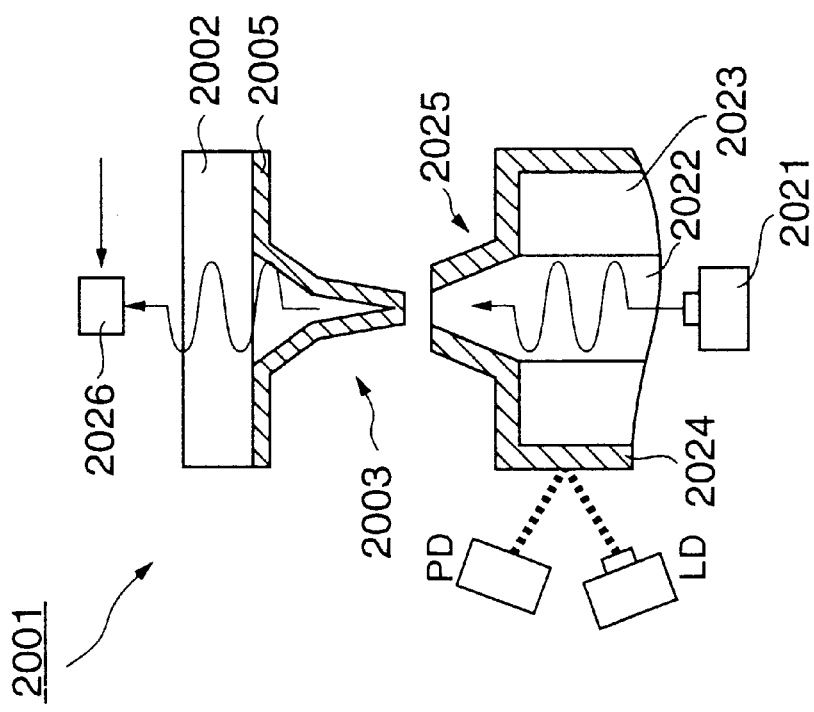
FIG. 42A shows a measuring arrangement for measuring an optical efficiency of a probe array according to the present invention.

A light efficiency of a probe array 2001 manufactured as described above will now be described. FIG. 42A shows a measurement arrangement used when the light efficiency of the probe array 2001 is measured. In this measurement arrangement, laser light having a wavelength of 830 nm is emitted by a laser diode 2021, and an optical near-field is generated at a tapered portion 2025 (aperture diameter=100 nm) of an optical-fiber probe, which includes a core 2022, a clad 2023 and a metal covering layer 2024 and a tip of which is tapered. In the probe array 2001, the optical near-field generated at the tapered portion 2025 of the optical-fiber probe is detected, and, light having passed through an Si projecting portion 2003 and a glass substrate 2002 is detected by a photodetector 2026. Here, the aperture diameter of the tapered portion 2025 of the optical-fiber probe is 100 nm. In this measurement arrangement, it is possible to measure a light intensity of an optical near-field generated at a tip of the Si projecting portion 2003 when laser light is incident from the optical-fiber probe. Thereby, it is possible to obtain a throughput of the probe array in a near field range. Further, in order to evaluate a throughput and a resolution of the probe array 2001, measurement was performed (FIG. 42B) also on an internal light-gathering probe (aperture diameter D=920 nm) having characteristics of high throughput (10%) and high resolution (150 nm).

Figure 43:
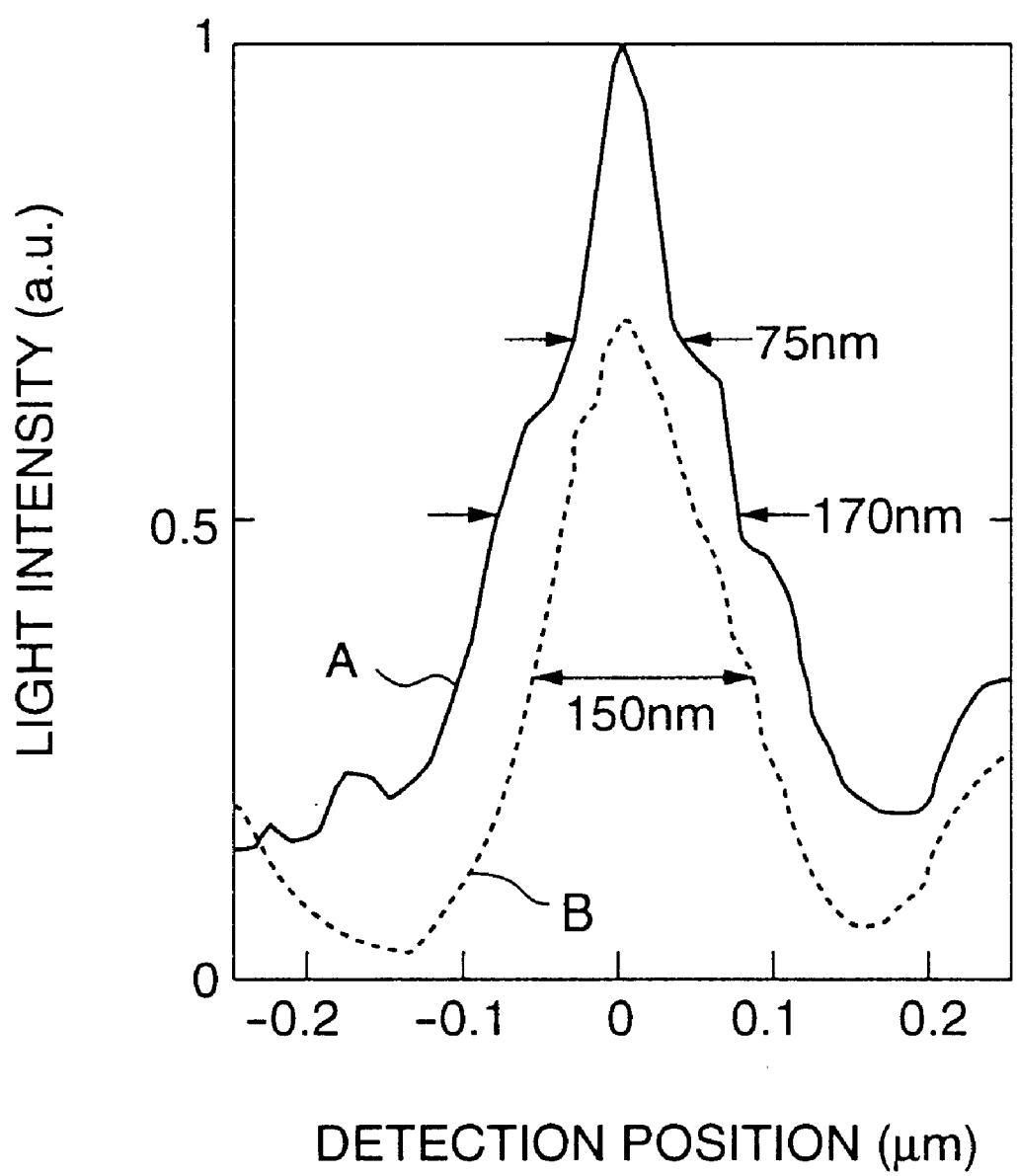
FIG. 43 shows a relationship between a detection position and a light intensity of a optical near-field generated by an optical-fiber probe by a solid line A and shows a relationship between a detection position and a light intensity of light detected by a probe array according to the present invention by a broken line B.

FIG. 43 shows a relationship between a light intensity (a. u.) detected by the photodetector 2026 and a position ($\mu$m) at which light is detected measured by this measurement arrangement. In FIG. 43, a characteristic A (solid line) is a measurement result on the probe array 1 made by the above-described processes while a characteristic B (broken line) is a measurement result on the internal light-gathering probe. When the characteristic A and characteristic B are compared with one another, it is seen that the probe array 2001 has an efficiency of 10%, has a throughput (15%) larger than that of the internal light-gathering probe, and has a resolution of 75 nm.

Accordingly, by a probe array 2001 manufactured by the above-described manufacturing method, light is gathered at high efficiency and an optical near-field having a high light intensity can be generated at a tip of an Si projecting portion 2003, and, also, sample measurement can be performed with a high resolution at the same time.

Further, by this probe array 2001, it is possible to perform recording and/or reproducing a signal to/from a recording medium at a high recording density and with a high S/N, by causing light to be incident on the recording medium, for example.

Another example of a method of manufacturing a probe array 2001 or a single probe will now be described. Technique(s) described above in the description of the manufacturing method of a probe array 2001 or a single probe can also be used in a case of manufacturing a probe array or single probe which will now be described.

In the above-described manufacturing method of a probe array 2001, a material of projecting portions made on a glass substrate 2014 is not limited to Si. Any other material having a refractive index higher than that of the glass substrate 2014 can be used instead. As materials having a light transmitting range on the short-wavelength side of that of Si and having high refractive indexes, there are GaP, TiO$_2$ (commonly called rutile) and so forth. GaP has a light transmitting range in 530 nm to 16 $\mu$m and has a refractive index of 3.35 in the light transmitting range. TiO$_2$ has a light transmitting range in 450 nm to 6 $\mu$m and has a refractive index of 2.61 to 2.90 in the light transmitting range.

FIGS. 44A through 44G show a method of manufacturing a probe array or a single probe using GaP.

Figure 44A:
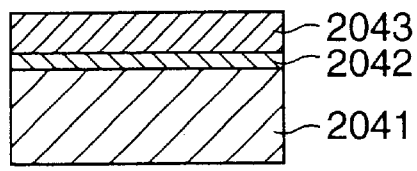
FIGS. 44A through 44G show a method of making a probe array employing GaP (FIG. 44A showing that a single-crystal GaP wafer is bonded to a single-crystal Si wafer, FIG. 44B showing that a glass substrate and the single-crystal GaP wafer are bonded together, FIG. 44C showing that the single-crystal Si wafer is removed, FIG. 44D showing that $SiO_2$ patterns are formed on the single-crystal GaP wafer, FIG. 44E showing that GaP projecting portions are formed, FIG. 44F showing that the $SiO_2$ patterns are removed, and FIG. 44G showing that a metal layer is formed) in an eighteenth embodiment of the present invention.

First, as shown in FIG. 44A, to a single-crystal Si wafer 2041, to which an oxide film 2042 is attached as an intermediate layer, a single-crystal GaP wafer 2043 is bonded by direct bonding or normal-temperature bonding. A thickness of the single-crystal GaP wafer 2043 is caused to be 5 to 10 $\mu$m by etching or CMP. Thus, a substrate is prepared.

Figure 44D:
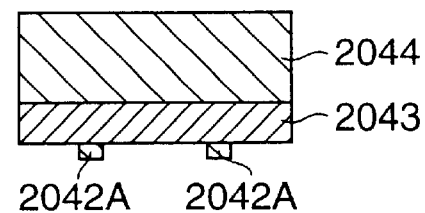
Figure 44B:
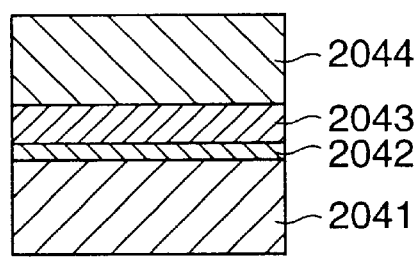

Then, as shown in FIG. 44B, a glass substrate 2044 and the single-crystal GaP wafer 2043 are bonded to one another by direct bonding or normal-temperature bonding.

Figure 44E:
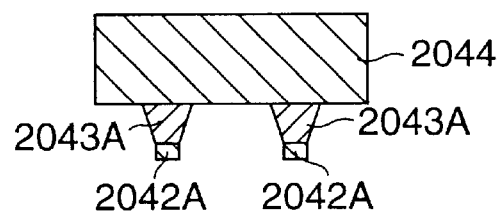
Figure 44C:
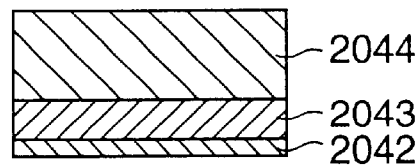

Then, as shown in FIG. 44C, the single-crystal Si wafer 2041 is removed.

Then, as shown in FIG. 44D, SiO$_2$ patterns 2042A made from the SiO$_2$ layer are formed on the single-crystal GaP wafer 2043. The respective SiO$_2$ patterns 2042A are appropriate patterns and have appropriate dimensions for forming projecting portions made of GaP in later processes.

Then, as shown in FIG. 44E, etching is performed on the single-crystal GaP wafer 2043 by RIE or a liquid etchant using the patterns 2042A as etching masks, and, thus, GaP projecting portions 2043A are formed. It is also possible to form the GaP projecting portions 2043A using only photoresist patterns made by photolithography as etching masks without using the SiO$_2$ layer as etching masks.

Figure 44F:
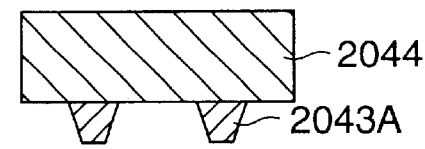

Then, as shown in FIG. 44F, the SiO$_2$ patterns 2042A remaining on the GaP projecting portions 2043A are removed by a dilute hydrofluoric acid or the like.

Figure 44G:
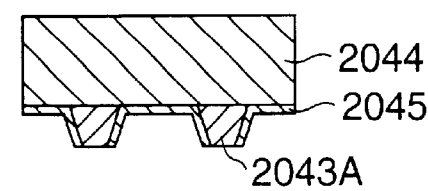

Then, as shown in FIG. 44G, a metal layer 2045 is formed on side surfaces of the GaP projecting portions 2043A and a surface of the glass substrate 2044 at positions at which the GaP projecting portions 2043A are absent.

Thereby, it is possible to make a projection-type probe array having a plurality of projecting portions made of GaP. It is possible to make a probe array provided with projecting portions by approximately same processes also in a case where another material such as TiO$_2$ or the like other than GaP is employed.

Because a probe array provided with a plurality of projecting portions made of GaP or TiO$_2$ has a high light transmitting range on the short-wavelength side of that of a probe array made of Si, light absorption in a short wavelength band is small, and it is possible to obtain a further higher light utilization efficiency. Further, because it is possible to use light having a short wavelength in comparison to a case where Si is used, it is possible to form further smaller beam spots, and, to increase a recording density when information is recorded on a recording medium for example.

An example of a method of manufacturing a probe array using an Si wafer other than an SOI substrate will now be described making reference to FIGS. 45A through 45H. Technique(s) described above in the descriptions of the manufacturing methods of probe arrays 2001 or single probes can also be used in a case of manufacturing-a probe array or a single probe which will now be described.

Figure 45A:
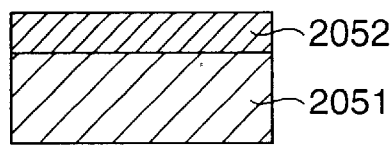
FIGS. 45A through 45H show a method of making a probe array employing an Si wafer other than an SOI substrate (FIG. 45A showing a substrate having an n-type Si layer formed on a p-type Si layer, FIG. 45B showing that anodic bonding is performed so that a glass substrate comes into contact with a surface of the n-type Si layer, FIG. 45C showing that etching is performed after the p-type Si layer is removed, FIG. 45D showing that a pattern-forming layer is formed on a surface of the n-type Si layer, FIG. 45E showing that patterns are formed on the n-type Si layer, FIG. 45F showing that etching is performed so that Si projecting portions are formed, FIG. 45G showing that the patterns remaining on the Si projecting portions are removed and FIG. 45H showing that a metal layer is formed on the glass substrate) in a nineteenth embodiment of the present invention.

First, as shown in FIG. 45A, an n-type Si layer 2052 having a thickness of 5 to 10 µm is formed on a p-type Si layer 2051 having a thickness of hundreds of microns, and, thus, a substrate is prepared. Here, the n-type Si layer 2052 may be formed by epitaxial growth on the p-type Si layer 2051, or may be formed as a result of n-type impurities being diffused from a surface of the p-type Si layer 51 by solid phase diffusion or ion implantation. Alternatively, the substrate may be made as a result of the p-type Si layer 2051 and n-type Si layer 2052 being stuck together.

Figure 45E:
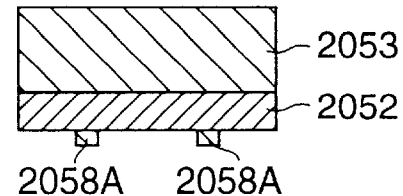
Figure 45B:
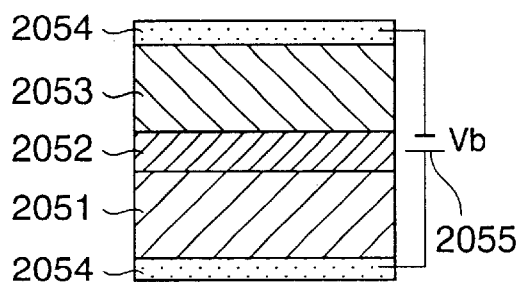

Then, as shown in FIG. 45B, a glass substrate 2053 is prepared, and the glass substrate 2053 and the substrate consisting of the p-type Si layer 2051 and n-type Si layer 2052 are bonded together by anodic bonding in a manner such that the glass substrate 2053 is in contact with the surface of the n-type Si layer 2052. Here, electrodes 2054 are formed or electrode plates 2054 are placed on a surface of the glass substrate 2053, which surface does not have the n-type Si layer 2052 in contact therewith and a surface of the p-type Si layer 2051, which surface does not have the n-type Si layer 2052 in contact therewith, then, a power source 2055 which applies a voltage Vb between the respective electrodes 2054 is provided, and, thereby, anodic boning is performed. It is also possible to bond the glass substrate 2053 and n-type Si layer 2052 together by direct bonding or normal-temperature bonding other than anodic bonding.

Figure 45F:
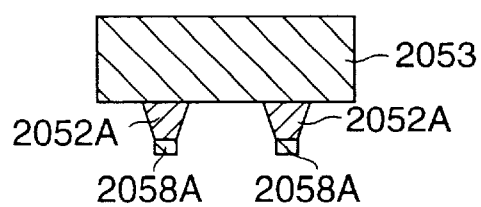
Figure 45C:
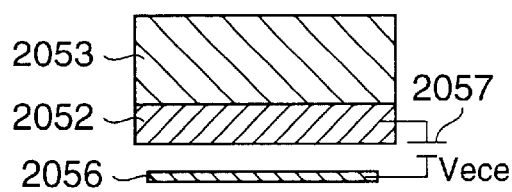

Then, as shown in FIG. 45C, after the p-type Si layer 2051 is removed almost completely by mechanical polishing, or chemical mechanical polishing (CMP), etching by an alkaline etchant such as hydrazine ($N_2H_4 \cdot H_2O$), a KOH solution, an NaOH solution, a CaOH solution, EDP (EthyleneDiamine Pyrocatechol (water)), TMAH (TetraMethyl AmmoniumHydroxide), $(CH_3)_4NOH$) or the like. However, at this time, the etching is performed with a power source 2057 provided which applies a voltage Vece between the n-type Si layer 2052 and a reference electrode 2056 placed in the etchant.

Figure 46:
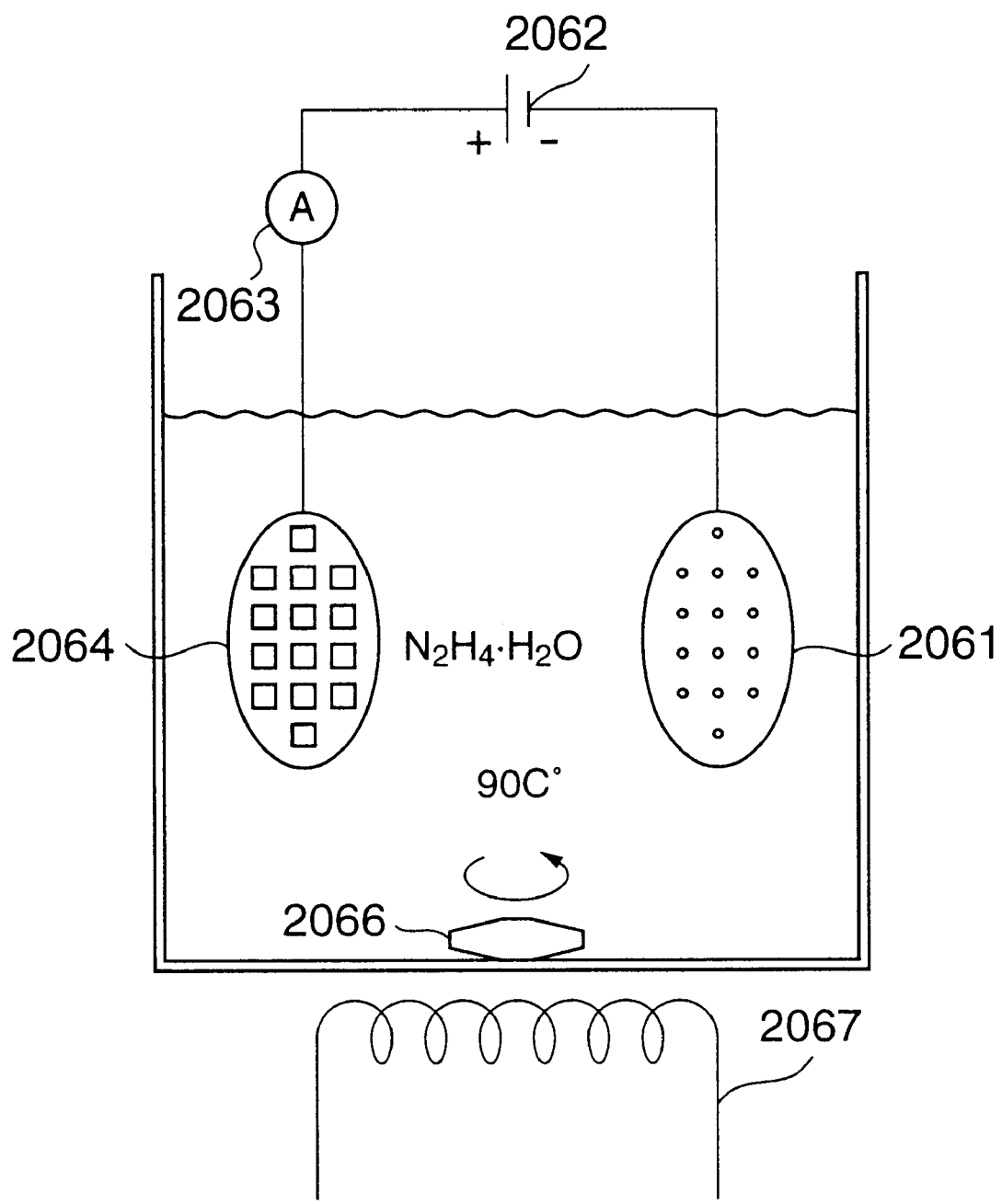
FIG. 46 shows an etching arrangement for performing electrochemical etching.

FIG. 46 roughly shows an etching arrangement for performing such an etching method (electrochemical etching). In this etching arrangement, a Pt electrode 2061 corresponding to the above-mentioned reference electrode 2056, a power source 2062 corresponding to the above-mentioned power source 2057, an ammeter 2063, and an etching object 2064 corresponding to the above-mentioned substrate consisting of n-type Si layer 2052 and glass substrate 2053 are connected in series, and the Pt electrode 2061 and etching object 2064 are arranged in an etchant 2065. In this etching arrangement, the etchant 2065 is stirred by a stirrer 2066 and is maintained at 90° C. by a heater 2067.

Using such an etching arrangement, an alkaline etchant, for example, erodes not only the p-type Si layer 2051 but also $SiO_2$ (main component of the glass substrate 2053). However, because the glass substrate 2053 is thick, it is not eroded completely. Further, because the n-type Si layer 2051 and glass substrate 2053 are bonded together very firmly, no etchant enters therebetween and the n-type Si layer 2052 is not eroded. Accordingly, only the p-type Si layer 2051 is removed by etching. In a case where hydrofluoric acid and nitric acid is used as an etchant, etching hardly advances further when the n-type Si layer 2052 is exposed. Therefore, it is possible for etching to stop when the p-type Si layer 2051 is completely removed by the etching.

Figure 45G:
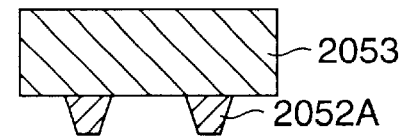
Figure 45D:
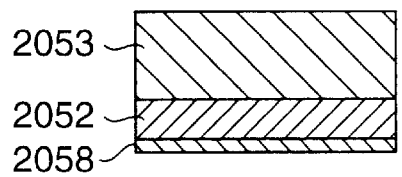

Then, as shown in FIG. 45D, a pattern-forming layer 2058, made of $SiO_2$, $Si_3N_4$ or the like, which is not easily eroded by an alkaline etchant, is formed on the surface of the n-type Si layer 2052 by plasma CVD, thermal CVD or the like.

Then, as shown in FIG. 45E, predetermined shapes are made from the pattern-forming layer 2058, and, thus, patterns 2058A made from the pattern-forming layer 2058 are formed on the n-type Si layer 2052. These patterns 2058A are appropriate patterns and have appropriate dimensions for forming respective Si projecting portions.

Then, as shown in FIG. 45F, an alkaline etchant such as hydrazine, a KOH solution, an NaOH solution, a CaOH solution, EDP, TMAH or the like is used, and, thereby, Si projecting portions 2052A are formed. It is also possible to make the Si projecting portions 2052A by RIE using only photoresist patterns made by photolithography as etching masks without using the patterns 2058A as etching masks.

Then, as shown in FIG. 45G, the patterns 2058A remaining on the Si projecting portions 2052A are removed by a dilute hydrofluoric acid or the like.

Figure 45H:
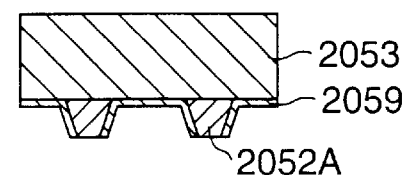

Then, as shown in FIG. 45H, a metal layer 2059 is formed on side surfaces of the Si projecting portions 2052A and a surface of the glass substrate 2053 at positions at which the Si projecting portions 2052A are not formed.

Thereby, it is possible to make a projection-type probe array or a single probe having projecting portion(s) made of Si without using an SOI substrate.

Another example of a method of manufacturing a probe array or a single probe will now be described making reference to FIGS. 47A through 47H.

Figure 47A:
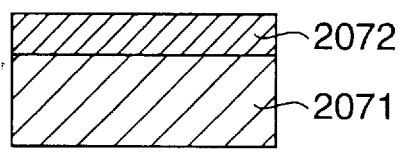
FIGS. 47A through 47H show a process chart of a process of manufacturing a probe array (FIG. 47A showing a substrate having a low-concentration Si layer formed on a high-concentration Si layer, FIG. 47B showing that anodic bonding is performed so that a glass substrate comes into contact with a surface of the low-concentration Si layer, FIG. 47C showing that etching is performed after the high-concentration Si layer is removed, FIG. 47D showing that a pattern-forming layer is formed on a surface of the low-concentration Si layer, FIG. 47E showing that patterns are formed on the low-concentration Si layer, FIG. 47F showing that etching is performed so that Si projecting portions are formed, FIG. 47G showing that the patterns are removed and FIG. 47H showing that a metal layer is formed) in a twelfth embodiment of the present invention.

First, as shown in FIG. 47A, a substrate is prepared in which a high-concentration Si layer 2071 made of a high-concentration p-type or n-type Si material and having a thickness of hundreds of microns has a low-concentration Si layer 2072 made of a low-concentration p-type or n-type Si material and having a thickness of 5 to 10 µm formed thereon. Here, the low-concentration Si layer 2072 may be formed by epitaxial growth thereof on the high-concentration Si layer 2071, or may be formed as a result of impurities of a type opposite to a type of the high-concentration Si layer 2071 being diffused from the surface of the high-concentration Si layer 2071 by solid phase diffusion, ion implantation or the like, and an impurity concentration being lowered effectively by a compensation effect. Alternatively, the substrate may be made as a result of the high-concentration Si layer 2071 and low-concentration Si layer 2072 being stuck together.

Here, it is important that respective impurity concentrations of the high-concentration Si layer 2071 and low-concentration Si layer 2072 are high and low. Any combinations of p-type Si and n-type Si are possible, however, it is preferable that the low-concentration Si layer 2072 is of an n-type Si material when the low-concentration Si layer 2072 and high-concentration Si layer 2071 have different conduction types. A reason therefor is that, when a voltage is applied in anodic bonding, bonding can be easily made when a p-n junction is forwardly biased. Further, the impurity concentration of the high-concentration Si layer should be higher than approximately $10^{17}/cm^3$, and the impurity concentration of the low-concentration Si layer should be equal to or lower than approximately $10^{17}/cm^3$.

Figure 47E:
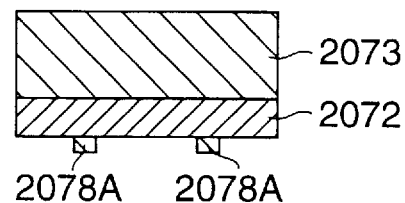
Figure 47B:
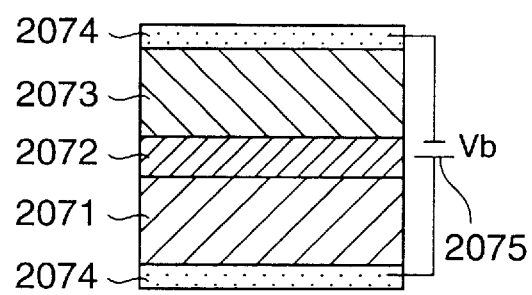

Then, as shown in FIG. 47B, a glass substrate 2073 is prepared, and anodic bonding is performed such that the glass substrate 2073 is in contact with the surface of the low-concentration Si layer 2072. Here, electrodes 2074 are formed or electrode plates 2074 are placed on a surface of the glass substrate 2073, with which surface the low-concentration Si layer 2072 is not in contact, and a surface of the high-concentration Si layer 2071, with which surface the low-concentration Si layer 2072 is not in contact, then, a power source 2075 which applies a voltage Vb between the respective electrodes 2074 is provided, and, thereby, anodic boning is performed. It is also possible to bond the glass substrate 2073 and low-concentration Si layer 2072 together by direct bonding or normal-temperature bonding other than anodic bonding.

Figure 47F:
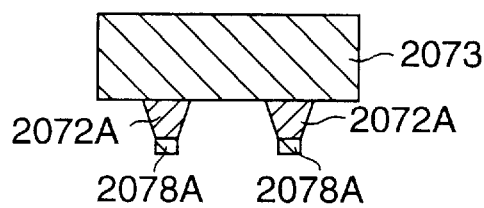
Figure 47C:
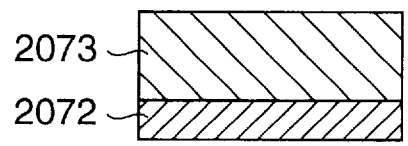

Then, as shown in FIG. 47C, after the high-concentration Si layer 2071 is removed almost completely by mechanical polishing, or chemical mechanical polishing (CMP), a thus-obtained combination is immersed in an etchant of hydrofluoric acid and nitric acid. A composition of the etchant is such that $HF:HNO_3:CH_3COOH=1:3:8$ (volume ratio). An etching rate of this etchant when an impurity concentration is lower than $10^{17}/cm^3$ is 1/150 of that when it is higher than $10^{17}/cm^3$. This etchant erodes not only Si but also $SiO_2$ (main component of glass). However, because the glass substrate 2073 is very thick, it is not eroded completely. Further, because the low-concentration Si layer 2072 and glass substrate 2073 are bonded together very firmly, no etchant enters therebetween and the low-concentration Si layer 2072 is not eroded. Accordingly, only the high-concentration Si layer 2071 is removed by etching. In etching using $HF:HNO_3:CH_3COOH=1:3:8$ (volume ratio) as an etchant, etching hardly advances further when the high-concentration Si layer 2071 is first removed and thereby the low-concentration Si layer 2072 is exposed. Therefore, it is possible for etching to stop when the high-concentration Si layer 2071 is completely removed by the etching.

Figure 47G:
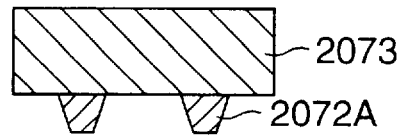
Figure 47D:
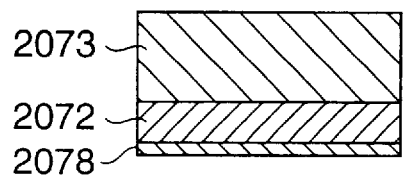

Then, as shown in FIG. 47D, a pattern-forming layer 2078, made of $SiO_2$, $Si_3N_4$ or the like, which is not easily eroded by an alkaline etchant, is formed on the surface of the low-concentration Si layer 2072 by plasma CVD, thermal CVD or the like.

Then, as shown in FIG. 47E, predetermined shapes are made from the pattern-forming layer 2078, and, thus, patterns 2078A made from the pattern-forming layer 2078 are formed on the low-concentration Si layer 2072. These patterns 2078A are appropriate patterns and have appropriate dimensions for forming a single projecting portion or respective Si projecting portions.

Then, as shown in FIG. 47F, an alkaline etchant such as hydrazine, a KOH solution, an NaOH solution, a CaOH solution, EDP, TMAH or the like is used, and, thereby, Si projecting portions 2072A are formed. It is also possible to make the Si projecting portions 2072A by RIE using only photoresist patterns made by photolithography as etching masks without using the patterns 2078A as etching masks.

Then, as shown in FIG. 47G, the patterns 2078A remaining on the Si projecting portions 2072A are removed by a dilute hydrofluoric acid, dry etching or the like.

Figure 47H:
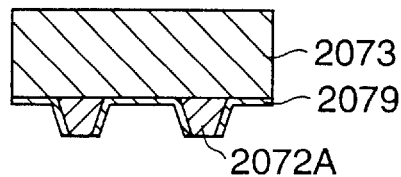

Then, as shown in FIG. 47H, a metal layer 2079 is formed on side surfaces of the Si projecting portions 2072A and the surface of the glass substrate 2073 at positions at which the Si projecting portion 2072A are not formed.

Another example of a method of manufacturing a probe array or a single probe will now be described making reference to FIGS. 48A through 48H.

Figure 48A:
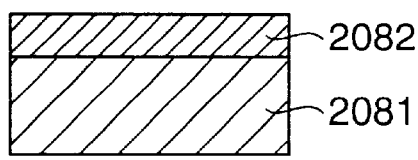
FIGS. 48A through 48H show a process chart of a process of manufacturing a probe array (FIG. 48A showing a substrate having a high-concentration p-type Si layer formed on an n-type Si layer, FIG. 48B showing that anodic bonding is performed so that a glass substrate comes into contact with a surface of the high-concentration p-type Si layer, FIG. 48C showing that etching is performed after the n-type Si layer is removed, FIG. 48D showing that a pattern-forming layer is formed on a surface of the high-concentration p-type Si layer, FIG. 48E showing that patterns are formed on the high-concentration p-type Si layer, FIG. 48F showing that Si projecting portions are formed, FIG. 48G showing that the patterns are removed and FIG. 48H showing that a metal layer is formed) in a twenty-first embodiment of the present invention.

First, as shown in FIG. 48A, a substrate is prepared in which an n-type Si layer 2081 made of an n-type Si material and having a thickness of hundreds of microns has a high-concentration p-type Si layer 2082 made of a high-concentration p-type Si material having an impurity concentration higher than that of the n-type Si layer 2081 and having a thickness of 5 to 10 $\mu$m formed thereon. Here, an impurity concentration of the high-concentration p-type Si layer 2082 is higher than $10^{20}/cm^3$ when KOH is used in removing the n-type Si layer 2081 by etching, but is higher than $10^{19}/cm^3$ when EDP is used in removing the n-type Si layer 2081 by etching. The high-concentration p-type Si layer 2082 may be formed by epitaxial growth thereof on the n-type Si layer 2081, or may be formed as a result of p-type impurities being diffused from the surface of the n-type Si layer 2081 by solid phase diffusion, ion implantation or the like. Alternatively, the substrate may be made as a result of the n-type Si layer 2081 and high-concentration p-type Si layer 2082 being stuck together.

Figure 48E:
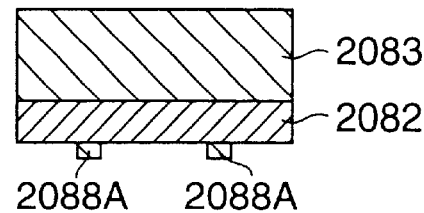
Figure 48B:
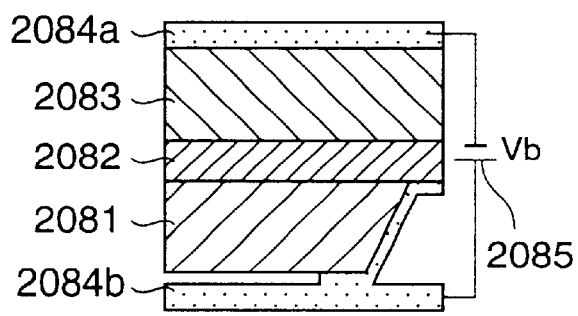

Then, as shown in FIG. 48B, a glass substrate 2083 is prepared, and anodic bonding is performed such that the glass substrate 2083 is in contact with the surface of the high-concentration p-type Si layer 2082. Here, similarly to FIG. 47B, an electrode plate is placed on a surface of the glass substrate 2083, with which surface the high-concentration p-type Si layer 2082 is not in contact. Alternatively, for more positive bonding, as well as an electrode 2084a is formed on the surface of the glass substrate 2083, with which surface the high-concentration p-type Si layer 2082 is not in contact, a part of the n-type Si layer 2081 is removed and an electrode 2084b is formed as shown in FIG. 48B so that a voltage is applied to the high-concentration p-type Si layer 2082 directly, and, then, a power source 2085 which applies a voltage Vb between the respective electrodes 2084a and 2084b is provided, and, thereby, anodic boning is performed. It is also possible to bond the glass substrate 2083 and high-concentration p-type Si layer 2082 together by direct bonding or normal-temperature bonding other than anodic bonding.

Figure 48F:
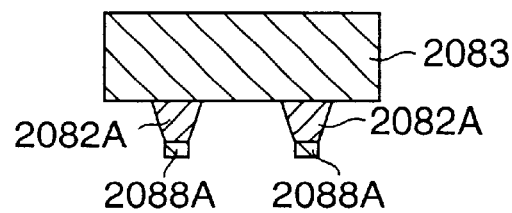
Figure 48C:
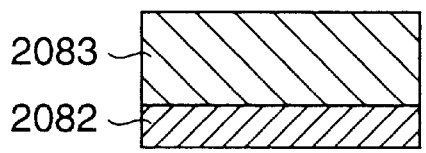

Then, after the electrodes 2084a and 2084b are removed, and, then, the n-type Si layer 2081 is removed almost completely by mechanical polishing, or chemical mechanical polishing (CMP), as shown in FIG. 48C, etching by an alkaline etchant is performed on a thus-obtained combination. As the etchant, hydrazine, a KOH solution, an NaOH solution, a CaOH solution, EDP, TMAH or the like is used. This etchant erodes not only Si but also $SiO_2$ (main component of glass). However, because the glass substrate 2083 is very thick, it is not eroded completely. Further, because the high-concentration p-type Si layer 2082 and glass substrate 2083 are bonded together very firmly, no etchant enters therebetween and the high-concentration Si layer 2082 is not eroded. Accordingly, only the n-type Si layer 2081 is removed by etching. Etching hardly advances further when the high-concentration p-type Si layer 2082 is exposed. Therefore, it is possible for etching to stop when the n-type Si layer 2081 is completely removed by the etching.

Figure 48G:
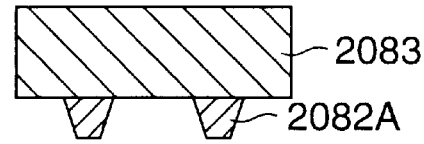
Figure 48D:
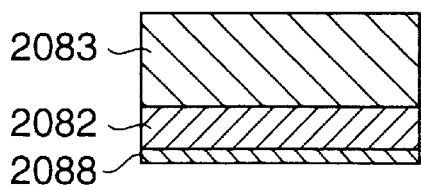

Then, as shown in FIG. 48D, a pattern-forming layer 2088, made of $SiO_2$, $Si_3N_4$ or the like, which is not easily eroded by an alkaline etchant, is formed on the surface of the high-concentration p-type Si layer 2082 by plasma CVD, thermal CVD or the like.

Then, as shown in FIG. 48E, predetermined shapes are made from the pattern-forming layer 2088, and, thus, patterns 2088A made from the pattern-forming layer 2088 are formed on the high-concentration p-type Si layer 2082.

These patterns 2088A are appropriate patterns and have appropriate dimensions for forming a single projecting portion or respective Si projecting portions.

Then, as shown in FIG. 48F, Si projecting portions 2082A are formed by RIE. It is also possible to make the Si projecting portions 2082A by RIE using only photoresist patterns made by photolithography as etching masks without using the patterns 2088A as etching masks.

Then, as shown in FIG. 48G, the patterns 2088A remaining on the Si projecting portions 2082A are removed by a dilute hydrofluoric acid, dry etching or the like.

Figure 48H:
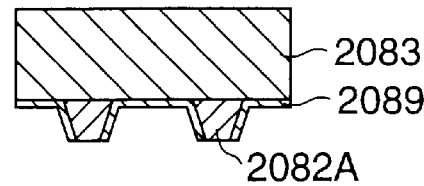

Then, as shown in FIG. 48H, a metal layer 2089 is formed on side surfaces of the Si projecting portions 2082A and the surface of the glass substrate 2083 at positions at which the Si projecting portion 2082A are not formed.

Thereby, it is possible to make a projection-type probe array or single probe having projecting portion(s) made of Si without using an SOI substrate.

Another probe array according to the present invention will now be described. In the probe array which will now be described, it is possible to use any one of the arrangements described above in the descriptions of the above-described probe arrays. Further, the probe array which will now be described may be a single probe.

Figure 49A:
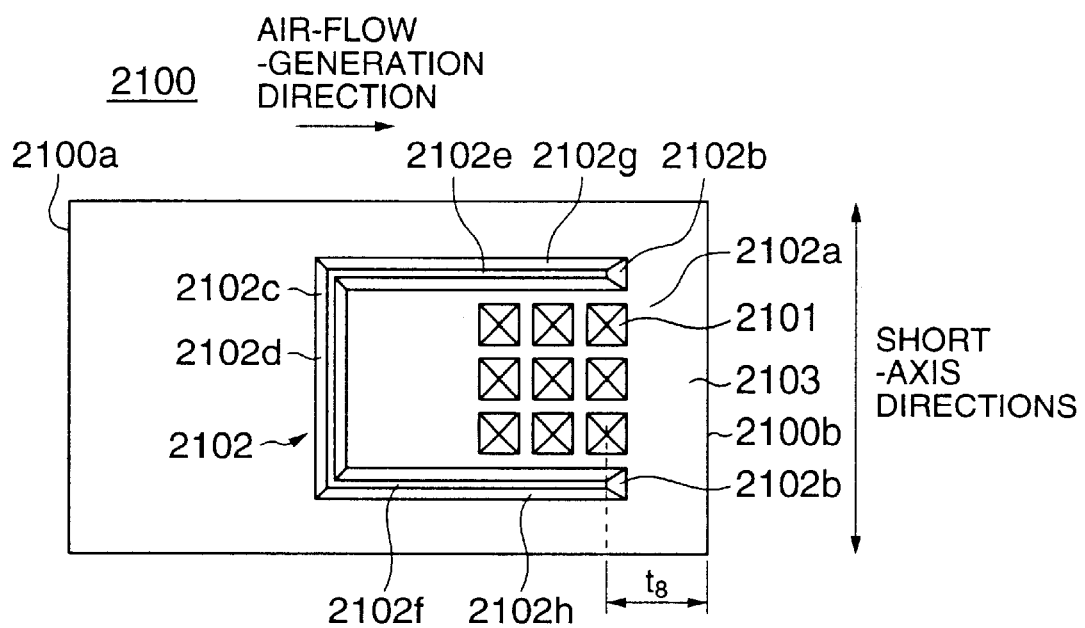
FIGS. 49A and 49B show a probe array in a twenty-second embodiment of the present invention (FIG. 49A showing a plan view thereof and FIG. 49B showing a side view thereof)
Figure 49B:
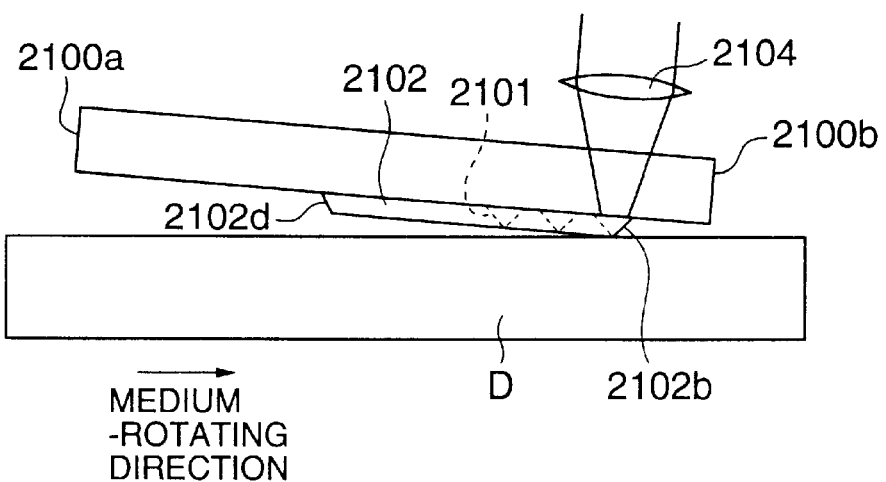

FIG. 49A shows a plan view of a probe array 2100 which is arranged in such a manner that a side on which projecting portions 2101 are formed faces a rotational recording medium (optical disc D) on which information is recorded, as shown in FIG. 49B, and emits light to the rotating optical disc D and performs recording/reproducing information on/from it.

The probe array 2100 has one end 2100a from which a medium (rotating optical disc D) comes and the other end 2100b to which the medium goes. An air flow is generated as the optical disc D rotates, and, the probe array 2100 receives the thus-generated air flow, comes into contact with the optical disc D, emits light to the optical disc D, and performs information recording/reproducing in a contact manner. This probe array 2100 can also be used as a floating-type probe array which floats from an optical disc D by a fixed floating amount.

This probe array 2100 has a bank portion 2102 which is arranged to surround the projecting portions 2101 and has an opening portion 2102a on a downstream side of an air flow generated due to rotation of the optical disc D.

In this probe array 2100, an air flow coming from the one end 2100a is directed to the other end 2100b and is caused to go out via the opening portion 2102a of the bank portion 2102 to the other end 2100b.

In this probe array 2100, the bank portion 2102 includes a bank 2102c perpendicular to an air-flow-generation direction (medium-rotation direction) on the one-end-2100a side of the projecting portions 2101. Thereby, it is possible to prevent dusts and so forth flowing from the one end 2100a to the other end 2100b from flowing into the projecting portions 2101.

Further, in this probe array 2100, even when dusts/dirt existing inside a device flow into the bank portion 2102 due to an air flow mentioned above, these flow out from the opening portion 2102a. Thereby, no dusts/dirt accumulate in the vicinity of the projecting portions 2101.

Further, in this probe array 2100, because the bank portion 2102 has the opening portion 2102a and thus no bank exists on the other-end-2100b side, it is possible to form the projecting portions 2101 on the other-end-2100b side. Thereby, it is possible to cause tips of the projecting portions 2101 to approach the optical disc D and to shorten distances between the projecting portions 2101 and the optical disc D. Thereby, it is possible to reduce diameters of beam spots formed on the optical disc D by light emitted from the projecting portions 2101, and to increase a recording density on the optical disc D.

Further, in the probe array 2100, the bank portion 2102 has end portions 2102b on the other-end-2100b side, which end portions are tapered portions 2102b inclined from the one end 2100a to the other end 2100b. Vertexes of the tapered portions 2102b are aligned with tips of projecting portions 2101 arranged on the other-end-2100b side in a straight line in short-axis directions of the glass substrate. Thereby, at a time of recording/reproduction, even when the vertexes of the tapered portions 2102b come into contact with the optical disc D, a pressure applied to the vertexes of the bank portion 2102 by the optical disc D is spread. As a result, it is possible to prevent the bank portion 2102 from being destroyed.

Further, in the probe array 2100, the bank 2102c of the bank portion 2102 has a tapered portion 2102d inclined from the one-end-2100a side to the other-end-2100b side. Thereby, even when the optical disc D comes to and comes into contact with the bank 2102c, a shock against the optical disc D is absorbed by the tapered portion and it is possible to prevent the optical disc D from being destroyed.

Further, in the probe array 2100, the bank portion 2102 includes banks 2102e and 2102f approximately parallel to the air-flow-generation direction (medium-rotation direction) and perpendicular to a radial direction of the optical disc D. The banks 2102e and 2102f has tapered portions 2102g and 2102h inclined in the radial direction of the optical disc D. Thereby, at a time of information recording/reproducing by the probe array 2100 on the optical disc D, even when the bank 2102e or 2102f comes into contact with the optical disc D as the probe array 2100 moves in the radial direction of the optical disc D, a shock against the optical disc D is absorbed by the tapered portion 2102g or 2102h and it is possible to prevent the optical disc D from being destroyed.

Further, in the probe array 2100, the glass substrate has a protruding portion 2103 which protrudes on the other-end-2100b side. The protruding portion 2103 protrudes from the projecting portions 2101 to the other end 2100b by a length of $t_8$, as shown in FIG. 49A. This length $t_8$ is set so that, at a time of recording/reproducing, light emitted from a light source can be incident on the projecting portions 2101 nearest to the other end 2100b. Specifically, the length $t_8$ of the protruding portion 2103 is determined based on a thickness of the glass substrate, a refractive index of the glass substrate, and a numerical aperture of an optical component (objective lens) 2104 for directing light to the projecting portions 2101. Thereby, in the probe array 2100, the thus-determined length $t_8$ is an optimum length, the projecting portions 2101 are arranged on the other-end-2100b side, it is possible to shorten a distance from the optical disc D, and, thereby, a small beam spot is formed on the optical disc D as a result of light being gathered.

Figure 50:
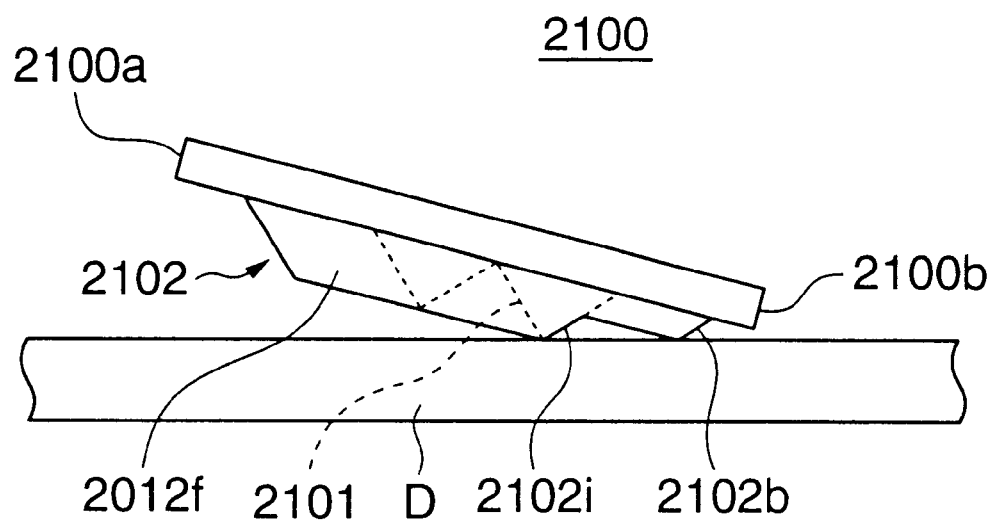
FIG. 50 shows a side view of a probe array in a twenty-third embodiment of the present invention.

Further, the probe array 2100 may be modified as shown in FIG. 50. In the probe array 2100 shown in FIG. 50, each of banks 2102f and 2102e is of multiple steps. In this probe array 2100, a tapered portion 2102b and a tapered portion 2102i are formed in each of the banks 2102f and 2102e from one end 2100a to the other end 2100b, and, in short-axis directions, vertexes of the tapered portions 2102i are aligned with tips of projecting portions 2101 located on the other-end-2100b side in a straight line.

Thereby, when the probe array 2100 shown in FIG. 50 comes into contact with an optical disc D, the vertexes of the tapered portions 2102b and tapered portions 2102i come into contact with the optical disc D as shown in FIG. 50, and it is possible to distribute a force applied to the optical disc D to more points than those in a case where the vertexes of only the tapered portions 2102b come into contact with the optical disc D, and to reduce damage of the projecting portions 2101 and to reduce damage of the optical disc D.

Further, when this probe array 2100 shown in FIG. 50 is used for information recording/reproducing performed as being in contact with an optical disc D, because each of the banks 2102f and 2102e is of multiple steps, the vertexes of the tapered portions 2102b and 2102i come into contact with the optical disc D. Thereby, it is possible to prevent the probe array 2110 from inclining at a time of recording/reproducing.

Further, when this probe array 2100 shown in FIG. 50 is used, because each of the banks 2102f and 2102e is of multiple steps, it is possible to reduce a coefficient of static friction by reducing a contact area with an optical disc D, and to reduce an abrasion amount of the banks 2102f and 2102e.

Further, because the vertexes of the tapered portions 2102b and 2102i come into contact with a recording medium and two points arranged in an air-flow-generation direction come into the recording medium for each of the banks 2102f and 2102e, the probe array 2110 can be prevented from pitching.

Another probe array according to the present invention will now be described. In the probe array which will now be described, it is possible to use any one of the arrangements described above in the descriptions of the above-described probe arrays. Further, the probe array which will now be described may be a single probe.

Figure 51A:
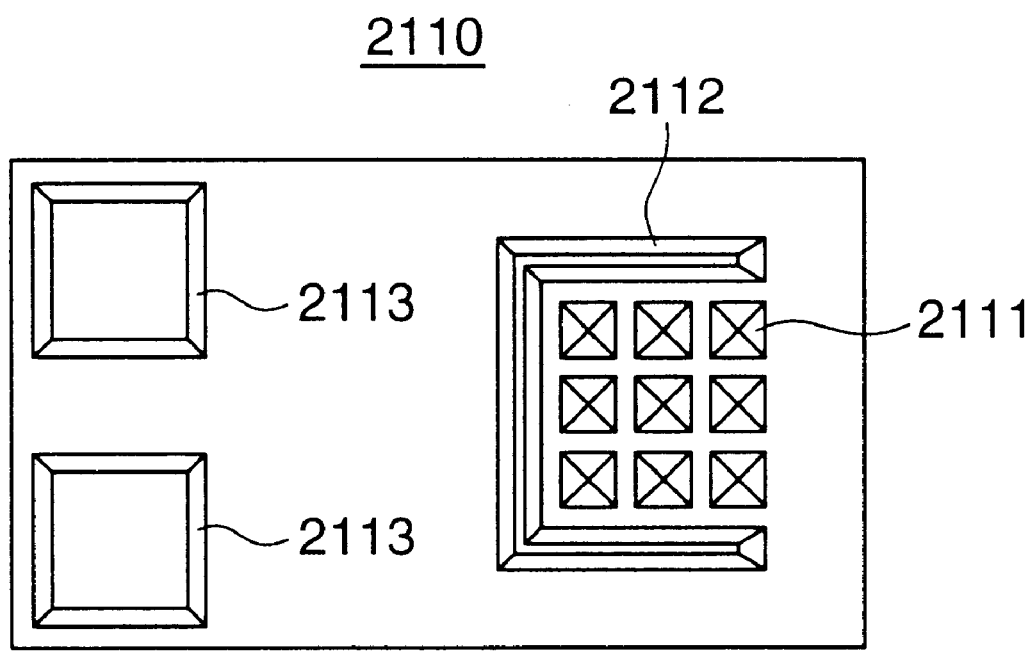
FIGS. 51A and 51B show a probe array in a twenty-fourth embodiment of the present invention (FIG. 51A showing a plan view thereof and FIG. 51B showing a side view thereof)
Figure 51B:
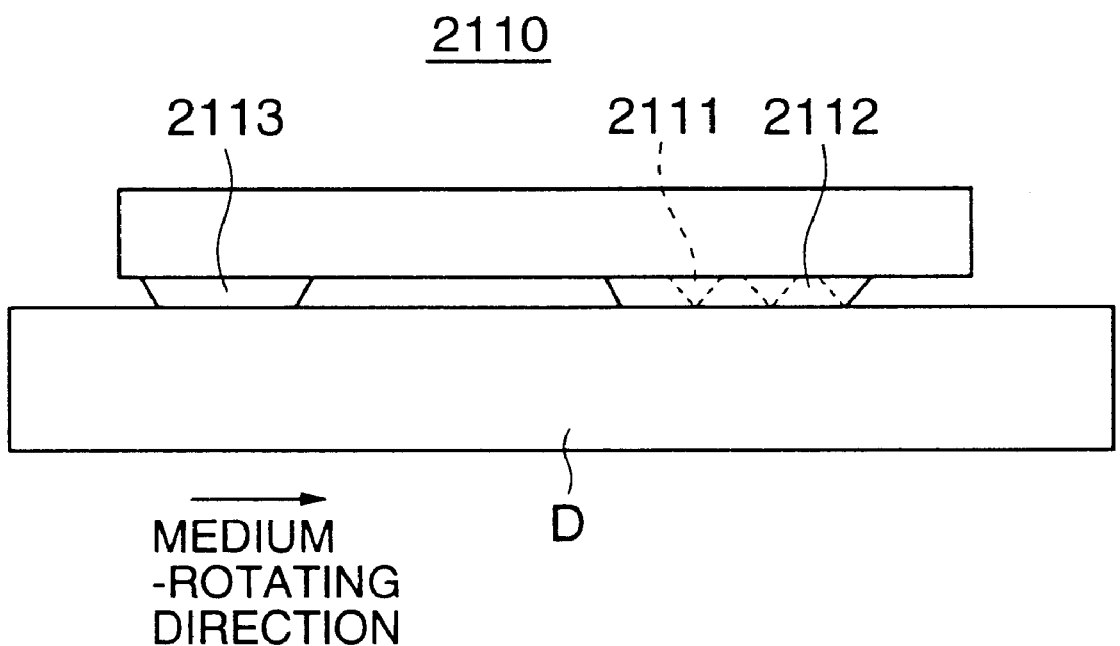

FIG. 51A shows a plan view of a probe array 2110 which is arranged in such a manner that a side on which projecting portions 2111 are formed faces a rotational recording medium (optical disc D) on which information is recorded as shown in FIG. 51B, and emits light to the rotating optical disc D and performs recording/reproducing information on/from it.

This probe array 2110 has a bank portion 2112 made of a high-refractive-index material (for example, Si) the same as that of the projecting portions 2111 and arranged in a position such as to surround the projecting portions 2111, and pad portions 2113 made of the same material as that of the projecting portions 2111, provided on the surface thereof facing the optical disc D.

In this probe array 2110, as described above, when the projecting portions 2111, bank portion 2112 and pad portions 2113 are made, an etching layer (for example, $SiO_2$) is formed on a single high-refractive-index layer, respective patterns corresponding to the projecting portions 2111, bank portion 2112 and pad portions 2113 are formed from the etching layer, and, etching is performed on a thus-obtained combination so that the projecting portions 2111, bank portion 2112 and pad portions 2113 are formed simultaneously from the high-refractive-index layer.

When this probe array 2110 is used, the projecting portions 2111, bank portion 2112 and pad portions 2113 are caused to come into contact with an optical disc D as shown in FIG. 51B. Then, light from the projecting portions 2111 is caused to be incident on the optical disc D, and recording/reproducing of information is performed on the optical disc D.

Because the projecting portions 2111, bank portion 2112 and pad portions 2113 are formed from the same material simultaneously by etching as mentioned above, it is possible to make the projecting portions 2111, bank portion 2112 and pad portions 2113 have the same height in the probe array 2110. Thereby, it is possible to improve stability in sliding of the probe array 2110 on an optical disc D, and to prevent the projecting portions 2111 from being destroyed.

Figure 52:
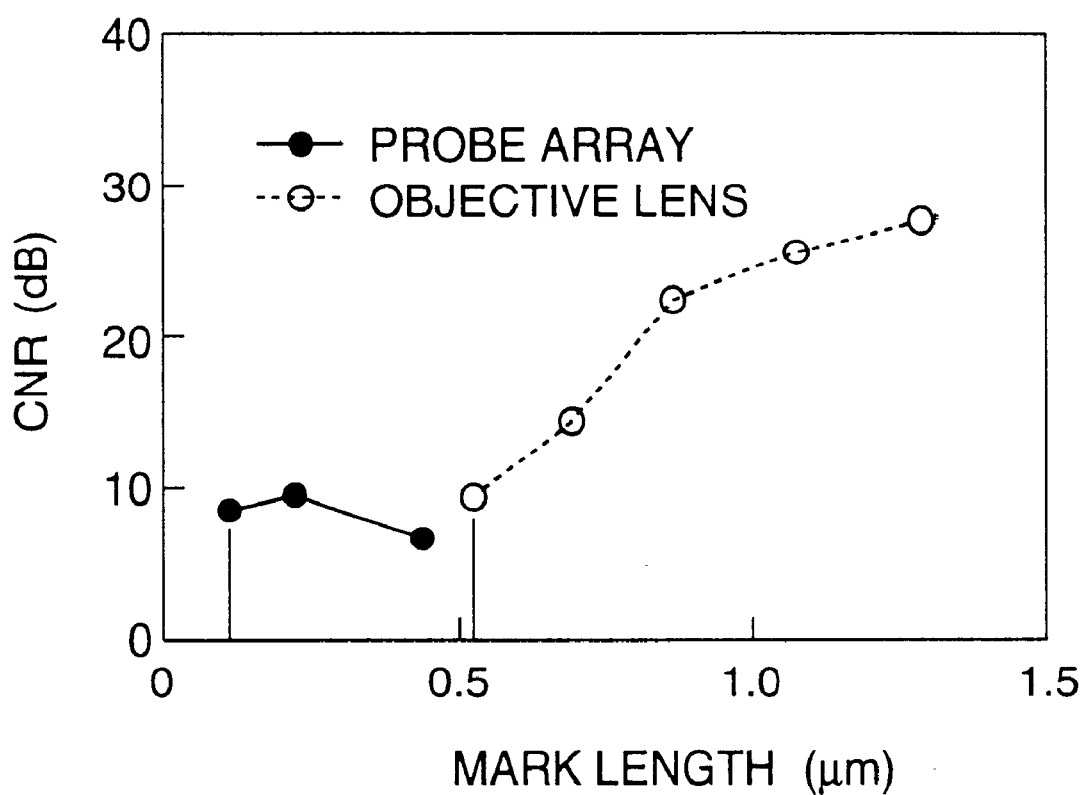
FIG. 52 shows a relationship between a mark length obtained when recording is performed on an optical disc by the probe array shown in FIGS. 51A and 51B and a CN ratio obtained when reproducing is performed.

FIG. 52 shows a relationship between a mark length ($\mu$m) and a CN ratio (dB) in a case where such a probe array 2110, in which hundred projecting portions 2111 are arranged, is used for recording marks on a phase-change optical disc D and reproducing from the thus-recorded marks in a condition where light having a wavelength of 830 nm is incident on each projecting portion 2111 and an optical near-field is generated at a tip thereof, and the phase-change optical disc D is rotated at a linear velocity of 0.43 m/s. According to FIG. 52, the minimum mark length when the probe array 2110 is used to recording marks is 110 nm, and a CN ratio when reproduction from the mark is performed is approximately 10 dB. Accordingly, it is possible to record a mark having a size equal to or smaller than a diffraction limit which could not be achieved by a propagation light, and to reproduce therefrom.

In contrast to this, the minimum mark length when an objective lens having a numerical aperture of 0.4 is used to emit propagation light to the optical disc D so as to record marks thereon is 515 nm, and a CN ratio when reproduction from the mark is performed is approximately 10 dB.

According to this result, when the prove array 2110 is used, it is possible to perform recording/reproducing in a condition in which a recording/reproducing rate is a very high rate of 1 Gbps by performing recording/reproducing in parallel using the hundred projecting portions 2111, and, to reduce sizes of marks so as to achieve recording/reproducing in a very high density.

Another probe array according to the present invention will now be described. In the probe array which will now be described, it is possible to use any one of the arrangements described above in the descriptions of the above-described probe arrays. Further, the probe array which will now be described may be a single probe.

Figure 53A:
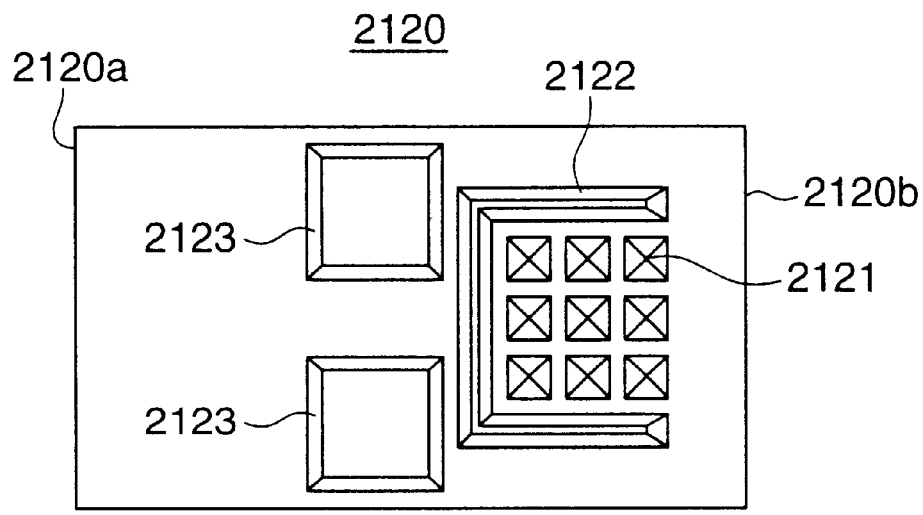
FIGS. 53A and 53B show another example of a probe array in a twenty-fifth embodiment of the present invention (FIG. 53A showing a plan view thereof and FIG. 53B showing a side view thereof)
Figure 53B:
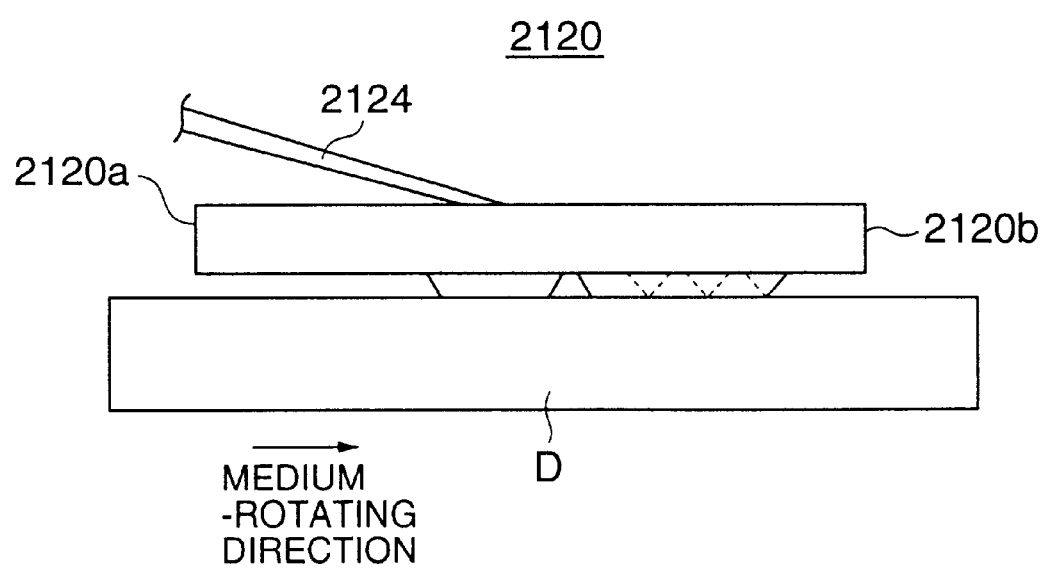

FIG. 53A shows a plan view of a probe array 2120 which is arranged in such a manner that a side on which projecting portions 2121 are formed faces a rotational recording medium (optical disc D) on which information is recorded as shown in FIG. 53B, and emits light to the rotating optical disc D and performs recording/reproducing information on/from it.

This probe array 2120 has a bank portion 2122 made of a high-refractive-index material (for example, Si) the same as that of the projecting portions 2121 and arranged in a position such as to surround the projecting portions 2121, and pad portions 2123 made of the same material as that of the projecting portions 2121, provided on the surface thereof facing the optical disc D. The probe array 2120 performs recording/reproducing of information in a condition in which the bank portion 2122 and pad portions 2123 are in contact with the optical disc D.

The pad portions 2123 are formed so as to be located on a center line at a central position between one end 2120a and the other end 2120b, or so that a central position of the pad portions 2123 is located at a position within the range between ±0.1 from the central position between the one end 2120a and the other end 2120b assuming that a length between the one end 2120a and the other end 2120b is 1. As shown in FIG. 53B, a pressing member 2124 presses the probe array 2120 so as to cause it to come into contact with the optical disc D, and the pad portions 2123 are arranged right underneath a position at which the pressing member 2124 presses the probe array 2120 in a pressing direction (thickness direction of the probe array 2120). Thereby, the pad portions 2123 transmits a pressing force of the pressing member 2124 to the optical disc D, and, thereby, the probe array 2120 is pressed onto the optical disc D. Thereby, it is possible to further improve stability of sliding of the probe array 2120 on the optical disc D. Further, a manner of arranging the pad portions 2123 is not limited to one in which the central position thereof is located at a predetermined position between the one end 2120a and the other end 2120b, and, it is also possible to arrange the pad portions 2123 in a manner in which the center of gravity thereof is located at a predetermined position between the one end 2120a and the other end 2120b.

When the probe array 2120 is used, in comparison to a case where the above-mentioned probe array 2110 is used, it is possible to control a jumping amount when recording/reproducing is performed on an optical disc D. Comparison in jumping amount between the probe array 2110 in which the pad portions are provided on the medium-coming side and the probe array 2120 in which the pad portions are located at the central position will now be made.

Figure 54:
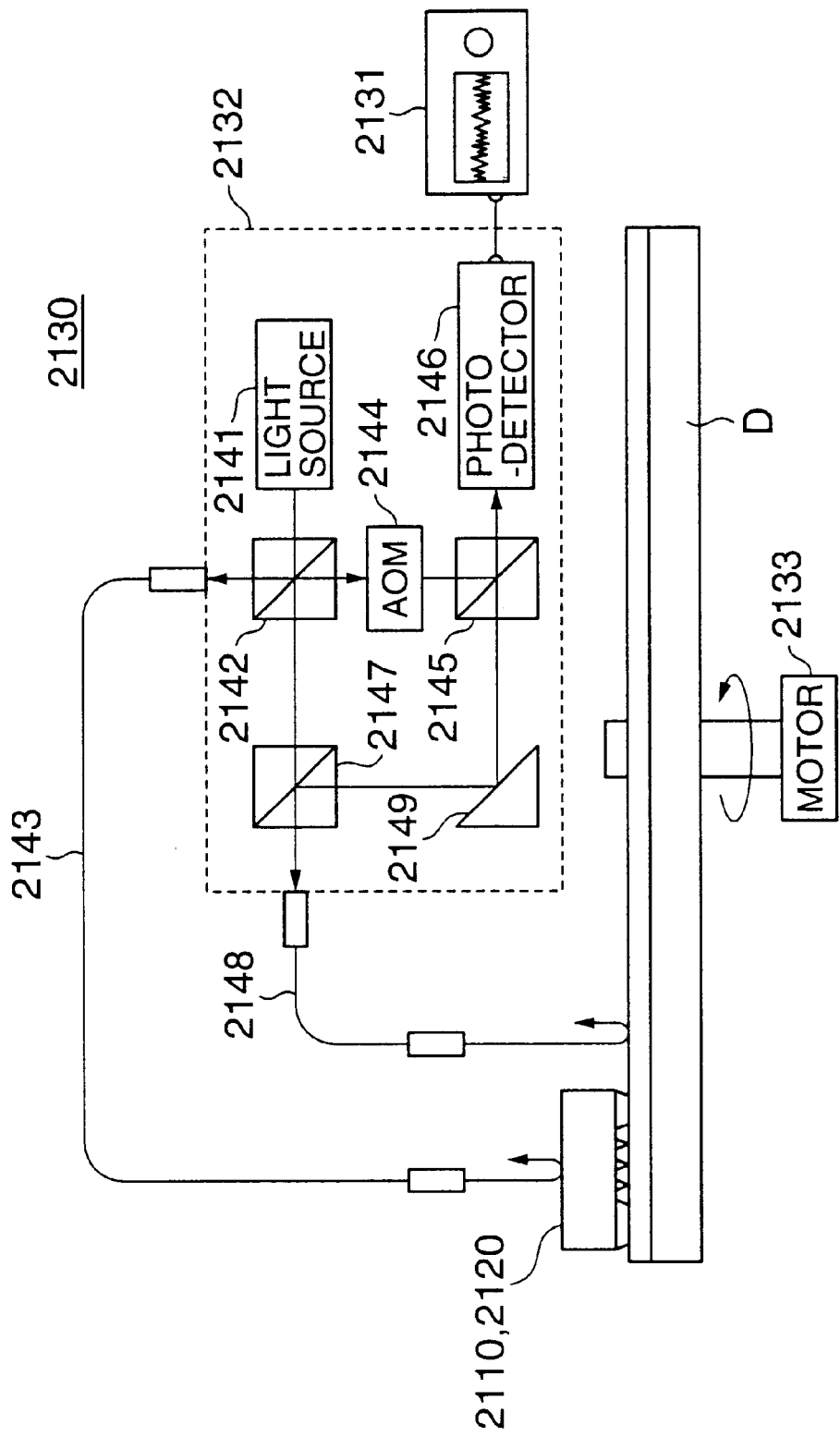
FIG. 54 is a block diagram showing a jumping-amount measuring arrangement which measures a jumping amount of a probe array.

For the comparison, a jumping-amount measuring arrangement 2130 shown in FIG. 54 is used. This jumping-amount measuring arrangement 2130 includes an FFT (Fast Fourier Transform) measuring device 2131, a Doppler vibration meter 2132, and a motor 2133 which rotates an optical disc D, and measures a vibration of a probe array which is placed on the optical disc D.

In this jumping-amount measuring arrangement 2130, in a condition in which the optical disc D is rotated in a CLV way (linear velocity=0.43 m/s) and the probe array is placed on the optical disc D, laser light from a light source 2141 is incident on the probe array via a beam splitter 2142 and an optical-fiber cable 2143, and the reflected light is detected by a photo-detector 2146 via the optical-fiber cable 2143, beam splitter 2142, an AOM 2144 and a beam splitter 2145. Further, in this jumping-amount measuring arrangement 2130, laser light emitted from the light source 2141 is incident on a recording layer on a surface of the optical disc D via beam splitters 2142 and 2147 and an optical-fiber cable 2148, and the reflected light is incident on the photo-detector 2146 via the optical-fiber cable 2148, beam splitter 2147, a mirror 2149 and the beam splitter 2145. The reflected laser light from the probe array and the reflected laser light from the optical disc D both incident on the beam splitter 2145 are synthesized and then incident on the photo-detector 2146. The FFT measuring device 2131 performs a Fourier transform process on a detection signal which is based on jumping of the probe array and obtains a jumping amount of the probe array.

Figure 55:
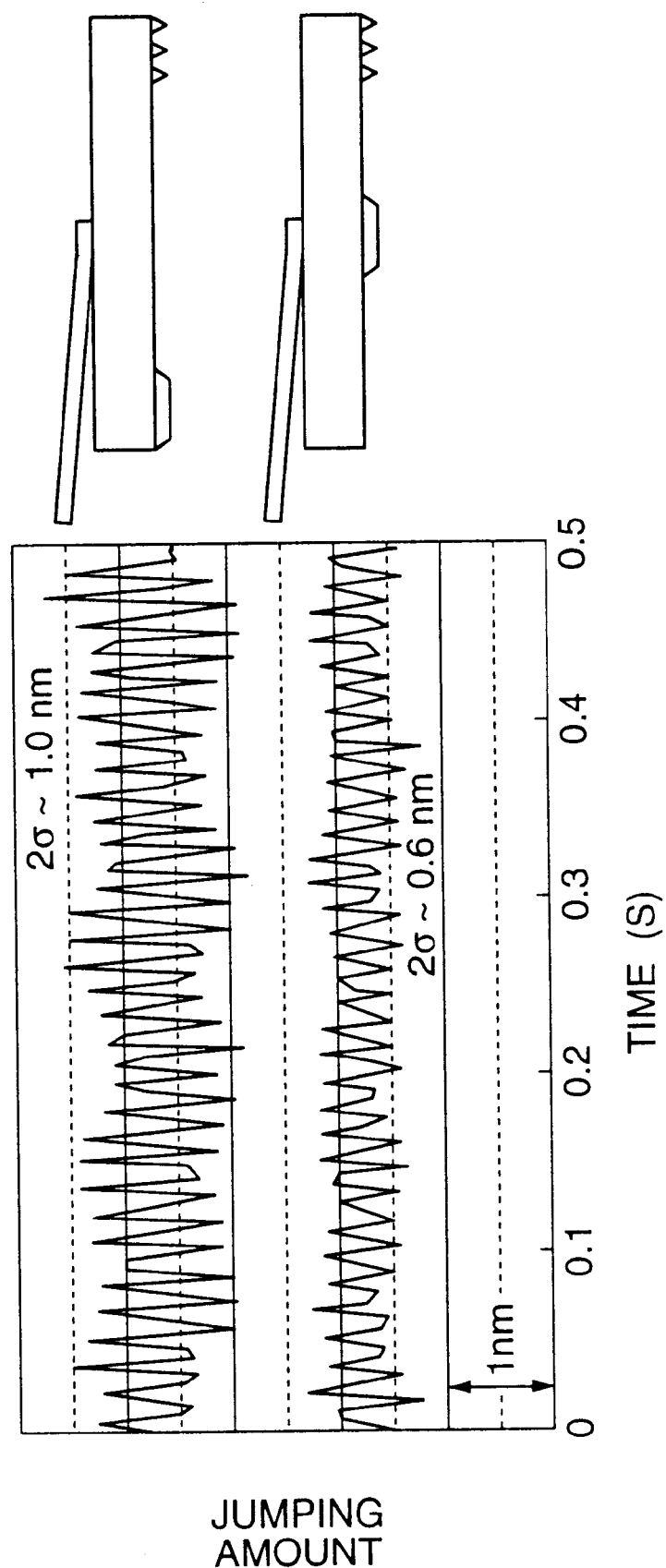
FIG. 55 shows jumping amounts of the probe arrays according to the present invention shown in FIGS. 51A, 51B, 52A and 52B.

FIG. 55 shows a result of jumping amounts obtained by this jumping-amount measuring arrangement 2130. In FIG. 55, a vertical axis indicates a jumping amount of the probe arrays 2110 and 2120, and a horizontal axis indicates a measurement time. An upper graph shows a state of jumping of the probe array 2110 while a lower graph shows a state of jumping of the probe array 2120.

According to FIG. 55, when σ represents a standard deviation of a jumping amount, 2σ=approximately 1.0 nm for the probe array 2110 while 2σ=0.6 nm for the probe array 2120.

Accordingly, when the probe array 2120 is used, because the probe array 2120 has the pad portions 2123 arranged at the central position, it is possible to reduce a jumping amount in comparison to the probe array 2110, and to achieve stable sliding.

As embodiments of the present invention, the probe arrays or single probes which generate optical near-fields have been described in particular. However, the present invention can also be applied to probe arrays or single probes which emit propagation light (light other than an optical near-field). In such a probe array or a single probe, an aperture at a (each) tip is changed in size depending on a device which provides an energy to a recording medium. In this probe array or single probe, in a case where an energy is provided mainly in a form of ordinary light (propagation light) as a fiber probe proposed by the present applicant in Japanese Laid-Open Patent Application No. 11-271339 for example, a size of an aperture at a (each) tip is made to be on the order of a wavelength of light to be emitted or larger than it. However, in a probe array or a single probe, in a case where an energy is provided in a form of evanescent light (optical near-field), a size of an aperture at a (each) tip is made to be smaller than a wavelength of light to be emitted. Thereby, the present invention can be applied even to an internal-light-gathering-type probe.

The present invention can be applied to either a form in which propagation light is generated or a form in which an optical near-field is generated described above. Further, the present invention can also be applied to a form in which both an optical near-field and propagation light are emitted from a tip of a (each) projecting portion simultaneously.

Further, although the example using the SOI substrate 2010 made by crystal growth in making the probe array or single probe was described, it is also possible to use one which is made by a sticking method in which, after single-crystal silicon wafers are stuck by direct bonding or the like, silicon on the active-layer-2011 side is polished so that it is dressed to have a predetermined thickness, or by an SIMOX method in which an oxide film is formed under a surface of a substrate by ion implantation of oxygen ions. In each of these cases, a uniformity of the active layer 2011 in thickness is obtained in an atomic level.

Further, although, as a glass substrate 2104 having a property of transmitting light, #7740 made by Corning Incorporated and SW-3 made by Asahi Techno Glass Corporation (IWAKI Glass) were mentioned, another substrate may be used instead. Specifically, when the above-described direct bonding in normal temperature is used, a quartz substrate or light-transmitting resin can be used. In particular, in a case where quartz is used, it is possible to bond a light-transmitting-property substrate and an Si layer together by direct bonding in a high temperature. In this method, a surface of the substrate is sufficiently cleaned, dusts and stains on the surface are removed and the surface is dried. Then, the surfaces are caused to come into contact with one another in a normal atmosphere. Then, heat treatment or anneal at higher than 900° C. is performed in a nitrogen gas. Thereby, the substrate is bonded.

Further, although the example using anodic bonding was described as a method of bonding an active layer 2011 of an SOI substrate 2010 and a glass substrate 2014 together, another bonding method can also be used. Specifically, as a method of bonding an active layer 2011 and a glass substrate 2014 together, direct bonding in a normal temperature (normal-temperature bonding) may be used. In the normal-temperature bonding, after so-called RCA cleaning is performed on a mirror-polished silicon wafer, glass substrate and/or metal substrate, FAB (Fast Atomic Beam) of Ar is incident on two substrates respectively for a time on the order of 300 seconds in a vacuum chamber in an atmosphere of $10^{-9}$ Torr simultaneously, and, then, these substrates are pressed to one another by a pressure of 10 MPa so as to be stuck together. Thereby, a bonding strength thereof after being returned to be in atmosphere is equal to or higher than 12 MPa. It is also possible to make a probe array according to the present invention by bonding together n active layer 2011 and a glass substrate 2014 which is a quarz substrate by normal-temperature bonding. Further, in the above-mentioned bonding, other than bonding of an active layer 2011 with a glass substrate 2014 having a property of transmitting light, it is also possible to make a probe array according to the present invention by bonding of the above-described GaP or $TiO_2$ layer, n-type Si layer 2052, low-concentration Si layer 2072 or high-concentration p-type Si layer 82 with a light-transmitting-property substrate. The above-mentioned RCA cleaning is a cleaning method, proposed by RCA Corporation of United States of America, using hydrogen peroxide as a base.

Further, it is also possible to bond an Si layer and a light-transmitting glass substrate 2014 together by glass bonding using low-melting-point glass (frit glass).

Further, it is also possible to bond a layer in which an aperture is made and a light-transmitting glass substrate 2014 together with adhesive. In this case, a glass substrate is used, and an optical adhesive (for example, V40-J91 of Suruga Seiki Co., Ltd.) made to have a refractive index the same as that of glass may be used.

Further, although anisotropic etching using KOH or the like is employed for making an Si projecting portion 2003 in the above-described embodiment, it is also possible to employ dry etching such as reactive ion etching (RIE) or the like instead.

Further, although a layer made of a high-refractive-index material, from which a projecting portion is made, is formed on a glass substrate by bonding in the above-described embodiment, it is also possible to form a film made of a high-refractive-index material on a glass substrate or the like by thin film forming technique such as deposition/ evaporation, spattering method, plasma CVD (Chemical Vapor Deposition) method, thermal CVD method, photo CVD method, or the like.

Further, although the probe array having the plurality of Si projecting portions 2003 mounted on the glass substrate 2002 was described as an embodiment of the preset invention, the advantages of the present invention can be obtained also from a combination in which a single Si projecting portion 2003 is mounted on a glass substrate 2002, and such a combination is included in the present invention.

Further, although the form in which the Si projecting portion 2003 has the shape of a quadrilateral pyramid was described as an embodiment of the present invention, it is also possible for an Si projecting portion 2003 has a shape of cone or a shape of truncated cone.

Further, although examples mainly using Si as a high-refractive-index material forming projecting portions were described as embodiments of the present invention, embodiments of the present invention are not limited to these example, and, C (diamond), amorphous Si, microcrystalline Si, polycrystalline Si, $Si_xN_y$ (where x and y are arbitrary numbers), $TiO_2$, $TeO_2$, $Al_2O_3$, $Y_2O_3$, $La_2O_2S$, $LiGaO_2$, $BaTiO_3$, $SrTiO_3$, $PbTiO_3$, $KNbO_3$, $K(Ta,Nb)O_3(KTN)$, $LiNbO_3$, $LiTaO_3$, $Pb(Mg_{1/3}Nb_{2/3})O_3$, $(Pb,La)(Zr,Ti)O_2$, $(Pb, La)(Hf,Ti)O_3$, $PbGeO_3$, $Li_2GeO_3$, $MgAl_2O_4$, $CoFe_2O_4$, $(Sr, Ba)Nb_2O_6$, $La_2Ti_2O_7$, $Nd_2Ti_2O_7$, $Ba_2TiSi_{12}O_8$, $Pb_5Ge_3O_{11}$, $Bi_4Ge_3O_{12}$, $Bi_4Si_3O_{12}$, $Y_3Al_5O_{12}$, $Gd_3Fe_5O_{12}$, $(Gd,Bi)_3 Fe_5O_{12}$, $Ba_2NaNbO_{15}$, $Bi_{12}GeO_{20}$, $Bi_{12}SiO_{20}$, $Ca_{12}Al_{14}O_{33}$, LiF, NaF, KF, RbF, CsF, NaCl, KCl, RbCl, CsCl, AgCl, TlCl, CuCl, LiBr, NaBr, KBr, CsBr, AgBr, TlBr, LiI, NaI, KI, CsI, Tl(Br,I), Tl(Cl,Br), $MgF_2$, $CaF_2$, $SrF_2$, $BaF_2$, $PbF_2$, $Hg_2Cl_2$, $FeF_3$, $CsPbCl_3$, $BaMgF_4$, $BaZnF_4$, $Na_2SbF_5$, $LiClO_4.3H_2O$, $CdHg(SCN)_4$, ZnS, ZnSe, ZnTe, CdS, CdSe, CdTe, αHgS, PbS, PbSe, EuS, EuSe, GaSe, $LiInS_2$, $AgGaS_2$, $AgGaSe_2$, $TlInS_2$, $TlInSe_2$, $TlGaSe_2$, $TlGaS_2$, $As_2S_3$, $As_2Se_3$, $Ag_3AsS_3$, $Ag_3SbS_3$, $CdGa_2S_4$, $CdCr_2S_4$, $Tl_3TaS_4$, $Tl_3TaSe_4$, $Tl_3VS_4$, $Tl_3AsS_4$, $Tl_3PSe_4$, GaP, GaAs, GaN, (Ga,Al)As, Ga(As,P), (InGa)P, (InGa)As, (Ga,Al)Sb, Ga(AsSb), (InGa)(AsP), (GaAl)(AsSb), $ZnGeP_2$, $CaCO_3$, $NaNO_3$, α-$HIO_3$, α-$LiIO_3$, $KIO_2F_2$, $FeBO_3$, $Fe_3BO_6$, $KB_5O_8.4H_2O$, $BeSO_4.2H_2O$, $CuSO_4.5H_2O$, $Li_2SO_4.H_2O$, $KH_2PO_4$, $KD_2PO_4$, $NH_4H_2PO_4$, $KH_2AsO_4$, $KD_2AsO_4$, $CsH_2AsO_4$, $CsD_2AsO_4$, $KTiOPO_4$, $RbTiOPO_4$, $(K,Rb)TiOPO_4$, $PbMoO_4$, β-$Gd_2 (MoO_4)_3$, β-$Tb_2(MoO_4)_3$, $Pb_2MoO_5$, $Bi_2WO_6$, $K_2MoOS_3.KCl$, $YVO_4$, $Ca_3(VO_4)_2$, $Pb_5(GeO_4)(VO_4)_2$, $CO(NH_2)_2$, $Li(COOH).H_2O$, $Sr(COOH)_2$, $(NH_4CH_2COOH)_3$ $H_2SO_4$, $(ND_4CD_2COOD)_3D_2SO_4$, $(NH_4CH_2COOH)_3$ $H_2BeF$, $(NH_4)_2C_2O_4.H_2O$, $C_4H_3N_3O_4$, $C_4H_9NO_3$, $C_6H_4(NO_2)_2$, $C_6H_4NO_2Br$, $C_6H_4NO_2Cl$, $C_6H_4NO_2NH_2$, $C_6H_4(NH_4)OH$, $C_6H_4(CO_2)_2HCs$, $C_6H_4 (CO_2)_2HRb$, $C_6H_3NO_2CH_3NH_2$, $C_6H_3CH_3(NH_2)_2$, $C_6H_{12}O_5.H_2OKH(C_8H_4O_4)$, $C_{10}H_{11}N_3O_6$, or $[CH_2.CF_2]_n$ can be used instead.

Further, the present invention is not limited to the above-described embodiments, and variations and modifications may be made without departing from the scope of the present invention.

The present application is based on Japanese priority application Nos. 11-157699, 11-204244, 11-326169, 2000-125127, and 2000-115825, filed on Jun. 4, 1999, Jul. 19, 1999, Nov. 16, 1999, Apr. 26, 2000 and Apr. 11, 2000, the entire contents of which are hereby incorporated by reference.

What is claimed is:

1. An optical-pickup slider, comprising:
   a layer; and
   a light-transmitting-property substrate, wherein:
   said layer has a tapered through hole, wherein the dimensions of said tapered through hole on a side opposite to said light-transmitting-property substrate are no greater than a wavelength of light that is incident on said tapered through hole; and
   said light-transmitting-property substrate is bonded to a surface of said layer, on which surface a larger opening of said tapered through hole exists.

2. The optical-pickup slider as claimed in claim 1, wherein said light-transmitting-property substrate has a thickness of at least ten times a thickness of said layer.

3. The optical-pickup slider as claimed in claim 1, wherein glass or $TiO_2$ is used as a material of said light-transmitting-property substrate when a wavelength of light to be incident is on the order of 2 μm to the order of 0.4 μm, but quarz glass, MgO, $Al_2O_3$, $Y_2O_3$ or diamond is used as a material of said light-transmitting-property substrate when a wavelength of light to be incident is equal to or shorter than 0.4 μm.

4. The optical-pickup slider as claimed in claim 1, wherein a non-light-transmitting film is provided at east on an inclined surface of said tapered through hole.

5. The optical-pickup slider as claimed in claim 4, wherein said non-light-transmitting film is made of metal or resistivity-lowered semiconductor.

6. An optical-pickup slider, comprising:
   a layer; and
   a light-transmitting-property substrate, wherein:
   said layer has a tapered through hole, a non-light-transmitting film being provided at least on an inclined surface of said tapered through hole, wherein said non-light-transmitting film comprises a eutectic of metal and a silicon material of said layer; and said light-transmitting-property substrate is bonded to a surface of said layer, on which surface a larger opening of said tapered through hole exists.

7. An optical-pickup slider, comprising:

a layer; and a light-transmitting-property substrate, wherein:
Si is used as a material of said layer and said layer has a tapered through hole, a non-light-transmitting film being provided at least on an inclined surface of said tapered through hole, said non-light-transmitting film being formed as a result of resistivity of at least the inclined surface of said tapered through hole being lowered; and
said light-transmitting-property substrate is bonded to a surface of said layer, on which surface a larger opening of said tapered through hole exists.

8. An optical-pickup slider comprising:

a layer layered on a first substrate and having a thickness smaller than that of said first substrate, wherein:
a tapered through hole is made in said layer; and
after a light-transmitting-property substrate is bonded to a surface of said layer, said first substrate is removed, and, then, a ski shape or a pad shape is made in said layer at a position of an aperture at a tip of said tapered through hole;
wherein said tapered through hole comprises a vacant space.

9. An optical-pickup slider comprising:

a layer layered on a first substrate and having a thickness smaller than that of said first substrate, wherein:
a ski shape or a pad shape having a tapered through hole is made in said layer; and
after a light-transmitting-property substrate is bonded to a surface of said layer, said first substrate is removed so that an aperture at a tip of said tapered through hole is exposed;
wherein said tapered through hole comprises a vacant space.

10. An optical-pickup slider comprising:

a layer layered on a first substrate and having a thickness smaller than that of said first substrate, wherein:
a tapered through hole is made in said layer; and
after a light-transmitting-property substrate is bonded to a surface of said layer, said first substrate is removed, and, then, a ski shape or a pad shape is made in said layer at a position of an aperture at a tip of said tapered through hole;
wherein said light-transmitting-property substrate comprises a flat-plate shape.

11. An optical-pickup slider comprising:

a layer layered on a first substrate and having a thickness smaller than that of said first substrate, wherein:
a ski shape or a pad shape having a tapered through hole is made in said layer; and
after a light-transmitting-property substrate is bonded to a surface of said layer, said first substrate is removed so that an aperture at a tip of said tapered through hole is exposed;
wherein said light-transmitting-property substrate comprises a flat-plate shape.

12. An optical-pickup slider comprising:

a layer layered on a first substrate and having a thickness smaller than that of said first substrate, wherein:
a tapered through hole is made in said layer; and
after a light-transmitting-property substrate is bonded to a surface of said layer, said first substrate is removed, and, then, a ski shape or a pad shape is made in said layer at a position of an aperture at a tip of said tapered through hole;
wherein said tapered through hole comprises a vacant space, and wherein the surface of the ski or pad shape is the same in its height as the surface of the aperture at the tip of the tapered through hole.

13. An optical-pickup slider comprising:

a layer layered on a first substrate and having a thickness smaller than that of said first substrate, wherein:
a ski shape or a pad shape having a tapered through hole is made in said layer; and
after a light-transmitting-property substrate is bonded to a surface of said layer, said first substrate is removed so that an aperture at a tip of said tapered through hole is exposed;
wherein said tapered through hole comprises a vacant space, and wherein the surface of the ski or pad shape is the same in its height as the surface of the aperture at the tip of the tapered through hole.

* * * * *